(12) United States Patent
Murphy et al.

(10) Patent No.: US 6,314,468 B1
(45) Date of Patent: Nov. 6, 2001

(54) SYSTEM AND METHOD FOR MANAGING TRANSMISSION OF ELECTRONIC DATA BETWEEN TRADING PARTNERS

(75) Inventors: John M. Murphy, Alexandria, VA (US); Lee E. Anderson, Potomac, MD (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/212,208

(22) Filed: Dec. 16, 1998

Related U.S. Application Data

(60) Provisional application No. 60/099,111, filed on Sep. 3, 1998.

(51) Int. Cl.[7] .................................................. G06F 13/00
(52) U.S. Cl. ......................... 709/236; 709/217; 709/313; 709/329
(58) Field of Search .................................. 709/217, 218, 709/230, 232, 236, 238, 313, 329

(56) References Cited

U.S. PATENT DOCUMENTS

| | | | |
|---|---|---|---|
| 5,758,126 | * 5/1998 | Daniels et al. ....................... | 345/333 |
| 5,970,475 | * 10/1999 | Barnes et al. ....................... | 705/27 |
| 5,982,893 | * 11/1999 | Hughes ................................ | 380/4 |
| 6,119,149 | * 9/2000 | Notani ................................. | 709/205 |
| 6,205,482 | * 3/2001 | Navarre et al. ..................... | 709/227 |

* cited by examiner

Primary Examiner—Viet D. Vu

(57) ABSTRACT

A method, system and computer program product for managing transmission of electronic data between network entities. Two network entities are interfaced so that Electronic Data Interchange ("EDI") data from one network entity is transmitted to the other network entity in a secure exchange using Transmission Control Protocol/Internet Protocol ("TCP/IP") for connectivity and Secure Sockets Layer, Version 3 ("SSL3") for security in transmission. The transmitted electronic message includes a header portion and a message data portion, and optional trailer portions, depending on a predefined format of message desired to be transmitted. The header portion includes a message format identifier and a length of a data message for a data message to be included in the message data portion. The message format identifier corresponds to one of a basic EDI message, an EDI message with message integrity, an EDI message with non-repudiation, an Interactive Agent ("IA") status, and an IA message receipt. The network entities may represent a Competitive Local Exchange Company and an Incumbent Local Exchange Company which are trading partners in the telecommunications industry.

19 Claims, 50 Drawing Sheets

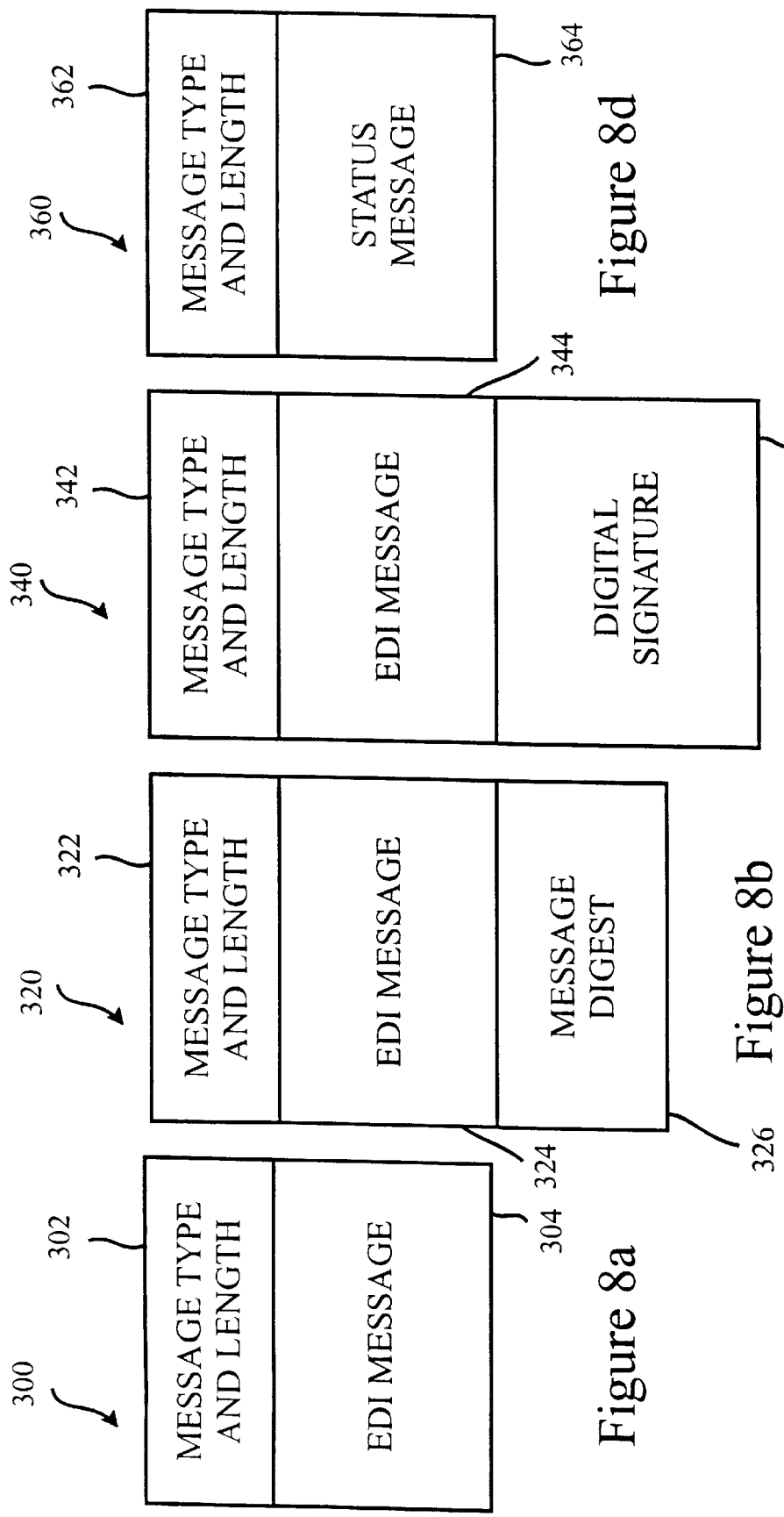

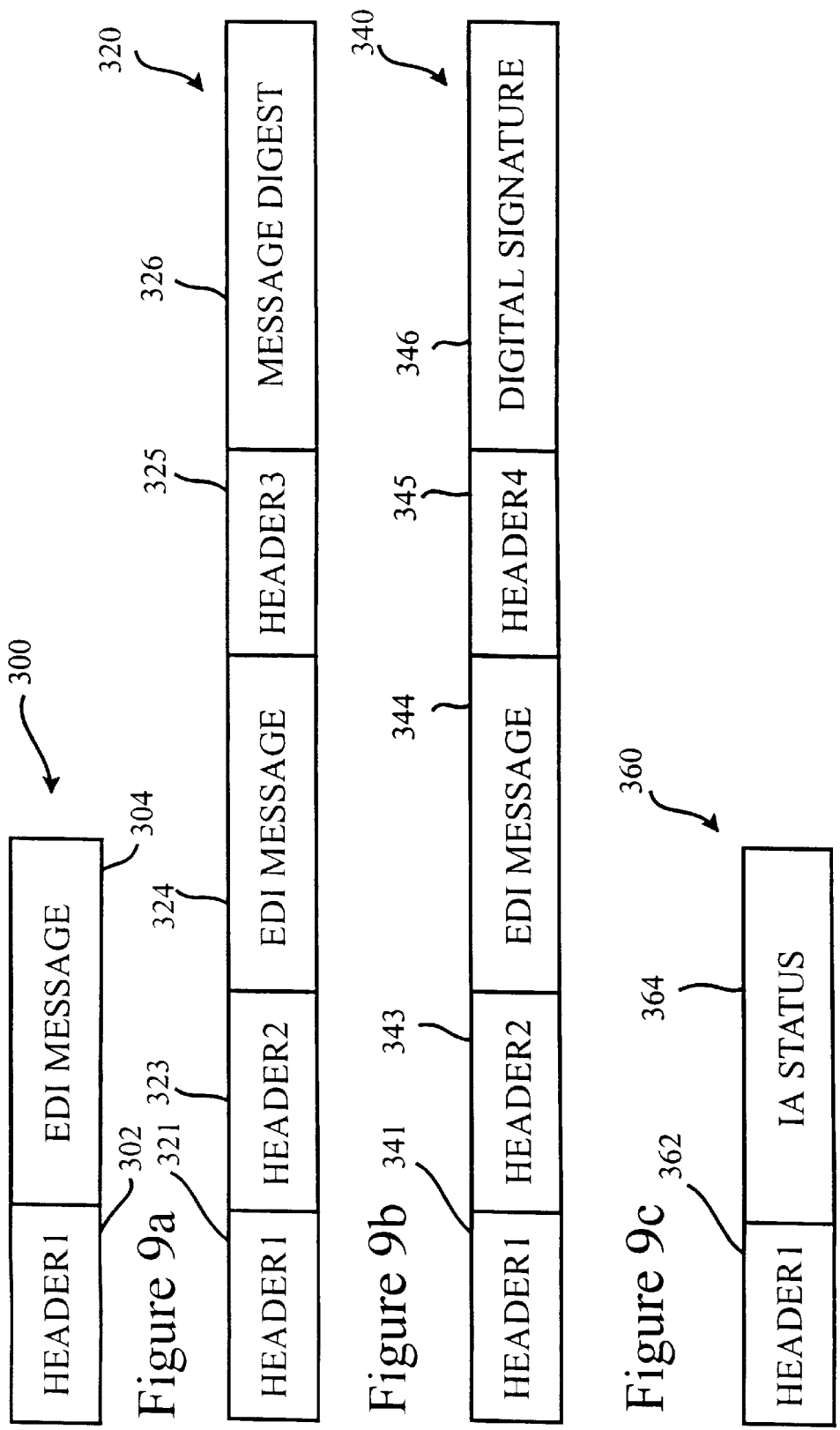

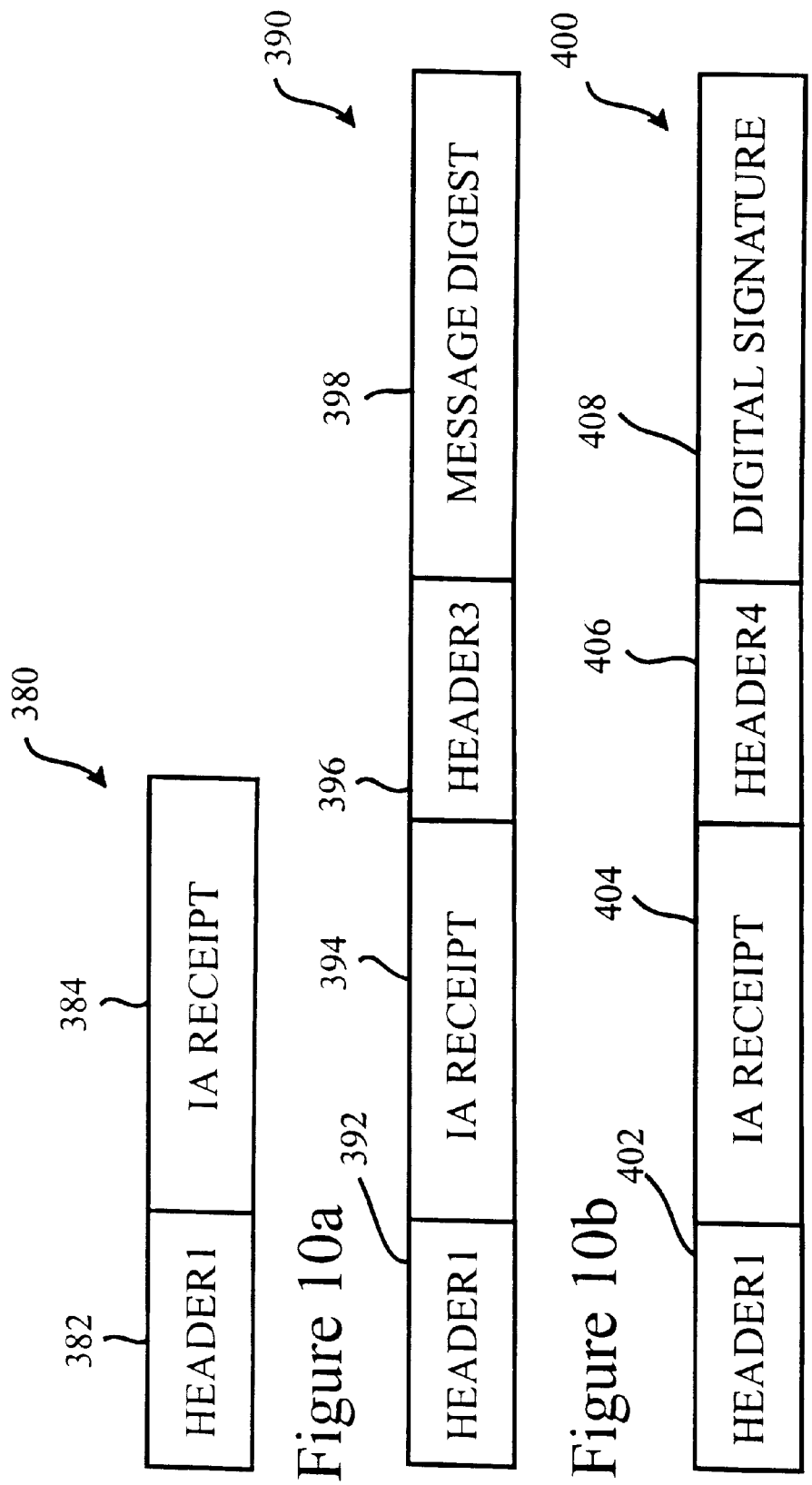

ASN.1 Syntax for Basic EDI messages

PlainEDIMessage ::= SEQUENCE { ——— 420
   contentType OBJECT IDENTIFIER, ——— 422
   ediMessage [0] EXPLICIT OCTET STRING ——— 424
}

Basic EDI messages reference the following object identifiers:

pkcs-7 OBJECT IDENTIFIER :: { ——— 426
   iso(1) member-body(2) US(840) rsadsi(113549) pkcs(1) 7
} contentType OBJECT IDENTIFIER ::= {pkcs-7 1 } -- EDI data
          428

Figure 11

ASN.1 Syntax for EDI with Message Integrity

IntegrityEDIMessage ::= SEQUENCE { —— 450
   integrityType OBJECT IDENTIFIER, —— 452
   integrityContent [0] EXPLICIT SEQUENCE { —— 454
456 —— version INTEGER,
458 —— digestAlgorithm AlgorithmIdentifier,
460 —— contentInfo SEQUENCE {
462 —— contentType OBJECT IDENTIFIER,
464 —— ediMessage [0] EXPLICIT OCTET STRING
    }
466 —— digest OCTET STRING
   }
}

EDI with Message Integrity references the following object identifiers:
470 —
   AlgorithmIdentifier ::= SEQUENCE {
472 — algorithm OBJECT IDENTIFIER,
474 — parameters NULL
   }
476 —
   pkcs-7 OBJECT IDENTIFIER :: {
    iso(1) member-body(2) US(840) rsadsi(113549) pkcs(1) 7
   }
478 —
   integrityType ::= {pkcs-7 5 }
480 —
   contentType OBJECT IDENTIFIER ::= {pkcs-7 1 } -- EDI data
482 —
   digestAlgorithm OBJECT IDENTIFIER ::= {sha1 }
484 —
   sha1 OBJECT IDENTIFIER ::= {1 3 14 3 2 26}

Figure 12

ASN.1 Syntax for EDI with Non-Repudiation

```
SignedEDIMessage ::= SEQUENCE {————— 500
  signedType  OBJECT IDENTIFIER, ————— 502
  signedContent [0] EXPLICIT  SEQUENCE {—— 504
    version  INTEGER, ————————————— 506
    digestAlgorithms  SET OF AlgorithmIdentifier, —— 508
    contentInfo  SEQUENCE {————————— 510
      contentType  OBJECT IDENTIFIER, ——— 512
      ediMessage [0] EXPLICIT  OCTET STRING — 514
    }
    signerInfos  SET OF SEQUENCE {——— 516
      version  INTEGER, ———————————— 518
      issuerAndSerialNumber  SEQUENCE {—— 520
        issuerCountry  SEQUENCE OF SET OF SEQUENCE {—— 522
          country  OBJECT IDENTIFIER, ——— 524
          value  PrintableString ——————— 526
        }
        issuerOrg  SEQUENCE OF SET OF SEQUENCE { ——— 528
          org  OBJECT IDENTIFIER, ————————— 530
          value  PrintableString ————— 532
        }
        serialNumber  INTEGER ————— 534
      }
      digestAlgorithm  AlgorithmIdentifier, ————— 536
      digestEncryptionAlgorithm  AlgorithmIdentfier, —— 538
      encryptedDigest  OCTET STRING ————— 540
    }
  }
```

Figure 13a

EDI with Non-Repudiation references the following object identifiers:

AlgorithmIdentifier ::= SEQUENCE { —————— 550
   algorithm  OBJECT IDENTIFIER, —————— 552
   parameters  NULL —————————————— 554
} pkcs-7 OBJECT IDENTIFIER ::= { —————— 556
   iso(1) member-body(2) US(840) rsadsi(113549) pkcs(1) 7 —— 558
} signedType OBJECT IDENTIFIER ::= {pkcs-7 2}  -- Signed EDI data —— 560
contentType OBJECT IDENTIFIER ::= {pkcs-7 1 } -- EDI data
rsadsi OBJECT IDENTIFIER ::= {1 2 840 113549 } —————— 562
sha1 OBJECT IDENTIFIER ::= {1 3 14 3 2 26} —————— 564
rsaEncryption OBJECT IDENTIFIER ::= {rsadsi 1 1 1 } —— 566
                                                        568

Figure 13b

ASN.1 Syntax for IA Status

IaStatusMessage ::= SEQUENCE { —— 600
    contentType OBJECT IDENTIFIER, —— 602
    statusCode [0] EXPLICIT BIT STRING (SIZE(32)) —— 604
}

Figure 14

ASN.1 Syntax for optional IA Receipts

```
IaReceiptMessage ::= SEQUENCE {                              —— 620
   contentType OBJECT IDENTIFIER,                            —— 622
   receiptContent [0] EXPLICIT SEQUENCE {                    —— 624
      isaSegment OCTET STRING,                               —— 626
      dateTimeStamp UTCTime,                                 —— 628
      enhancements Enhancements OPTIONAL                     —— 630
   }
}

Enhancements :: = CHOICE {                                   —— 632
   withDigest [1] WithDigest,                                —— 634
   withDigSig [2] WithDigSig                                 —— 636
}

WithDigest ::= [1] EXPLICIT SEQUNCE {                        —— 638
   digestAlgorithm DigestAlgorithm,                          —— 640
   messageDigest OCTET STRING                                —— 642
}

WithDigSig ::= [2] EXPLICIT SEQUENCE {                       —— 644
   signatureAlgorithm SignatureAlgorithm,                    —— 646
   digitalSignature OCTET STRING                             —— 648
}
```

IA Receipt messages reference the following object identifiers:
DigestAlgorithm ::= { 1 3 14 3 2 26} -- sha1                 —— 650
SignatureAlgorithm :: {rsadsi 1 1 5 } -- sha1WithRSAencryption —— 652
rsadsi OBJECT IDENTIFIER ::= {1 2 840 113549 }               —— 654

Figure 15

```
700— int    tcpopen(host,service)
702— char   *service, *host;
704—{ int    unit;
706—  struct sockaddr_in   sin;
708—  struct servent      *sp;
710—  struct hostent      *hp;
712 — if ((sp=getservbyname(service,"tcp")) == NULL) then error...
714 — if ((hp=gethostbyname(host)) == NULL) then error...
716 — bzero((char *)&sin, sizeof(sin))
            etc...
718 — if ((unit=socket(AF_INET,SOCK_STREAM,0)) < 0) then error...
720 — if (connect(unit,&sin,sizeof(sin)) < 0) then error...
722 — return(unit);
     }
```

Figure 16

```
750
    struct servent   *sp;
752 — struct sockaddr_in sin,from;
754 — if ((sp=getservbyname(service,"tcp")) == NULL) then error...
756 — sin.sin_family=etc...
758 — if ((s=socket(AF_INET,SOCK_STREAM,0)) < 0) then error...
760 — if (bind(s, &sin, sizeof(sin)) < 0) then error...
762 — if (listen(s,QUELEN) < 0) then error...
764 — for (;;) {
766 —    if ((g=accept(f,&from,&len)) < 0) then error...
768 —    if (!fork()) {
770 —       child handles request...
772 —       ...and exits
774 —       exit(0);
            }
776 —    close(g);  /* parent releases file */
        }
```

Figure 17

SYSTEM AND METHOD FOR MANAGING TRANSMISSION OF ELECTRONIC DATA BETWEEN TRADING PARTNERS

CROSS-REFERENCES TO RELATED APPLICATIONS

This application is related to, and claims the benefit of the earlier filing date of, U.S. Provisional patent application Ser. No. 60/099,111, filed Sep. 3, 1998, entitled "System and Method for Managing Transmission of Electronic Data between Trading Partners," the entirety of which is incorporated herein by reference.

BACKGROUND OF THE INVENTION

1. Field of the Invention

The present invention relates generally to the field of telecommunications and more specifically to a method, system and computer program product for managing transmission of electronic data between two network entities. The present invention relates more specifically to a method, system and computer program product for managing transmission of electronic data between network entities of trading partners using Transmission Control Protocol/Internet Protocol ("TCP/IP") and Secure Sockets Layer, Version 3 ("SSL3"). More specifically, the present invention relates to a method, system and computer program product for managing transmission of data formatted compatible with Electronic Data Interchange ("EDI") in transactions using TCP/IP and SSL3 between network entities.

2. Discussion of the Background

Without limiting the invention, its background is described in connection with transmission of Electronic Data Interchange ("EDI") data between network entities of trading partners in the telecommunications industry. Normally, the trading partners are a Competitive Local Exchange Company ("CLEC") and an Incumbent Local Exchange Company ("ILEC").

The Telecommunications Industry Forum ("TCIF") primarily develops technology specific implementation guidelines for use within the telecommunications industry to realize a variety of intercommunication services, for example, A TCIF Guideline for Electronic Data Interchange, and TCIF-98-009, Generic Implementation Guidelines for Connectivity, which are incorporated herein by reference.

The International Telecommunication Union ("ITU") is a treaty based organization operating under the auspices of UNICEF (a branch of the United Nations). The ITU's primary mission is to study, promote, initiate and design global telecommunication services and technology to improve the quality of life for all of the world's inhabitants. During the World Telecommunication Service Conference ("WTSC") of 1991, it was reorganized into three sectors: the Technology sector ("ITU-T"), Radio sector ("ITU-R") and the Telecom Service Bureau sector ("ITU-TSB") to handle administrative and publication matters. In the context of this GIG, technology specified n the following ITU and International Organization for Standardization ("ISO")IEC common text publications are incorporated herein by reference:

Rec. X.509 (1993)|ISO/IEC 9495-8:1995, *Information Technology-Open Systems Interconnection-The Directory: Authentication framework (for Digital Certificates and Signatures and the requirement to use Distinguished Encoding Rules)*;

Rec. X.680 (1994)|ISO/IEC 8824-1:1995, *Information Technology-Abstract Syntax Notation One* (ASN.1): *Information object specification* (for ASN.1 grammar used in the IA specification); and Rec. X.690 (1994)|ISO/IEC 8825-1:1995, *Information Technology-ASN.1 encoding rules: Specification of basic Encoding Rules (BER), Canonical Encoding Rules (CER) and Distinguished Encoding Rules (DER)*.

RSA Laboratories, a division of RSA Data Security, Inc. has published PKCS #7, *Public-Key Cryptography Standards #7—Cryptographic Message Syntax*, which is incorporated herein by reference.

Historically, network entities have communicated with each other in a variety of settings. FIG. 1 is a block diagram of a point-to-point network configuration. A network node A 10 is directly connected to a network node B 16, which is directly connected to a network node C 12 and a network node D 14. Generally, messages from node A 10 to node C 12 are transmitted from node A 10 to node B 16 and are then transmitted to node C 12. A point-to-point configuration is a communications link in which dedicated links exist between individual origins and destinations, as opposed to a point-to-multipoint, in which the same signal goes to many destinations (such as a cable TV system), or a switched configuration, in which the signal moves from the original to a switch that routes the signal to one of several possible destinations.

FIG. 2 is a block diagram of a Value Added Network ("VAN") 28, having network node A 20, network node B 22, network node C 24 and network node D 26 connected to the network. Generally, in order for network node A 20 to transmit a message to network node B 22, node A 20 sends a message to the VAN 28 which encodes the message in a standard format for transmission to a server which communicates the message in a proper format for receipt by network node B 22. A VAN is a communications network that offers additional services, such as message routing, resource management, and conversion facilities, for computers communicating at different speeds or using different protocols.

In the past, in order to transmit American Standard Code for Information Interchange ("ASCII") data over a point-to-point network as illustrated in FIG. 1 described above, a connection (e.g., a modem-to-modem connection) has been established, the data has been transmitted, and the connection has been terminated (e.g., via a modem-to-modem disconnect) in order to communicate the end of transmission of the message.

Connecting via a dial-up modem involves a connection similar to a user dialing a telephone. For example, after dial-up by a sender modem, a telephone company sends a ring signal. A modem detects the ring signal and starts transmitting a signal to establish a connection by setting up a carrier frequency and modulation. The recipient modem signals a computer, through a wire lead connecting the modem to the computer, that the modem has detected a ring signal. The computer has software routines which accept this information and issue commands to turn on a terminal ready lead. The connection is then established for transmission of data.

Receiving modems "listen" for carrier signals on predetermined frequencies. When a receiving modem detects a carrier, which is a transmitted voltage, the receiving modem sends a carrier detect signal to its attached computer, software routines in the computer recognize that a connection has been established. A receiving modem translates a received stream of data from a modulated frequency signal into a stream of digital bits to be transmitted to the attached computer. The computer then typically stores received bits one by one in a register until, for example, eight bits, or a byte, have been received. The byte thus received is then processed as a received byte of information. The process continues until a disconnect signal is received.

Telephone carriers have voice channels devoted to voice data and signaling channels for data which is not voice grade. Telephony standards establish a path over which these types of data are transmitted to a receiver, giving a user a "physical connection," or an established path over telephone lines, which is used to transmit a stream of data in this setting to an intended recipient. When a sender has completed transmission of a message, the sender disconnects, very similarly to hanging up a telephone. The sender turns off the data terminal lead, dropping the carrier signal. The recipient then detects the lack of carrier signal being received and issues a signal such as "carrier lost" to disconnect from the telephone line. Each modem may then reset for its next connection.

In this environment, a recipient has had no way to know how much data was being transmitted until the connection was terminated. Therefore, once a sender initiated a connection and began transmission of a message, the receiver simply accepted transmission until a disconnect was received. The receiver could then interpret the stream as received to be the entire message. If a sender desired to transmit secure data by means of encryption, the sender and receiver typically had to agree to an encryption technique. The sender could then encrypt the sensitive portion of the message to be transmitted, and send it as an attachment to a non-secure message. Again, the receiver only recognized that the complete message had been received by recognizing the end of transmission of the message.

In contrast to point-to point connections, wherein a "physical path" between a sender and a receiver is established by telephone companies for the duration of a transmission session, communications of messages over a network using TCP/IP are accomplished by transmission of the messages in the format of packets. A sender network entity and receiver network entity each have a distinct address on the network. A message to be transmitted from the sender network entity to the receiver network entity is partitioned into a plurality of packets, each of which includes a network destination address of the receiver network entity. The packets are then transmitted individually, to be received and pieced together back into the original message by the receiving network entity. The packets are routed through multiple network nodes, each of which examine the packets to determine whether the network node is the intended receiver network entity, or a host of the intended receiver network entity. Therefore, the transmitted data is insecure unless some form of encryption has been used to encrypt the data in the packet before transmission.

EDI data has conventionally been transmitted only in its pure form. A sender has conventionally established a connection with a receiver, transmitted the EDI message, and then terminated the connection. Termination of the connection has been accomplished by a disconnect (e.g., a modem-to-modem disconnect). The receiver of EDI data has heretofore had no way of knowing the length of the message being transmitted, since the end of the message has been identified by the termination of the connection. However, the receiver of EDI data has heretofore had no need to know the length of the message being transmitted. However, users of conventional EDI data transmission have been unable to utilize public telecommunications vehicles such as, for example, the Internet and/or Internet protocols for transmission at least because the communication connections are continuous and because data is transmitted in packets which are passed from node to node in a network, raising security issues.

Moreover, EDI data protocol does not inherently support encryption. Therefore, EDI data transmitted over a non-secure line, such as the Internet, is insecure because (1) a third party may be able to intercept data during transmission and (2) a third party may be able to alter the data being transmitted.

Many security measures have been implemented to ensure "tamperproof" transmission of data. For example, a digital signature is a personal authentication method based on encryption and secret authorization codes used for "signing" electronic documents. Encryption techniques generally have been utilized for secure transmission of many types of data As another example, Rivest-Shamir-Adleman ("RSA") encryption is a public key encryption algorithm which is well known in the art of data transmission. The RSA technique is disclosed in U.S. Pat. No. 4,405,829, the teachings of which are hereby incorporated by reference in their entirety.

Also, Secure Hash Algorithm ("SHA") is a technique that computes a 160-bit condensed representation of a message or data file called a message digest. The SHA is used by a sender and receiver of a message in computing and verifying a digital signature for security of transmission. A method and system for providing secure EDI over an open network by using an RSA type cryptographic system is disclosed in U.S. Pat. No. 5,812,669. The method and system uses an EDI AUTACK, or EDI acknowledgment message, as a document to provide the digital signature in a public/private key system in which the AUTACK is signed by an encrypted hash code which has been encrypted with the sender's private key.

A problem with using an encryption technique such as SSL3 is that the receiver typically must know the length of an encrypted message which is being transmitted in order to recognize when the encrypted message ends and thereby terminate the decryption. EDI users have felt a need to transmit only EDI data. Therefore, the EDI community has resisted the inclusion of any header or trailer data. In fact, proposals to add header and/or trailer data to EDI formatted data have been rejected by members of the EDI community.

The present inventor has identified at least two problems that have prevented secure transmission of EDI formatted data between two network entities over public lines using TCP/IP and SSL3,namely (1) a need for destination address information and (2) a need for length information to be included in a transmitted message. Thus, the present inventor has identified a need for a method and system of managing transmission of electronic data in EDI format between network entities over dedicated circuits or Wide Area Networks ("WANs"). In view of the EDI community's resistance to transmission of "impure" EDI data, the conventional art teaches away from methods and systems for managing secure transmission of electronic data in EDI format between network entities over dedicated circuits or WANs.

SUMMARY OF THE INVENTION

Accordingly, an object of this invention is to provide a novel method, system and computer program product for managing transmission of electronic data between two network entities.

It is a further object of this invention to provide a novel method, system and computer program product for managing transmission of Electronic Data Interchange ("EDI")

data between network entities using Transmission Control Protocol/Internet Protocol ("TCP/IP") for connectivity and Secure Sockets Layer, Version 3 ("SSL3") for security in transmission.

It is a further object of this invention to provide a novel method, system and computer program product for managing transmission of EDI data included in an electronic message having a header portion and a message data portion between network entities using TCP/IP for connectivity and SSL3 for security in transmission.

It is a further object of this invention to provide a novel method, system and computer program product for managing transmission of EDI data included in an electronic message having a header portion, which includes a message format identifier and a length of a data message, and a message data portion between network entities using TCP/IP for connectivity and SSL3 for security in transmission. The message format identifier corresponds to one of a basic EDI message, an EDI message with message integrity, an EDI message with non-repudiation, an Interactive Agent ("IA") status, and an IA message receipt.

It is a further object of this invention to provide a novel method, system and computer program product for managing transmission of EDI data between a Competitive Local Exchange Company and an Incumbent Local Exchange Company using TCP/IP for connectivity and SSL3 for security in transmission.

It is a further object of this invention to provide a novel method, system and computer program product for managing transmission of American National Standards Institute ("ANSI") X.12 EDI transactions between network entities of trading partners in the telecommunications industry using TCP/IP, SSL3, and message headers in a predefined format which includes a length of a message data portion of an electronic message being transmitted. Message trailers may also be appended to include information, for example, for digital signatures and message digests.

The present invention provides a hardware and software platform to effect the secure transmission of EDI messages from one network entity to another. When an EDI translator of a first network entity receives an ANSI X.12 EDI transaction, the transaction is passed to a first IA. The first IA accepts the ANSI X.12 EDI transaction from the EDI translator, sets up a secure connection using TCP/IP and SSL3, formats an electronic message having a header portion and a message data portion, transmits the electronic message to an IA of a second network entity, and disconnects. The IA of the second network entity receives the transmission, recognizes the header portion and the message data portion of the transmitted electronic message, and passes the transaction to an EDI translator of the second network entity for processing.

Object identifiers are used in message transmission, for example, to identify a type of message being transmitted, encryption techniques used for encrypting the transmitted message, and hash algorithms used for message digests. By including lengths of message data portions and object identifiers in transmitted electronic messages, greater versatility of transmission is possible, as, for example, different encryption algorithms may be utilized in different transmissions of electronic messages between network entities.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8a is a block diagram of a format for a basic Electronic Data Interchange ("EDI") message for the invention;

FIG. 8b is a block diagram of an EDI message with message integrity for the invention;

FIG. 8c is a block diagram of a format for an EDI message with nonrepudiation for the invention;

FIG. 8d is a block diagram of a format for an Interactive Agent ("IA") Status message for the invention;

FIG. 9a is a block diagram of a format for a basic EDI message for the invention;

FIG. 9b is a block diagram of a format for an EDI message with message integrity for the invention;

FIG. 9c is a block diagram for an EDI message with non-repudiation for the invention;

FIG. 9d is a block diagram of a format for an IA Status message for the invention;

FIG. 10a is a block diagram of a format for an optional basic receipt message for the present invention;

FIG. 10b is a block diagram of a format for a receipt with message integrity for the present invention;

FIG. 10c is a block diagram for a format for a receipt with digital signature with non-repudiation for the invention;

FIG. 11 illustrates the syntax for basic EDI messages and object identifiers for basic EDI messages;

FIG. 12 illustrates the syntax for EDI messages with message integrity and object identifiers for EDI messages with message integrity;

FIG. 13a illustrates the syntax for EDI messages with non-repudiation;

FIG. 13b illustrates the syntax for object identifiers referenced by EDI messages with non-repudiation;

FIG. 14 illustrates the syntax for IA Status messages for the present invention;

FIG. 15 illustrates the syntax for optional IA Receipts and object identifiers referenced by IA Receipt messages for the invention;

FIG. 16 illustrates exemplary computer code for an Open Socket operation for creating a socket;

FIG. 17 illustrates exemplary computer software code for initializing a server for the invention;

DESCRIPTION OF THE PREFERRED EMBODIMENTS

Figure 1:
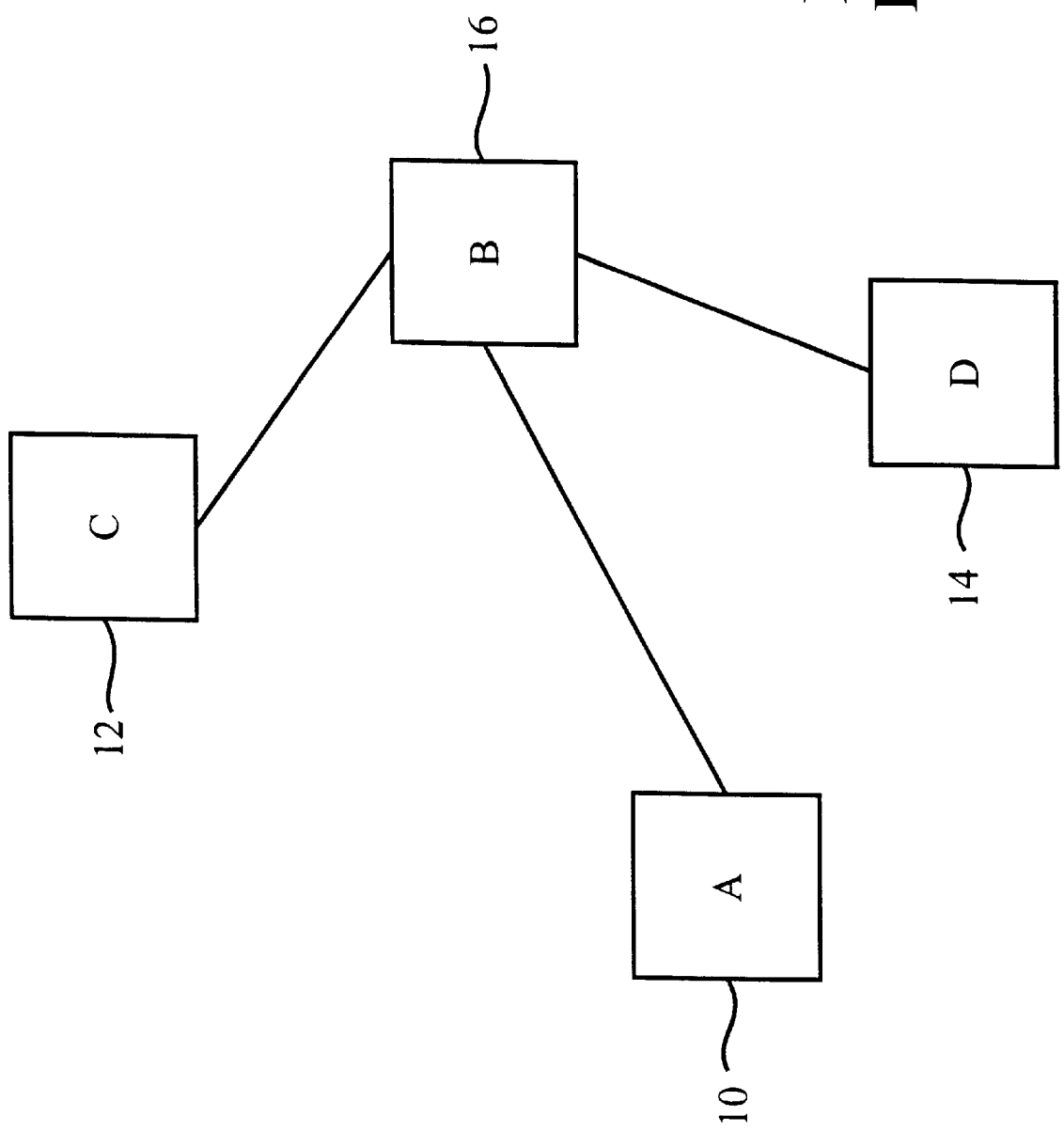
FIG. 1 is a network diagram for a conventional network having point-to-point connectivity.
Figure 2:
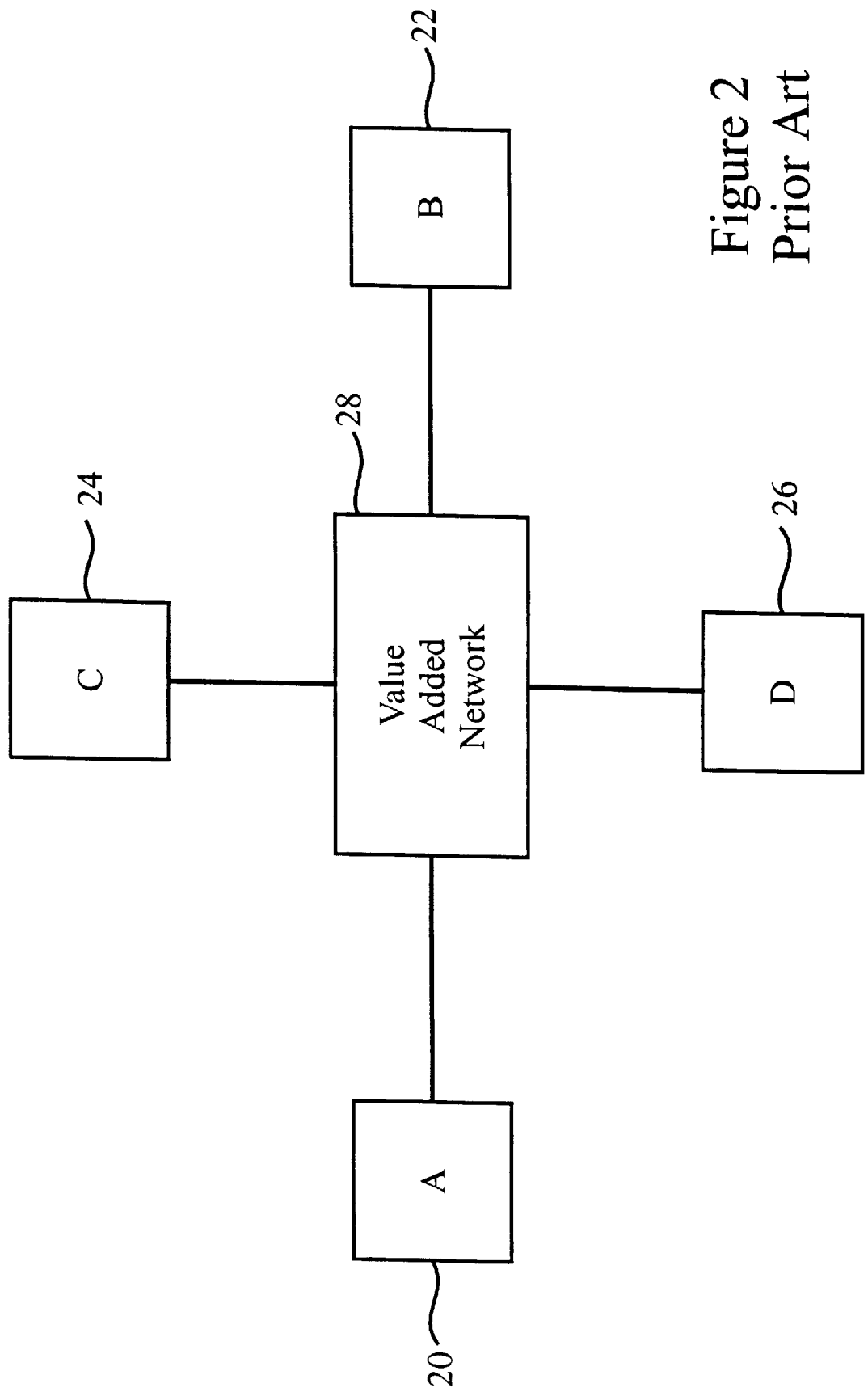
FIG. 2 is a network diagram for a conventional Value Added Network ("VAN") showing connectivity to end users.
Figure 3:
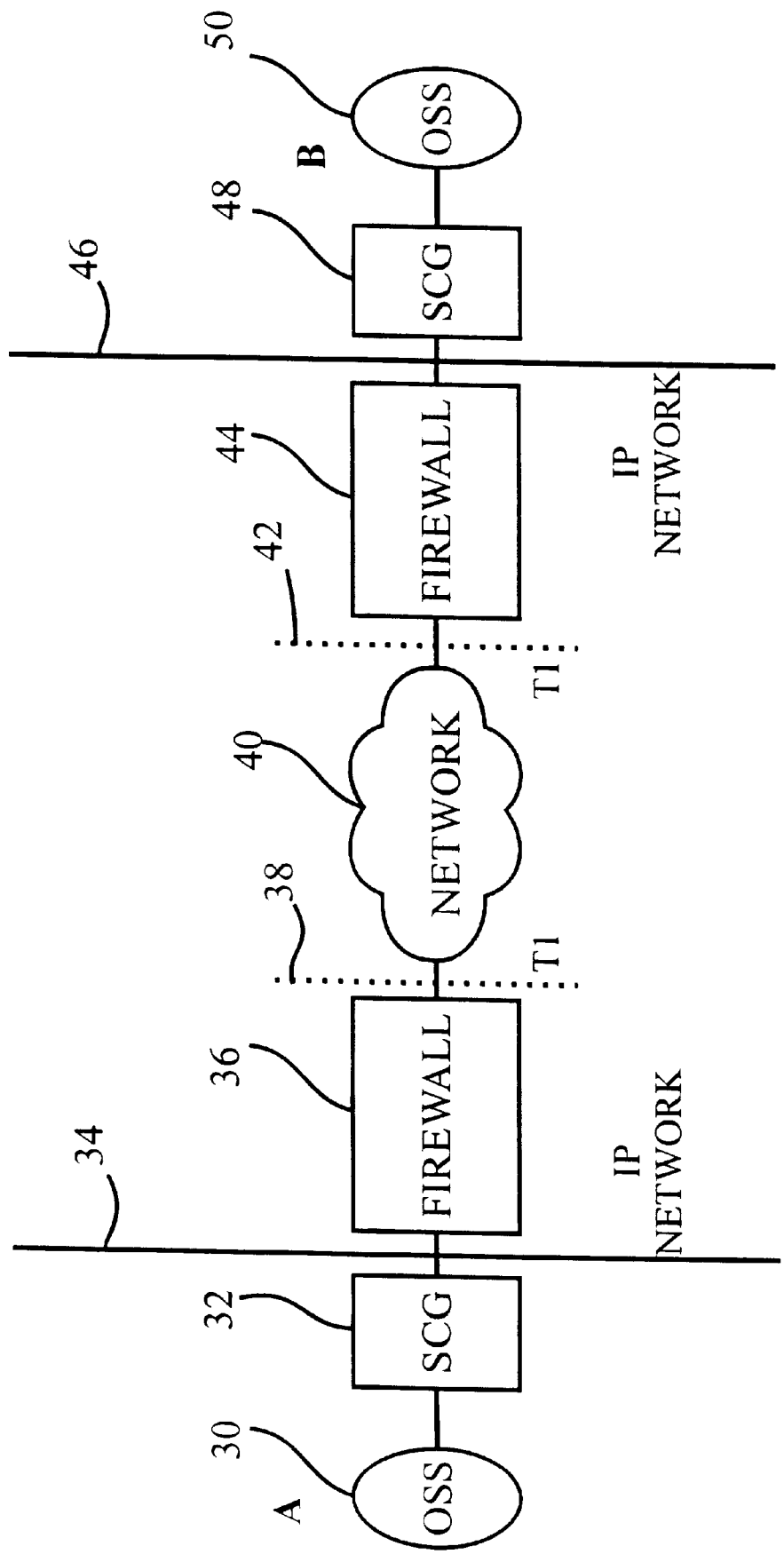
FIG. 3 is a network diagram for the novel interface between two network entities according to one embodiment of the invention.

Referring now to the drawings, wherein like reference numerals designate identical or corresponding parts throughout the several views, and more particularly to FIG. 3 thereof, there is illustrated a network diagram showing two network entities in communication with each other according to one embodiment of the present invention. An Operations Support System ("OSS") 30, for the network entity A of a trading partner communicates with a Service Center Gateway ("SCG") 32, which communicates, through an Internet Protocol ("IP") network 34 which is in communication with a firewall 36, communicating through a T1 connection 38 to a network 40. The network 40 communicates through a T1 connection 42 with a firewall 44 in communication with an IP network 46 which communicates with an SCG 48 which communicates with an OSS 50 of a network entity B of a trading partner. As an example, the SCG 32 may consist of two components, an EDI gateway and a TCP/IP with SSL3 transport module.

Figure 4:
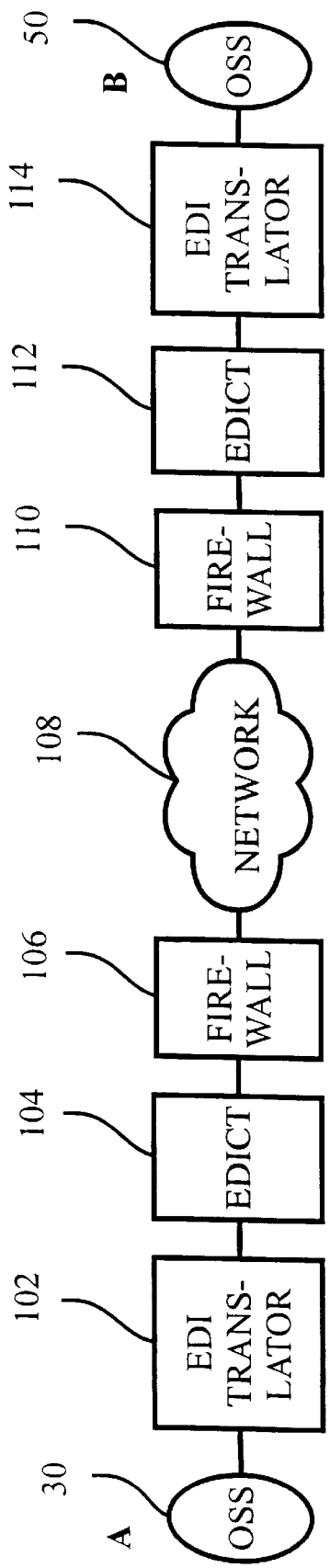
FIG. 4 is a network diagram for the novel interface for the Interactive Agent according to a second embodiment of the present invention.

FIG. 4 is a network diagram for a second embodiment of the present invention. An OSS 30 for a network entity of a trading partner A communicates with an EDI translator 102 for translating incoming and outgoing EDI messages. The EDI translator 102 communicates with an EDI Communications Transporter ("EDICT") 104, which communicates with a firewall 106, which is in communication with a network 108. The network 108 is in turn in communication with a firewall 110, which communicates with an EDICT 112, in communication with an EDI translator 114, which translates incoming and outgoing EDI messages for an OSS 50 for a network entity of a trading partner B.

Figure 5:
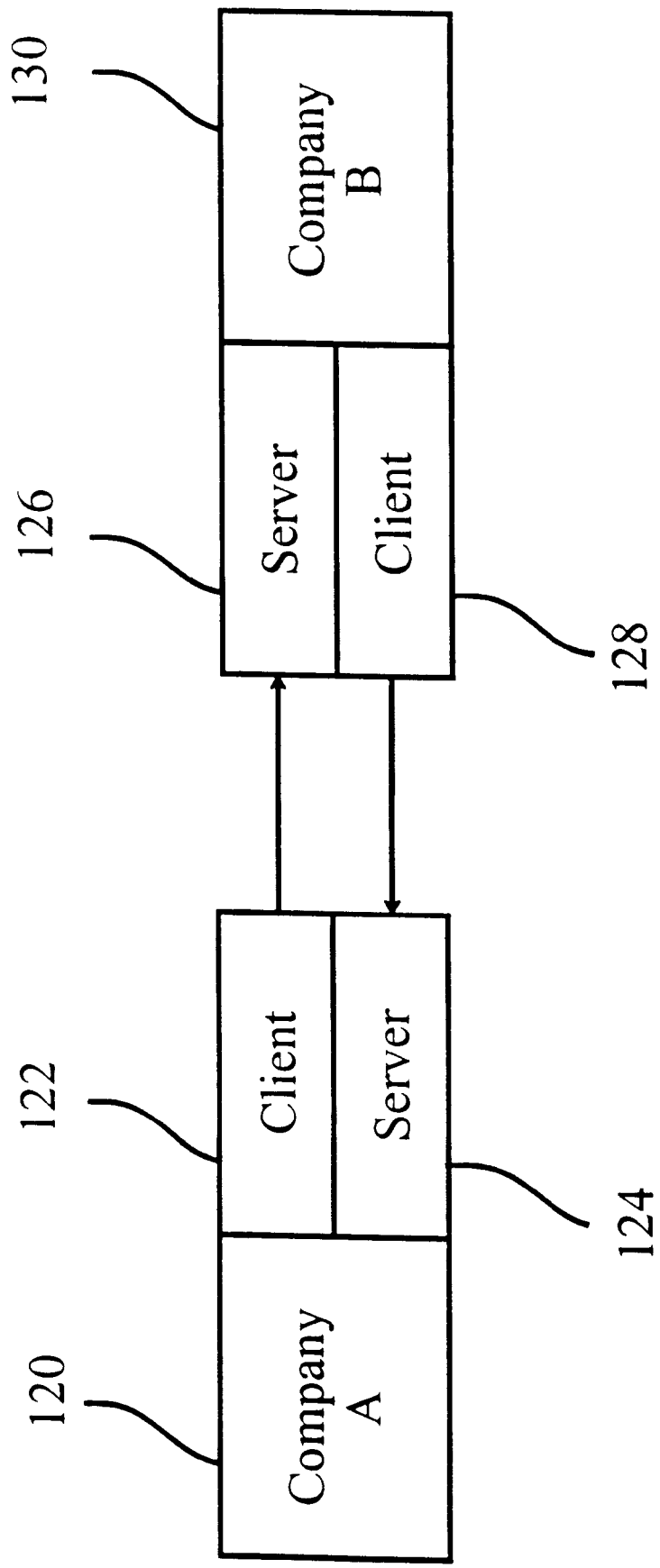
FIG. 5 is a block diagram for the client server relationship in a network according to the invention.

FIG. 5 is a block diagram showing an overall network set-up of two network entities of two respective trading partners communicating with each other. Company A 120 has a client 122 communicating with a server 126 of a company B 130. Company B 130 has a Client 128 communicating with a Server 124 of Company A 120. The Interactive Agent functions as an interface between the EDI translator and data communications protocols. Various implementation approaches may be taken ranging from a simple application programming interface ("API") through a standalone programming application. The underlying structure of the Interactive Agent is a symmetrical Client/Server configuration where both the Client and Server functions are required at each implementation. As shown in FIG. 3, a gateway for a network entity of trading partner A and a gateway for a network entity of trading partner B communicate via a frame relay network with T1 access lines.

An IA process sends and receives data using SSL3 libraries. In the preferred embodiment, interactions with the SSL3 libraries are in the form of SSL3 tool-kit functions.

In the preferred embodiment, each IA server should provide up to a maximum of 16 concurrent connections per network entity by using such technical approaches as multi-processing, multi-threading, or other comparable technology. Also, each SSL3 connection should support the transfer of a single EDI message. Thus, a session should exist only for the duration of a single EDI message, avoiding the potential of orphaned processes or sockets which may only be cleared by either an interruption in the client/server processes or a restart of the computing platform.

Figure 6:
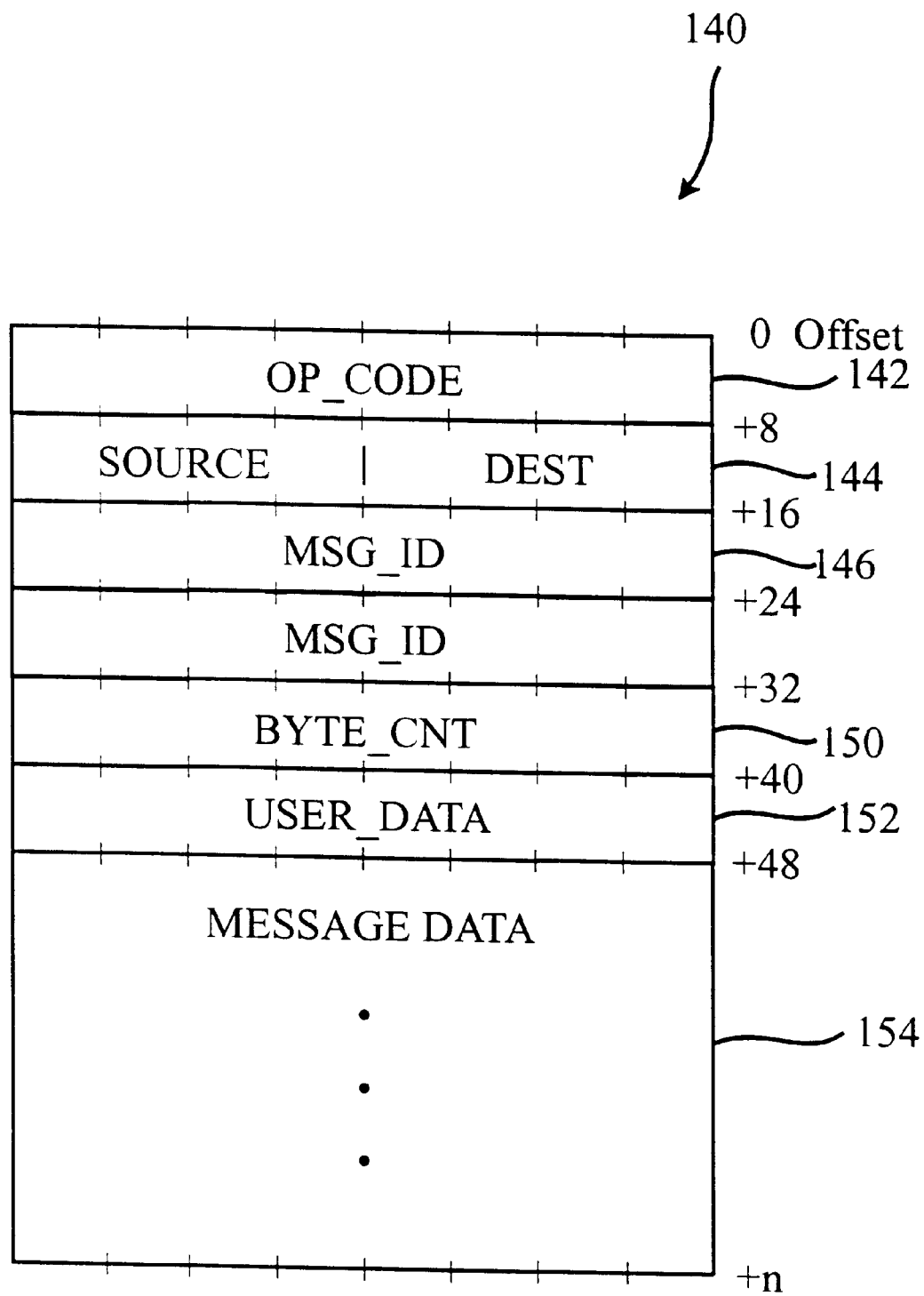
FIG. 6 is a block diagram of a data format for a message to be transmitted according to one embodiment.

FIG. 6 is a block diagram of a format for a message to be transmitted between the network entity of trading partner A and the network entity of trading partner B of FIG. 3. The message 140 includes a 48-byte header followed by a message in EDI format. This message format was designed for messages to be transmitted over the network configuration discussed previously with regard to FIG. 3. A 48-byte header communicates information about the EDI message so that a receiver can receive and decode an encrypted message. An op_code 142 occupies the first eight bytes of the transmitted message. All information in the 48-byte header is in ASCII text format. The first byte of the 8-byte op_code is an operation type which has a value of "0" for Pre-order or a value of "1" for Order. The second byte of the op_code is an Operation Action which has a value of "0" for status only, with no message, "1" for Acknowledgment, "2" for return, or "7" for Action. The third and fourth bytes of the op_code are an error code having a value of "00" for no error, a value of "01" for upstream down, indicating that some server or communications capability upstream from the gateway is down, as a signal to stop sending data, a value of "02" for upstream up, indicating that the server or communications capability has been restored, or a value of "03," indicating that a bad header has been received. The last four bytes of the op_code are padded with spaces. The next eight bytes of the header consist of a source and destination 144. A source value occupies the first four bytes, having, for example, a value of "U99" for a US West re-seller ID, or, for example, a value of "M02" for an MCI re-seller ID. A destination value occupies the next four bytes, having, for example, a value of "U99" for a US West re-seller ID, or, for example, g22 a value of "M02" for an MCI re-seller.

A msg_id 146 value for a message ID occupies the next eight bytes of the header. The msg_id 146 will have the value of a Purchase Order Number ("PON") for an Order, or the value of an Inquiry Number ("INQNUM") for a pre-order. The next eight bytes have the value of a byte_cnt 150, which is the value of the number of bytes in the accompanying message, excluding the header. A user_data field 152 occupies the next eight bytes, followed by the message data 154, which is the stream of EDI data to be transmitted.

FIGS. 7a–7h are process flow charts showing the method for the flow of data between a client and a server. After starting, in step 180 the server is initialized on port 7000, to listen for transmission from the client. In step 182, the client initiates a connection to the server, as further described below with regard to FIGS. 7b–7d. In step 184, the server accepts the connection from the client, as discussed further below with regard to FIGS. 7e–7f. Note that "establishing a connection" in an open network, such as the Internet, may involve creating a socket, which is a software technique to establish communication between nodes on a network. This is different from the conventional point-to-point techniques of modem-to-modem connects and disconnects.

In step 186, the client sends a message type/length and data to the server, as discussed further below with regard to FIG. 7g. In step 188, the server initiates closing the connection, as discussed further below with regard to FIG. 7h. Note that "terminating a connection" on an open network, such as the Internet, may involve closing a socket connection in software while two network entities continue to communicate through other software connections over hardware communications lines. Control is then returned to the calling system.

Figure 7A:
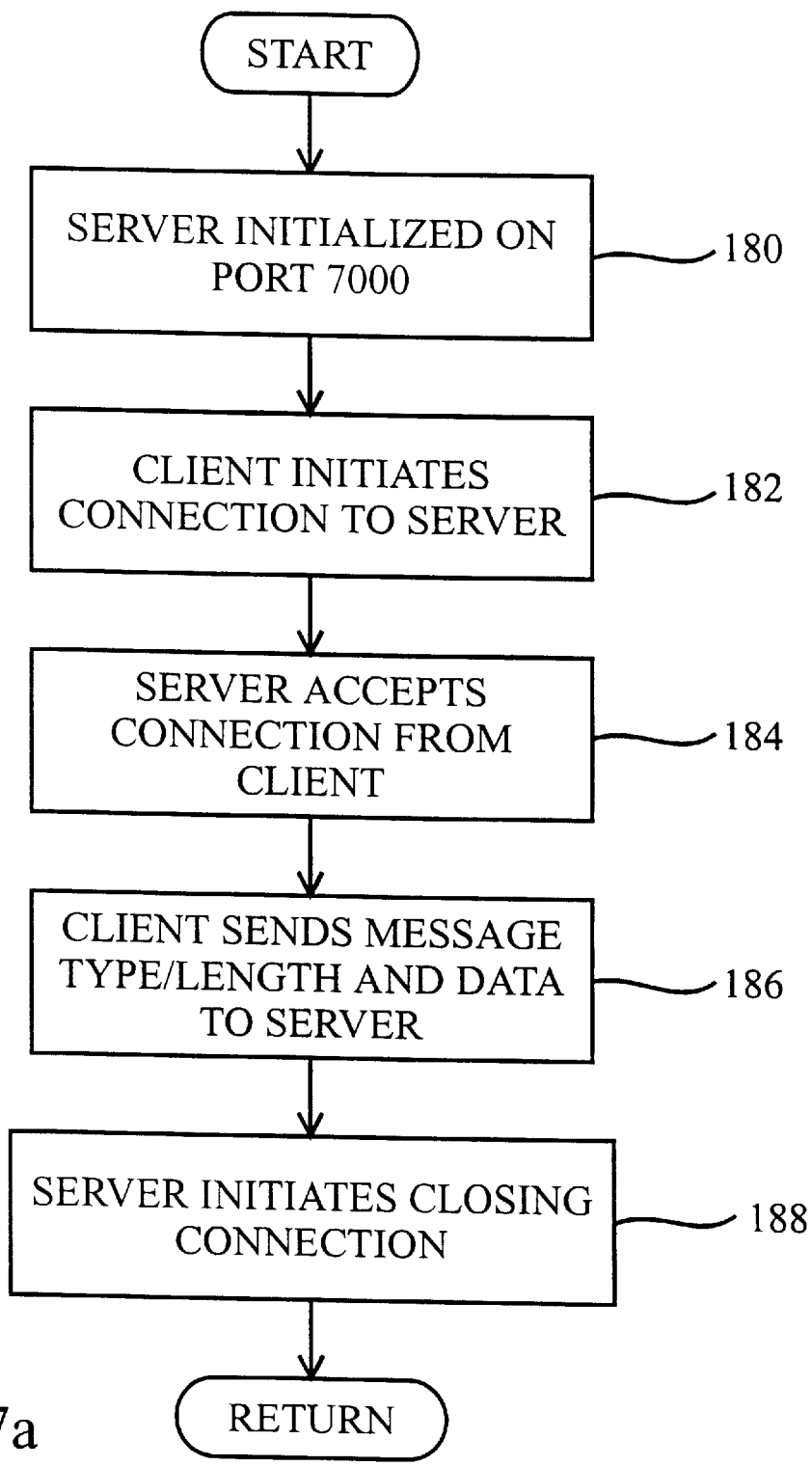
FIGS. 7a, 7b, 7c, 7d, 7e, 7f, 7g and 7h are process flow diagrams of the method for the flow of data between a client and a server.
Figure 7B:
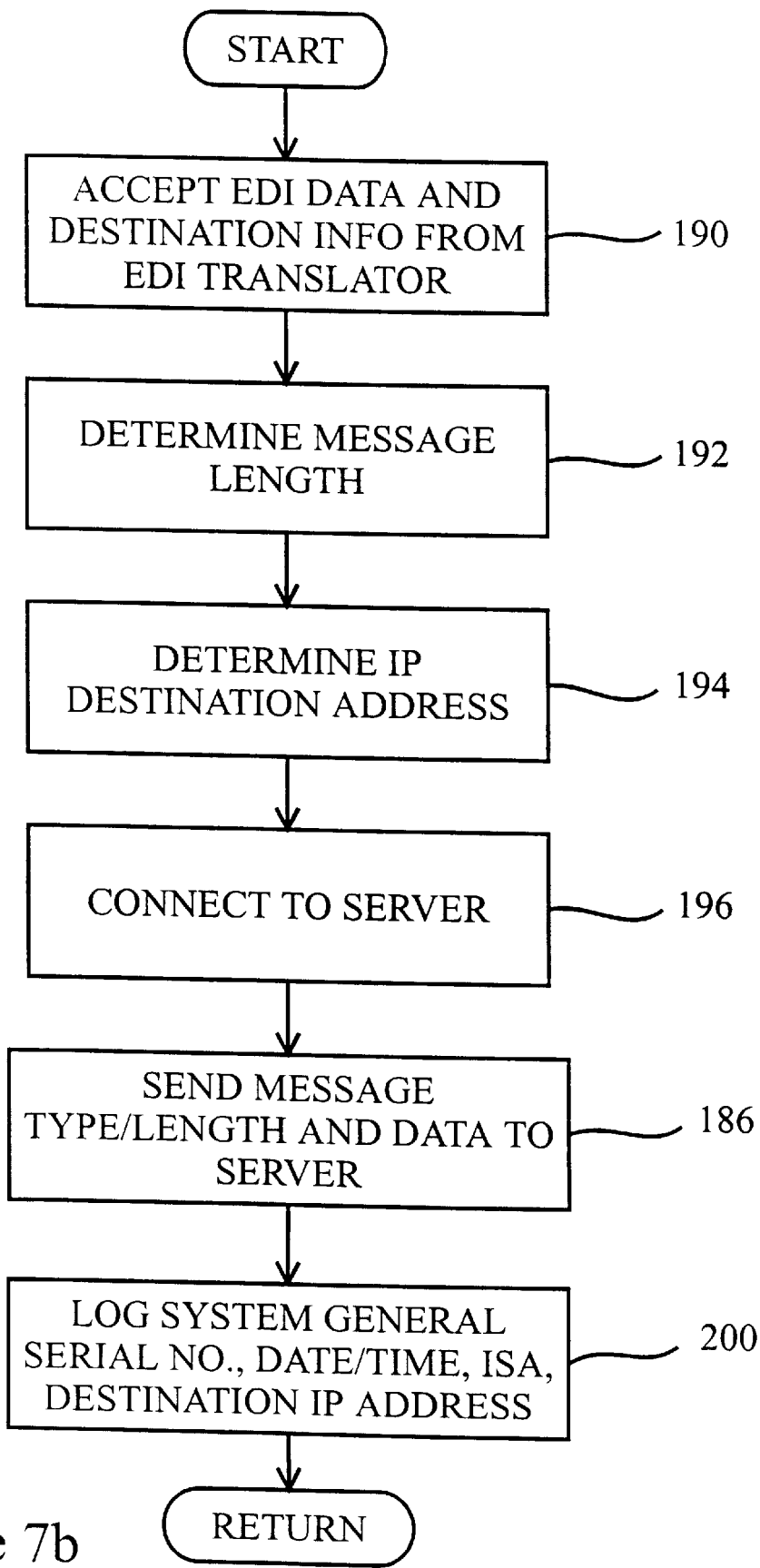

FIG. 7b is a process flow chart showing the overall method for the client initiating a connection to the server, as discussed above with regard to step 182 of FIG. 7a. After starting, in step 190 the client accepts EDI data and destination information from an EDI translator. In step 192, the client determines the message length of the EDI data which was accepted in step 190 as discussed above. In step 194, the client determines an IP destination address using the destination information which was accepted in step 190 as discussed above. In step 196, the client connects to the server, as further discussed previously with regard to step 184 of FIG. 7a and as discussed further below with regard to FIGS. 7c–7d.

In step 186 of FIG. 7b, as discussed previously with regard to FIG. 7a, the clients sends the message type/length and data to the server. In step 200 of FIG. 7b, the client logs a system general serial number, a date/time, an ISA, and the destination IP address. Control is then returned to the calling system.

Figure 7C:
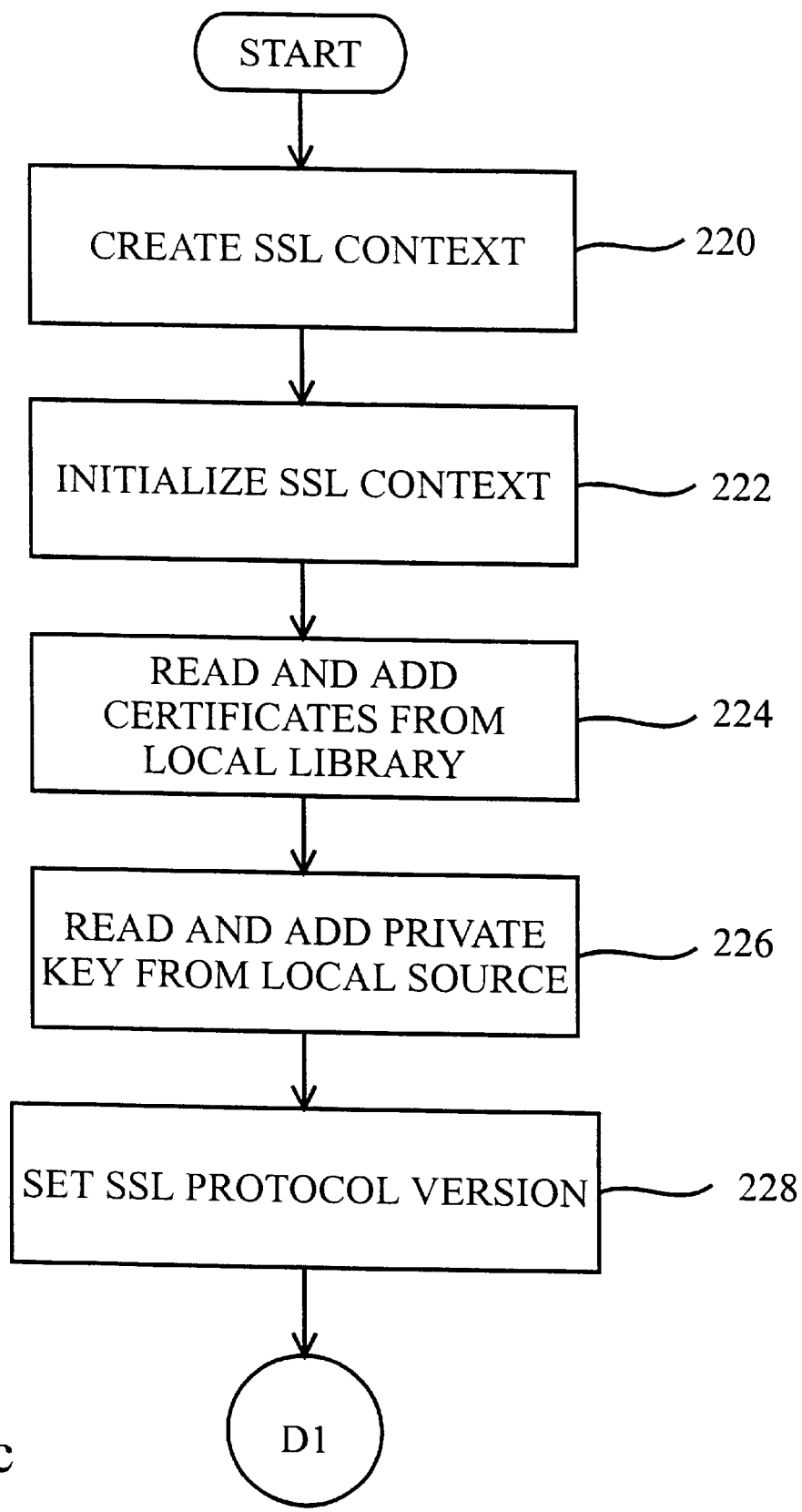
Figure 7D:
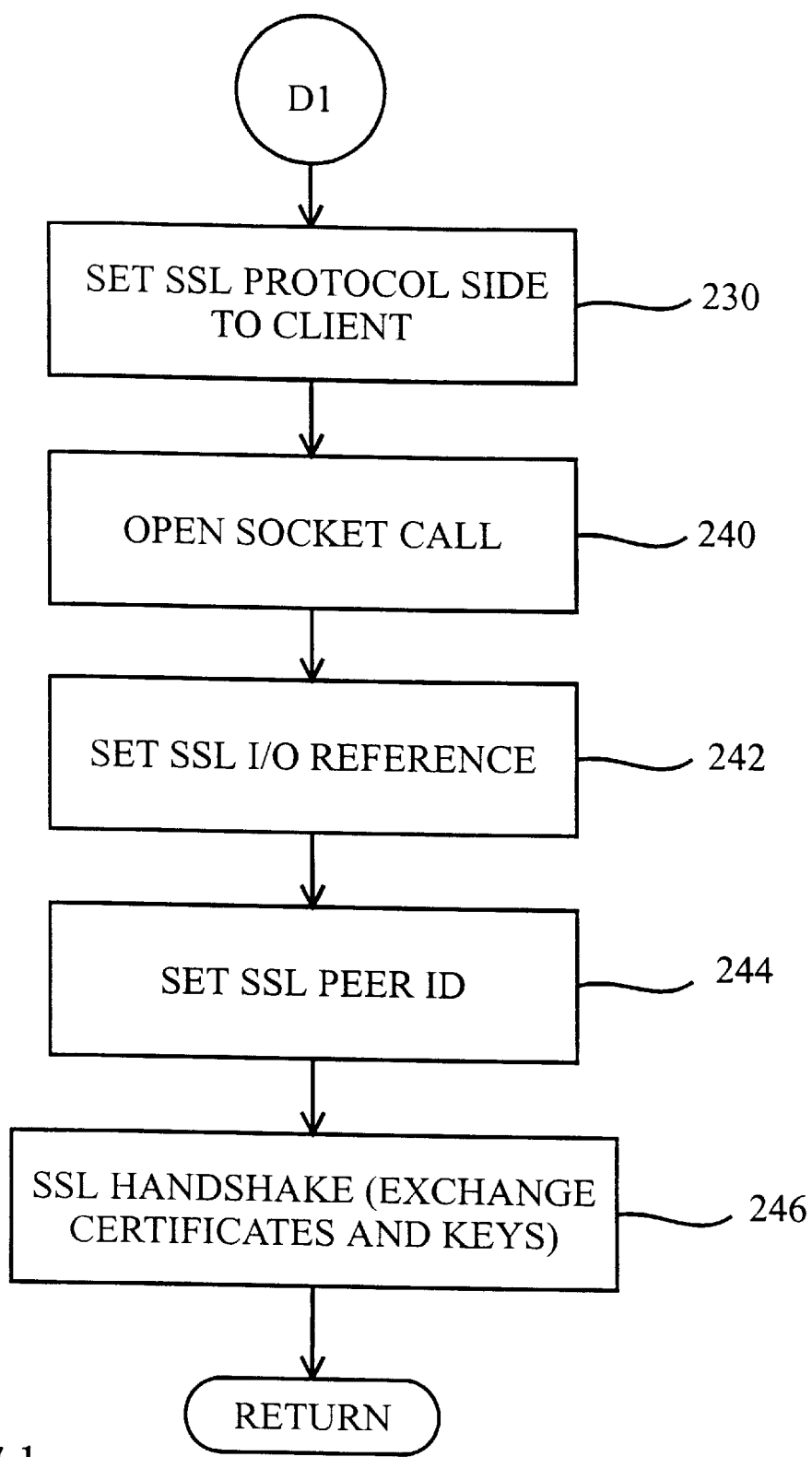

FIGS. 7c–7d are a process flow chart for the method of step 196 of FIG. 7b, wherein the client connects to the server. After starting, in step 220, the client creates an SSL context. A memory allocation is performed, and an opaque data structure known as a "context" is used to store cryptographic data associated with the individual connection, certificates, references to callbacks and various other data. An independent context must be maintained for each connection in the preferred embodiment.

In step 222, the client initializes an SSL context to initialize the internal values of the SSL context structure. This step must be performed before any other SSL Set function.

In step 224, the client reads and adds certificates from a local library. This step adds to the chain of certificates used when authenticating an SSL peer. A variation of this step adds trusted certificates to complete certificate chains.

In step 226, the client reads and adds a private key from a local source. This step specifies the private key to be used for signing and non-export key exchange. This key must match an installed public key. In step 228, the client sets an SSL protocol version. This parameter specifies which version of the SSL protocol may be used for the connection. In the preferred embodiment, this will normally be set to SSL Version 3 only. In step 230 of FIG. 7d, the client sets an SSL protocol side to the client. The current SSL instance is now set to be the client side of the connection. It is noted that clients may only connect to servers. In step 240, the client opens a socket, which is an identifier for a particular service on a particular node on a network. A socket comprises a node address and a port number, which identifies the service. For example, port 80 on an Internet node indicates a Web server. A client application creates a socket and then issues a connect to a service specified in a sockaddr_in structure. Exemplary code for an open socket operation is discussed below with regard to FIG. 16.

In step 242 of FIG. 7d, the client sets an SSL I/O reference to specify the reference parameter passed by the library to the I/O callback functions. This step configures the SSL context structure for later use.

In step 244, the client sets an SSL peer ID to uniquely identify the SSL peer associated with the current SSL connection. This set function is required in instances where session resumption capabilities are specified.

In step 246, the client initiates an SSL handshake for exchanging certificates and keys with the server. In an SSL handshake, the client performs a "client hello" operation, comprising sending a challenge, a session ID (if any) and cipher specifications. After receiving a "server hello," the client will perform a "send client" master key operation to send the clients master key encrypted by the server's public key. This is only performed for an initial session and is not done for a resumed session. The client then performs a "client finish" operation to transmit the connection ID encrypted by the client's write key. The server responds with a "server verify" function followed by a request for the client's certificate. The client then responds with its certificate data, encrypted by the client's write key. The server then executes a "server finish" function to ready the connection for passing data.

Upon receiving a certificate from a peer (i.e., client or server), the receiving party sends the certificate information from the SSL3 transport layer to the receiving party's IA to be saved and used for enhanced security such as non-repudiation. The same key pair/certificate used for authentication to the peer system will also be used for any digital signing that is required. Peers exchanging this type of data should agree to mutually acceptable Trusted Certificate Authorities. In the preferred embodiment, only certificates issued by these Trusted Authorities are exchanged or referred to in digital signatures.

Figure 7E:
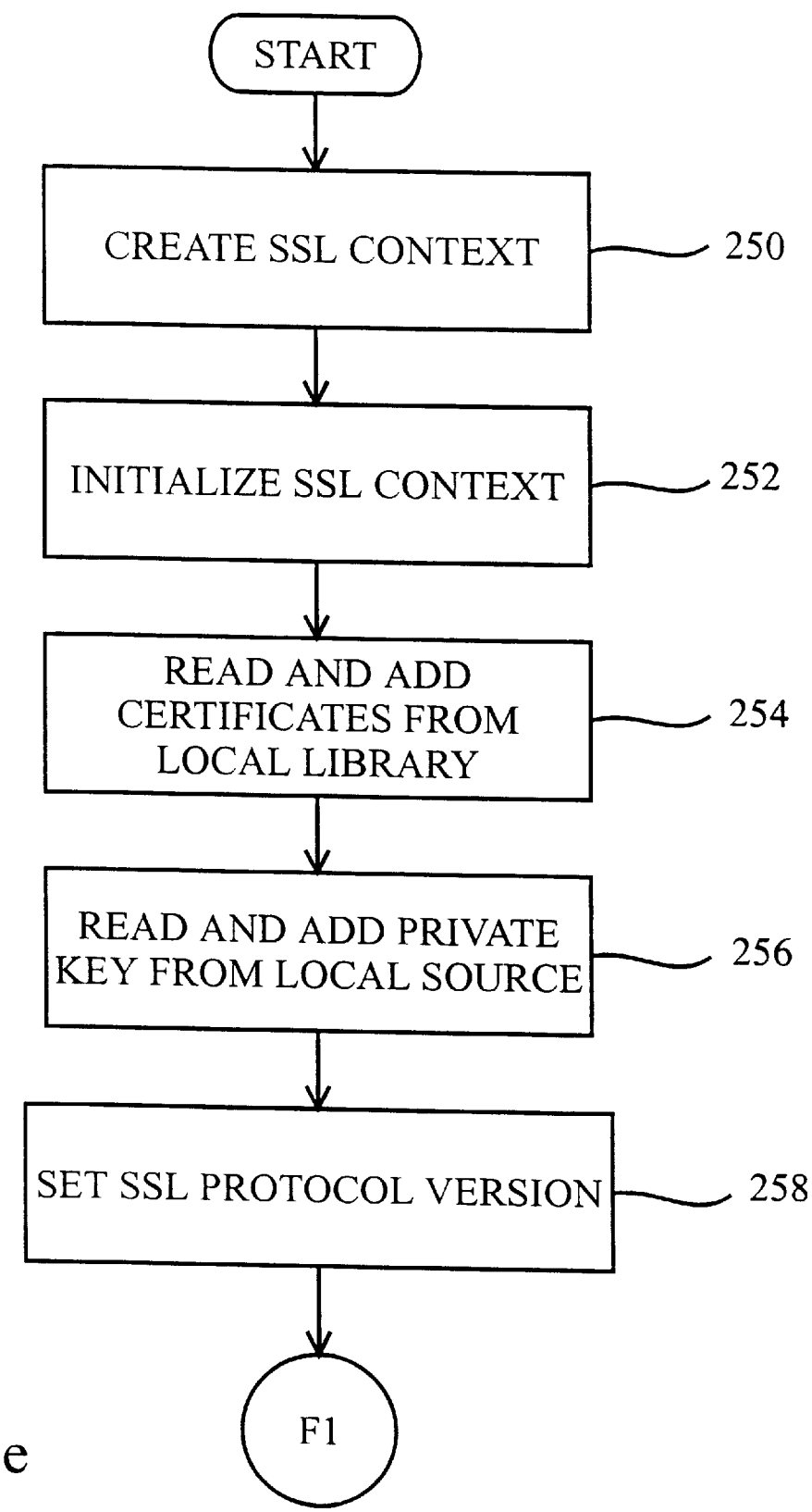
Figure 7F:
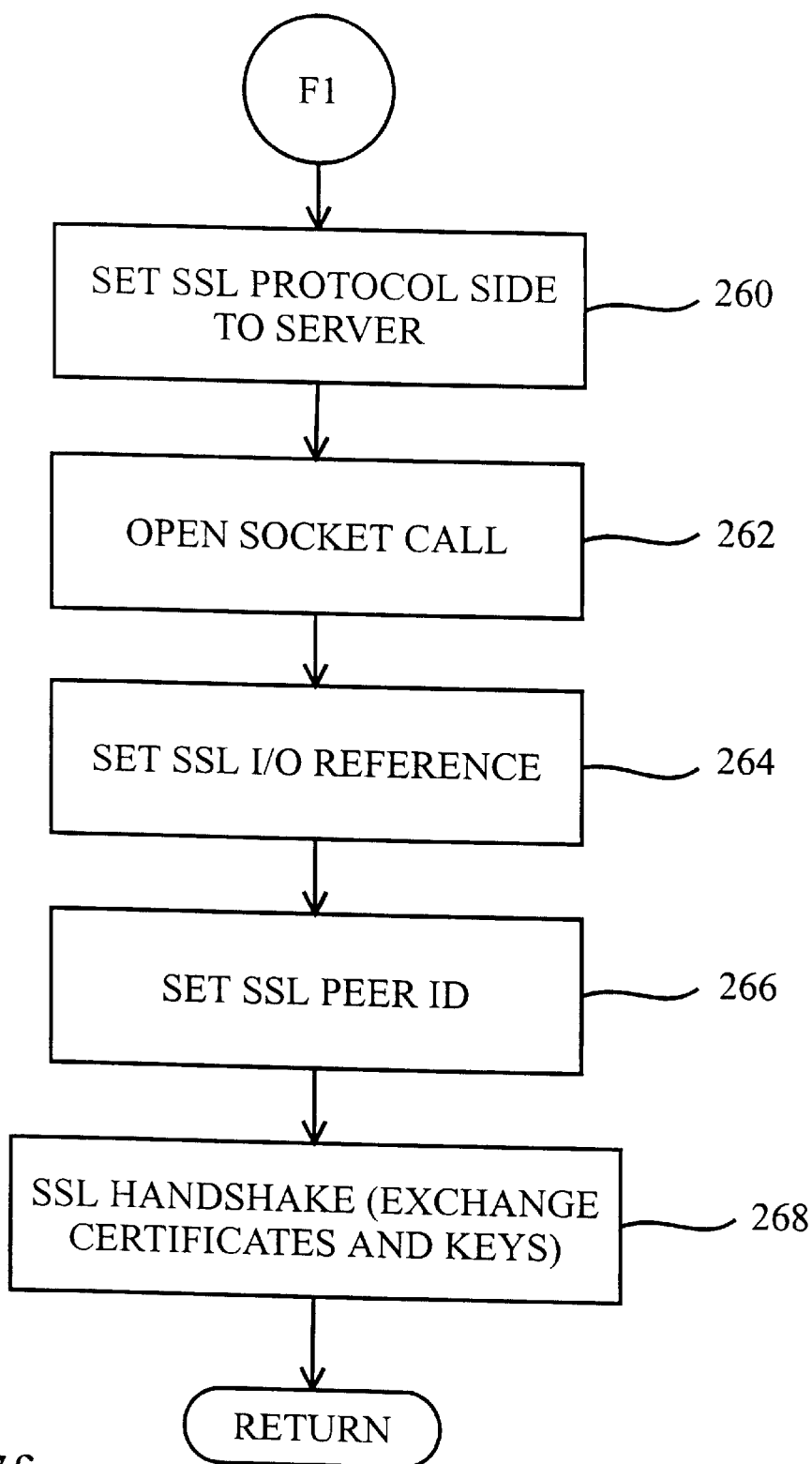

FIGS. 7e–7f are a process flow chart showing the method for the server accepting the connection from the client, as discussed previously with regard to step 184 of FIG. 7a. In step 250, the server creates an SSL context. Memory allocation is performed and an opaque data structure known as a context is used to store the cryptographic data associated with the current connection, certificates, references to callbacks and various other data An independent context must be maintained for each connection.

In step 252, the server initializes an SSL context, as discussed previously with regard to the client in step 222 of FIG. 7c. In step 254, the server reads and adds certificates from a local library, similarly to step 224 as discussed previously with regard to the client and FIG. 7c. In step 256, the server reads and adds a private key from a local source, similarly to step 226 discussed previously with regard to the client in FIG. 7c. In step 258, the server set an SSL protocol version, similarly to step 228 as discussed previously with regard to the client for FIG. 7c.

In step 260 of FIG. 7f, the server set an SSL protocol side to server. The current SSL instance is set to be the server side of the connection. It is to be noted that servers may only accept connections from clients. In step 262, the server opens a socket call similarly to step 240 as discussed previously with regard to the client for FIG. 7d.

In step 264, the server sets an SSL I/O reference similarly to step 242 discussed previously with regard to the client and FIG. 7d. In step 266, the server sets an SSL peer ID, similarly to step 244 as discussed previously with regard to the client for FIG. 7d.

In step 268, the server performs an SSL handshake to exchange certificates and keys with the client. After receiving the "client hello" from the client, as discussed previously with regard to step 246 of FIG. 7d, the server sends a "server hello" having the connection ID and either a session ID or the server certificate and cipher specifications, depending on whether this is an initial or a resumed session. The server then waits for the "client finish" message to be received. The server then responds with a "server verify," which is a challenge encrypted with the server write key. The server then requests a certificate from the client by sending an Auth Type Challenge encrypted by the server write key. The client then responds with its client certificate. The server then sends a "server finish" message having the session ID encrypted by the server write key. This completes the process to prepare the connection to pass data. Control is then returned to the calling system.

Figure 7G:
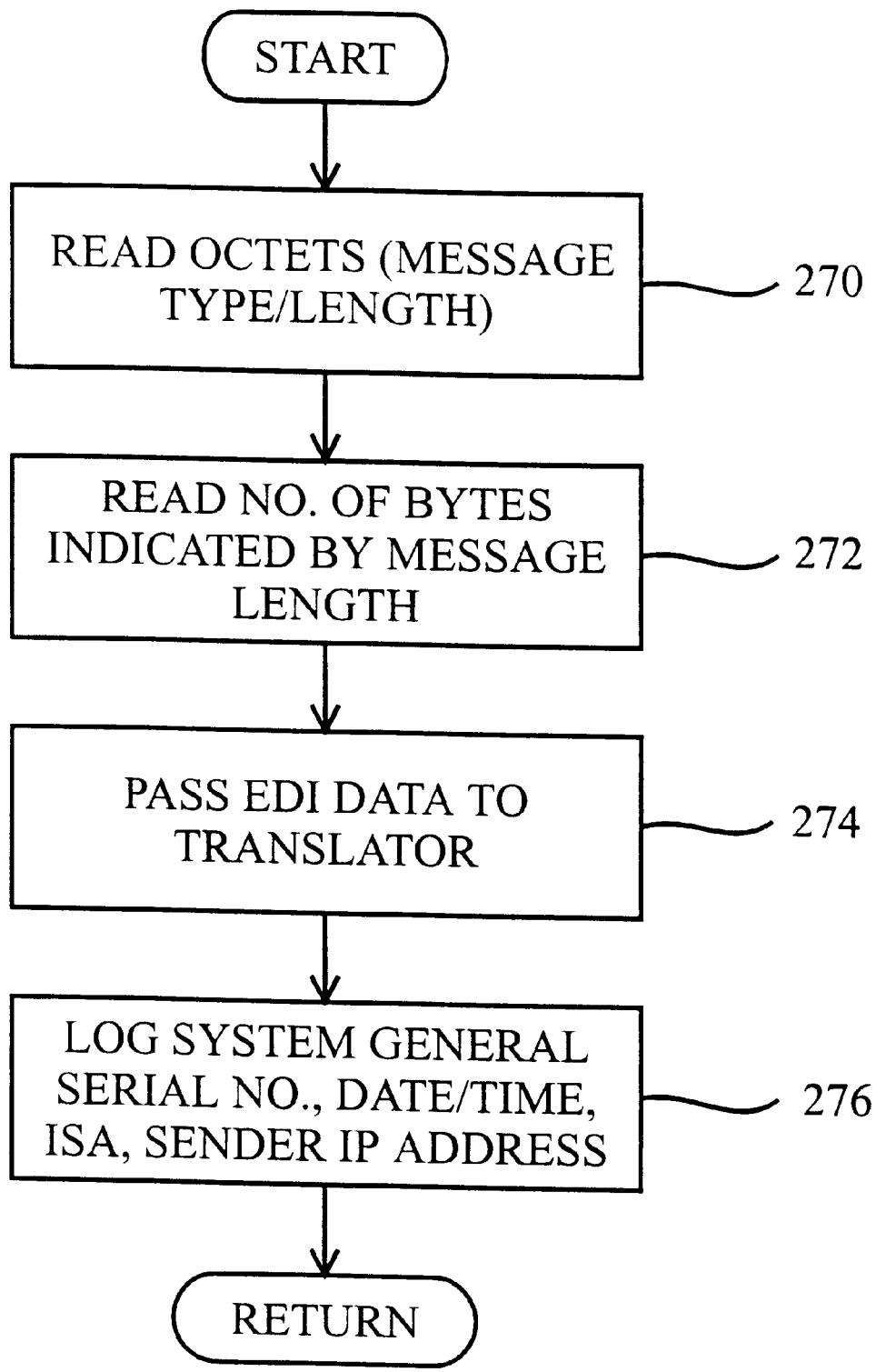

FIG. 7g is a process flow chart showing the method used by the server for receiving the message type/length and data send by the client to the server as discussed previously with regard to step 186 of FIG. 7a. After starting, in step 270, the server reads octets of the message type and length. An SSL Read of 2 bytes is performed. The first byte is an ASN.1 tag, and the second byte defines a size of a message length field. The first read operation determines the number of bytes for the second read operation. The second read operation determines the total length of all subsequent data. The third read operation then reads all the subsequent data. In the preferred embodiment, these steps are accomplished using an SSL Read () function.

In step 272 of FIG. 7g the server reads the number of bytes indicated by the message length, as discussed above with regard to step 270. After the reads are completed, in step 274, the server passes EDI data to a translator.

In step 276, the server logs a system general serial number, a date and time, an ISA segment, and a sender IP address which is a remote IP address and local port number. Control is then returned to step 188, as discussed previously with regard to FIG. 7a.

Figure 7H:
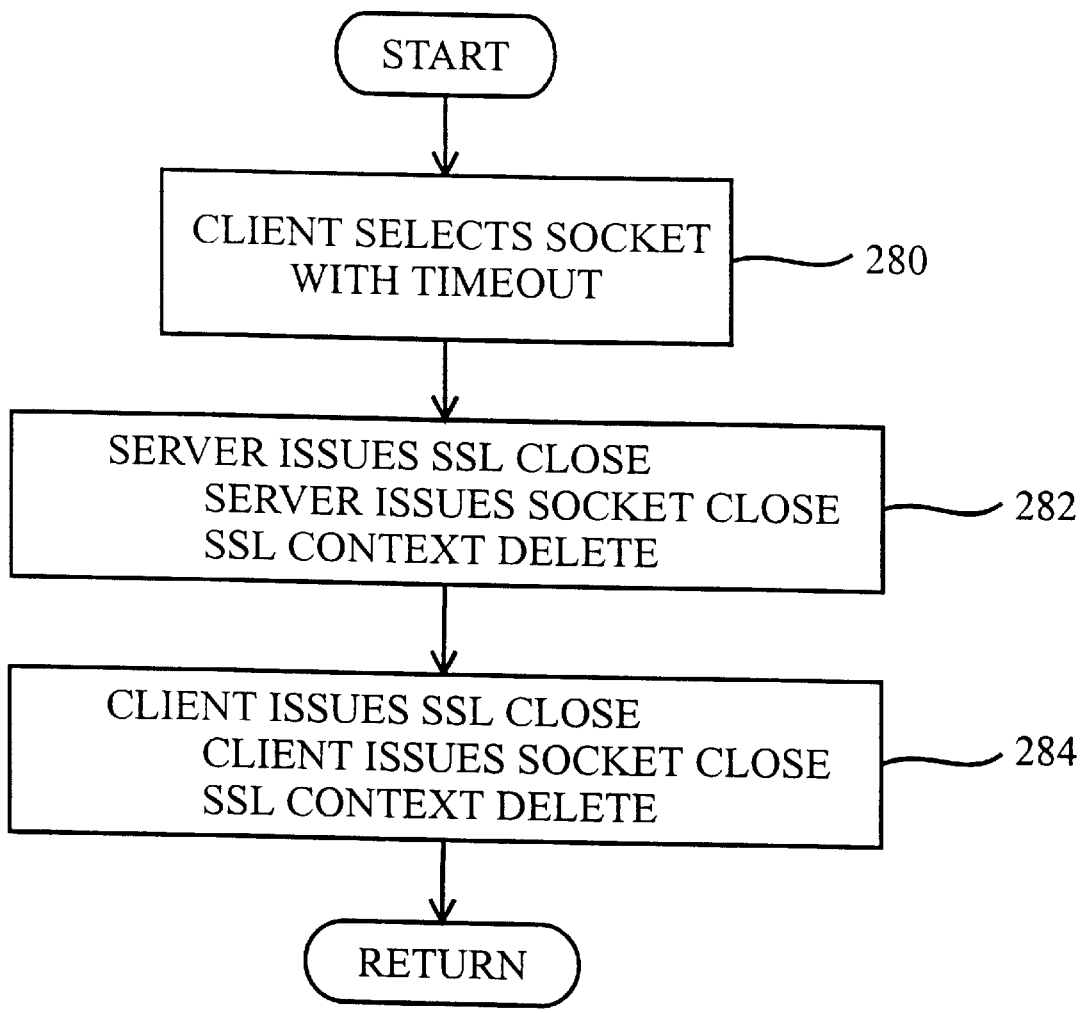

FIG. 7h is a process flow chart showing the method for step 188 of FIG. 7a. After starting, in step 280 of FIG. 7h, the client selects a socket with timeout. This allows the client to determine a successful/unsuccessful transmission of data after passage of a predetermined time even though the client does not receive notice that the server has completed a socket close operation. In step 282, the server issues an SSL close. The server issues a socket close and the SSL context is set to delete. In step 284, the client similarly issues an SSL close. The client issues a socket close and the SSL context is set to delete. Control is then returned to the calling system.

The SSL close function closes the SSL session with the peer. No further communications are then expected for this particular session. The server closes the socket connection with the socket close () function, passing the socket descriptor as a parameter. The SSL context delete function typically releases the resources utilized by the SSL connection. Note that this is only performed if the current session is to be terminated and is not performed for sessions that may later be resumed. Depending on implementation, the memory used by the context structure may have to be deallocated after the context delete.

In order to meet both business and security needs of various companies, three levels of security have been defined. The three levels are basic security, for plain text or message privacy encryption only, enhanced security with message integrity support, and enhanced security with non-repudiation, which includes message privacy and message integrity. Discrete message formatting requirements are associated with each of these three security levels. In addition, a fourth format has been defined for communication of status between Interactive Agents. FIGS. 8a–8d and FIGS. 9a–9d are block diagrams showing the four formats. Each message type is to be encoded in accordance with Abstract Syntax Notation 1 ("ASN.1") and its associated encoding rules Basic Encoding Rules ("PER") and Distinguished Encoding Rules ("DER"). These rules are fully described in Rec. X.690 (1994), ISO/IEC 8825-1:1995, *Information Technology-ASN.1 encoding rules: Specification of basic Encoding Rules (BER), Canonical Encoding Rules (CER) and Distinguished Encoding Rules (DER)*, which is incorporated herein by reference. While either BER or DER may be used to encode these messages, DER are used for the preferred embodiment.

Although the four formats are treated distinctly, all four formats are variants based on secure messaging services and protocols expressed using ASN.1 notation. An optional fifth format, IA Message Receipt is discussed below with regard to FIGS. 10a–10c.

FIG. 8a is a block diagram illustrating a format of a basic EDI message 300. A first portion of the message to be transmitted is a message type and length 302, followed by the EDI message 304.

FIG. 8b is a block diagram illustrating a format for an EDI message with message integrity 320. A first portion of the message 320 is a message type and length 322, followed by the EDI message 324, followed by a message digest 326.

FIG. 8c is a block diagram illustrating a message format architecture for EDI message with non-repudiation 340. A message type and length 342 is followed by the EDI message 344, followed by a digital signature 346.

FIG. 8d is a block diagram showing a message format architecture for an IA status message 360. A message type and length 362 is followed by a status message 364.

FIGS. 9a–9d are block diagrams illustrating the message formats as discussed previously with regard to FIGS. 8a–8d message format architectures.

FIG. 9a is a block diagram of a message format for a basic EDI message 300. A header1 302 includes a message type and length. The EDI message 304 follows the header1 302.

FIG. 9b is a block diagram illustrating the message format for an EDI message with message integrity 320, as discussed previously with regard to FIG. 8b. A header1 321 includes a message type and length, followed by a header2 323 having an EDI message tag and length. Following the header2 323 is an EDI message 324, followed by a header3 325, which includes a message digest tag and length. Following the header3 325 is a message digest 326 which is created by using a hash algorithm (SHA1).

After receiving a message of the type EDI with message integrity 320, the recipient calculates a message digest of the EDI data portion 324 of the message, using the algorithm specified in the message. The calculated message digest is then compared with the message digest received with the message 320 and an exact match verified. If the message digests match, the EDI data is forwarded to the EDI translator for the recipient and a successful reception is written to a log file.

FIG. 9c is a block diagram illustrating a message format of an EDI message with non-repudiation 340, as discussed previously with regard to FIG. 8c. A header1 341 includes a message type and length, followed by a header2 343, which includes an EDI message tag and length, followed by an EDI message 344. Following the EDI message 344, a header4 345 includes a digital signature tag and length, followed by a digital signature, including a hash algorithm (SHA1), a sender's certificate information, a hash encryption algorithm, and a message digest encrypted using a sender's private key.

After receiving a message of the type EDI with non-repudiation 340, the recipient calculates a message digest of the EDI data portion 344 of the message, using the algorithm specified in the message. The message digest received from the sender is then decrypted using the decryption key referenced in the message. The calculated message digest is then compared with the message digest received with the message 340 and an exact match verified. If the message digests match, the EDI data is forwarded to the EDI translator for the recipient and a successful reception is written to a log file.

FIG. 9d is a block diagram illustrating the format of an IA status message 360 as discussed previously with regard to FIG. 8d. A header1 362, including a message type and length, is followed by an IA status 364 which is an encoded IA status. The IA status message consists of an identifying header and four octets (each octet consists of eight bits) containing status information. The first octet is utilized for status conditions pertaining to the wide area interface of the IA (i.e., TCP/IP and SSL3). Interpreting the octet as two hexadecimal values in the range from 00 to FF, values defined for the current embodiment include a value of 00 for NULL (no error or action) and 08 for a request for a peer to cease transmissions on inbound data stream due to problems with the Wide Area Network ("WAN") interface.

The second octet is utilized for status conditions pertaining to the downstream systems on the local interface (i.e., the EDI translator or other related, downstream system). Values defined for the current embodiment include a value of 00 for NULL and a value of 08 for a request for a peer to cease transmissions on inbound data stream due to problems with the IA communicating with an EDI translator or other downstream processing systems. The third and fourth octets are available for pairwise definitions. Parties to a pairwise agreement may define the values of the third and fourth octets in any manner they choose. It is recommended that the third and fourth octets be utilized to either convey their own independent meanings when the first two octets contain 00 00, or they may be used as amplifying identifiers in instances where either of the first two octets are non-zero.

As an illustration of sample IA status messages, the message "00 08 00 00" is a message sent to a peer requesting no further transmission due to a downstream problem. A message having a value of "08 00 00 00" communicates problems with an inbound WAN, so the peer should cease transmissions.

As part of a pairwise agreement, companies may choose to enable IA "positive receipts." Three different receipt types have been defined for the current embodiment to allow receipt types to be matched with the three existing IA message formats. Although it is not required that the selected receipt type match the format of the original data message, it is recommended that the two formats match.

FIG 10a is a block diagram illustrating the format of a basic receipt 380. A header1 382 includes a message type and length followed by an IA receipt 384. When the basic receipt format 380 is utilized, the EDI message is parsed to extract the ISA segment. A date/time stamp is appended to the ISA forming the receipt. The information is formatted in accordance with the syntax to be discussed below with regard to FIG. 15, and is then returned to the originator.

FIG 10b is a block diagram illustrating a format for a receipt with message integrity 390. A header1 392, including a message type and length, is followed by an IA receipt 394. The IA receipt 394 is followed by a header3 396 which includes a message digest tag and length, followed by a message digest 398 which includes an SHA1 message digest algorithm. Receipts with message integrity extend the basic receipt by adding a message digest of the original EDI data.

FIG. 10c is a block diagram illustrating a format for a receipt with digital signature (non-repudiation) 400. A header1 402 includes a message type and length, followed by an IA receipt 404. Following the IA receipt 404 is a header4 406 having a digital signature tag and length, followed by a digital signature 408, having an SHA1 message digest algorithm and an RSA digital signature algorithm. Receipts with digital signatures extend the basic receipt of FIG 10a by adding a digitally signed acknowledgment of the original EDI message.

FIG. 11 illustrates a syntax for basic EDI messages and object identifiers referenced by basic EDI messages. A PlainEDIMessage 420 is a sequence having a content type object identifier 422 and an explicit octet string 424 which is the EDI message. A pkcs-7 object identifier has an ISO, a member body, a code for US, a code for rsadsi, pkcs, and 7. A content type object identifier 428 has a pkcs-7 as discussed above, and 1 for EDI data.

FIG. 12 illustrates a syntax for an EDI message with message integrity. It is recommended that a user utilize privacy enhanced security when sending an EDI message with message integrity. An IntegrityEDIMessage 450 is a sequence having an IntegrityType object identifier 452, an IntegrityContent 454 which is an explicit sequence having a version 456 of data type integer, a DigestAlgorithm 458 having data type AlgorithmIdentifier, and a ContentInfo 460 having data type sequence. The ContentInfo 460 sequence has a contentType 462 having data type object identifier, and an ediMessage 464 having data type explicit octet string. The IntegrityEDIMessage 450 sequence is terminated by a digest 466 having data type octet string. Object identifiers referenced by EDI messages with message integrity are described below. AlgorithmIdentifier 470 is a sequence having an algorithm 472 of data type object identifier and parameters 474 having a null data type.

A pkcs-7 476 object identifier has an ISO, a member body, a code for US, a code for rsadsi, a pkcs, and 7. An IntegrityType 478 has a value of pkcs-7 and 5.

A contentType 480 object identifier has a value of pkcs-7 and 1.

A digestAlgorithm 482 object identifier has value SHA1. A SHA1 484 object identifier has value "1 3 14 3 2 26".

FIG. 13a illustrates an ASN.1 syntax for EDI messages with nonrepudiation. A SignedEDIMessage 500 is a sequence having a SignedType object identifier 502, followed by a signedContent explicit sequence 504. The signedContent 504 explicit sequence includes a version 506 having data type integer, a digestAlgorithms 508 having data type set of AlgorithmIdentifier, and a contentInfo 510, which is a sequence. The ContentInfo 510 sequence has a contentType 512 object identifier and an ediMessage 514 of data type explicit octet string. The signedContent 504 explicit sequence further includes signerInfos 516 having type set of sequence. The signerInfos 516 set of sequence includes a version 518 of data type integer, and an issuerAndSerialNumber 520 of type sequence, which includes an issuercountry 522 which has type sequence of set of sequence having a country 524 object identifier and a value 526 PrintableString. TheissuerAndSerialNumber 520 sequence further includes an issuerOrg 528 which is a sequence of set of sequence including an org 530 object identifier and a value 532 having data type PrintableString. The issuerAndSerialNumber 520 sequence further includes a serialNumber 534 having data type integer. The signerInfos 516 set of sequence further includes a digestAlgorithm 536 having data type AlgorithmIdentifier, a digestEncryptionAlgorithm 538 having data type AlgorithmIdentifier, and an encryptedDigest 540 of data type octet string.

FIG. 13d illustrates object identifiers which are referenced by EDI messages with non-repudiation. An AlgorithmIdentifier 550 is a sequence which includes an algorithm 552 object identifier and parameters 554 which are null.

A pkcs-7 556 object identifier includes an ISO, a member body, a code for US, a code for rsadsi, a pkcs, and 7 558.

A signedType 560 object identifier includes a pkcs-7 and 2 for signed EDI data. A contentType 562 object identifier has a pkcs-7 and 1 for EDI data. An rsadsi 564 object identifier includes 1, 2, 840 and 113549. An SHA1 566 object identifier includes 1, 3, 14, 3, 2 and 26. An rsaEncryption 568 object identifier includes rsadsi, 1, 1 and 1.

FIG. 14 illustrates the syntax for an IA status message as discussed previously with regard to FIGS. 8d and 9d and IaStatusMessage 600 is a sequence which includes a contentType 602 object identifier and a statusCode 604, which is an explicit bit string.

FIG. 15 illustrates an syntax for optional IA receipts as discussed previously with regard to FIGS. 10a–10c and IaReceiptMessage 620 is a sequence which includes a contentType 622 object identifier and a receiptContent 624 explicit sequence. The receiptContent 624 explicit sequence includes an isaSegment 626 octet string, which is the first 105 octets of the EDI data message, a dateTimeStamp 628 of type UTCTime. UTC time is formatted as CCYYMMDDhhmmssZ where CC is the century, YY is the year, MM is the month, DD is a day value, hh is an hour value, mm is a minute value, ss is a second value, and Z is a time zone Zulu, which is UTC time. The date and time in the time stamp should be the time that the receiving party receives the complete message being receipted. Using coordinated universal time in the receipt avoids time zone ambiguities. The receiptContent 624 explicit sequence further includes an enhancement 630 of type Enhancements, which is optional.

Enhancements 632 are defined as a choice of a withDigest 634 having type WithDigest, or withDigSig 636 having type WithDigSig. WithDigest 638 is defined as an explicit sequence which includes a digestAlgorithm 640 of data type DigestAlgorithm and a messageDigest 642 of type octet string. The messageDigest 640 in a receipt message is the digest of the message being receipted. If the message being receipted was of the EDI width message integrity format, the digest is that which was received with the message and which was verified by the recipient. If the original message was of any other data type, this digest will need to be calculated by the recipient using the EDI message data as input to the specified message digest algorithm. A WithDigSig 644 is defined as an explicit sequence including a signatureAlgorithm 646 of data type SignatureAlgorithm, and a digitalSignature 648 of data type octet string. The digitalSignature 648 in a receipt message is computed by formatting a concatenation of the ISA segment of the EDI message (105 octets), the dateTimeStamp of the receipt (15 octets), and the digital signature (96 octets, assuming a 768-bit key) received with the original message. This 216 octet structure is then signed by encrypting it in accordance with the RSA digital signature algorithm using SHA-1 as the digest algorithm and the receipt generating party's private key. The party receiving the receipt should construct a concatenation of the ISA segment of 105 octets (from either the transmitted message or the body of the receipt), the dateTimeStamp 628 of 15 octets (from the body of the receipt), and the digital signature from the original message (96 octets if a 768-bit key is used). This concatenated structure, together with the digitalSignature 648 received in the receipt should be passed to the digital signature verification algorithm. The receipting party's public key is used to verify the signature.

Object identifiers referenced by IA receipt messages are discussed below. A DigestAlgorithm 650 includes 1, 3, 14, 3, 2 and 26 for SHA1. A SignatureAlgorithm 652 includes rsadsi, 1, 1, and 5 for SHA-1 with RSA encryption. An rsadsi 654 object identifier includes 1, 2, 840 and 113549.

FIG. 16 illustrates exemplary software code for an open socket operation as discussed previously with regard to step 240 of FIG. 7d. A client application creates a socket and then issues a connect to a service specified in a sockaddr_in structure. A function tcpopen 700 is defined to be of type integer and having arguments host and service, both defined as data type pointer to character on line 702. A variable unit 704 is declared to be of data type integer. A structure sin 706 is defined to be of type sockaddr_in. A structure sp 708 is defined to be of type pointer to servent. A structure hp 710 is defined to be of type pointer to hostent. In line 712, a function getservbyname is called, sending arguments of service and "tcp" to assign a returned value to the variable sp. If the value returned is null, an error is reported.

On line 714 a function gethostbyname is called, sending an argument host, assigning a returned value to the variable hp. If the value returned is null, then an error is reported. In line 716 a function bzero is called sending values of the address of the structure sin and the value of the size of the structure sin. Other code related to opening the socket is then included. In line 718, a function socket is called with arguments AF_INET, SOCK_STREAM and 0, assigning the return value to the variable unit 704. If the value of unit 704 is less than 0, an error is reported. In line 720, a function connect is called with arguments unit 704, a reference to the structure sin 706, and the value of the size of the structure sin 706. If the value returned is less than 0, an error is reported. Line 722 then returns a value of the variable unit 704. The result returned is a file descriptor which is connected to a server process. A communications channel is one on which a user can conduct an application specific protocol.

In order for a sever to accept connections, a socket is created and bound to a service port. A queue for incoming connections is specified. FIG. 17 illustrates a sample code fragment for accepting the connections, as discussed previously with regard to step 184 of FIG. 7a. A structure sp 750 is defined to have data type pointer to servent. In line 752 of FIG. 17, structures sin and from are defined as type sockaddr_in. In line 754, a function getservbyname is called with arguments service and "tcp" to assign the returned value to the variable sp 750. If the returned value is NULL, an error is reported. In line 756, a variable sin_family of the structure sin is assigned a value in code related to initialization of the server.

In line 758, the function socket is called with arguments AF_INET, SOCK_STREAM and 0 to assign the returned value to a variable s. If the returned value is less than zero, an error is reported.

In line 760, a function bind is called with arguments variable s, the address of the structure sin, and the value of the size of the structure sin. This function call binds a process to the port. If the value returned from the function call is less than zero, an error is reported. In line 762 a function listen is called with arguments variable s and QUELEN. If the value returned is less than zero, an error is reported. The server thereby listens to the port for connection requests.

After a connection request is received, a socket is created. For example, when using a multiprocessing scheme, connections are made and the process forks off a child process to handle that service request, as discussed below. The parent process continues to listen for and accept further service requests.

In line 764 a for statement is executed with null terminating conditions specified. Lines 766, 768, 770, 772, and 774 illustrate an exemplary code segment for the for statement. In line 766, an accept function is executed with arguments variable f, an address of the structure from, and an address of variable len, assigning the returned value to a variable g. If the returned value is less than zero, an error is reported. In line 768 a function fork () is called. If the value returned is false, then in line 770, a child handles a request, and exits in line 772 with an exit instruction on line 774. Otherwise, the for loop of lines 766, 768, 770, 772, and 774 is repetitively executed until a call to fork () on line 768 returns a value of false. In line 776, a function close is called with argument variable g so that the parent releases a file.

Figure 18A:
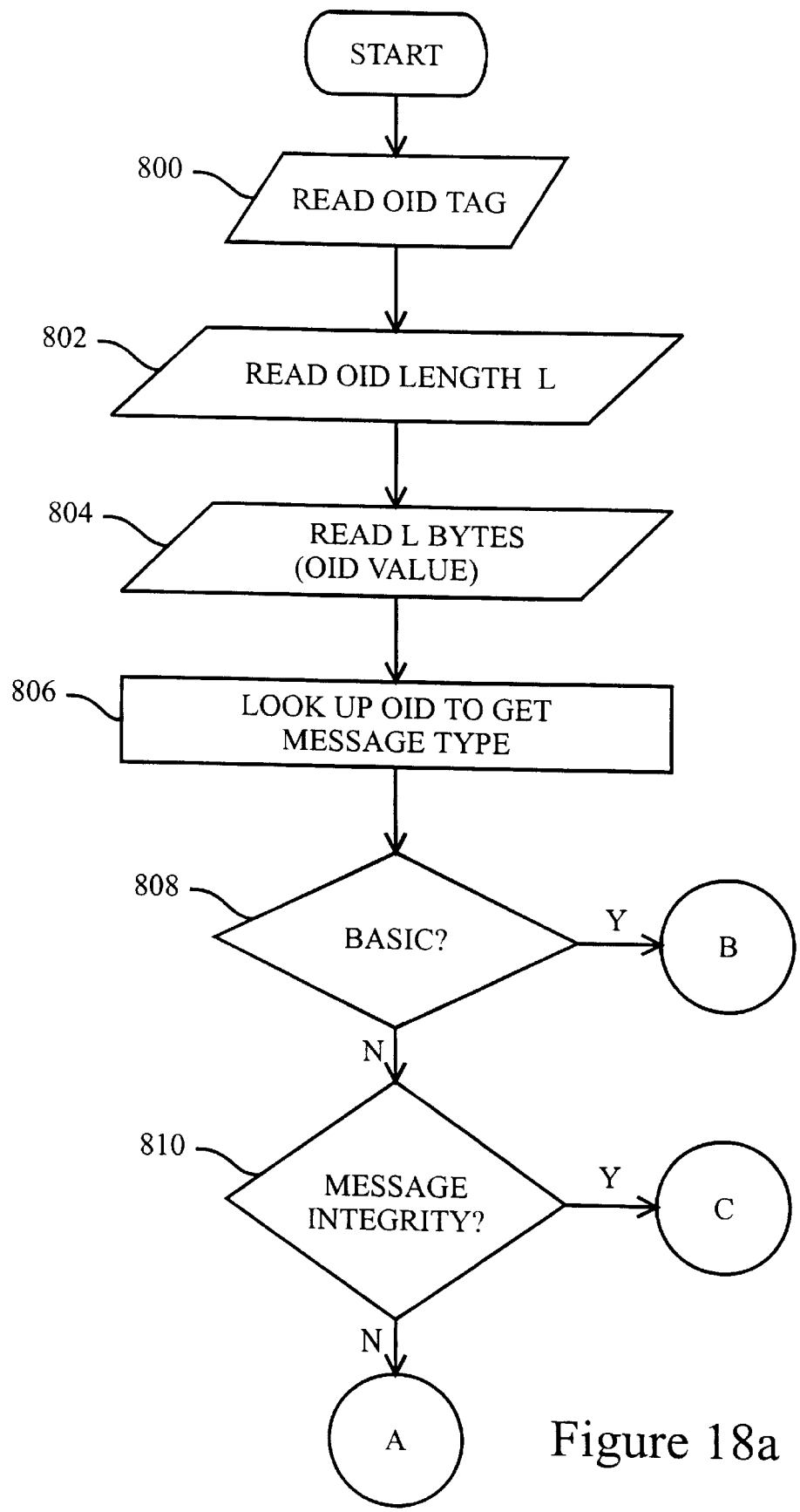
FIGS. 18a–18b are a process flow chart for an exemplary method for parsing incoming messages by an Interactive Agent according to the invention.
Figure 18B:
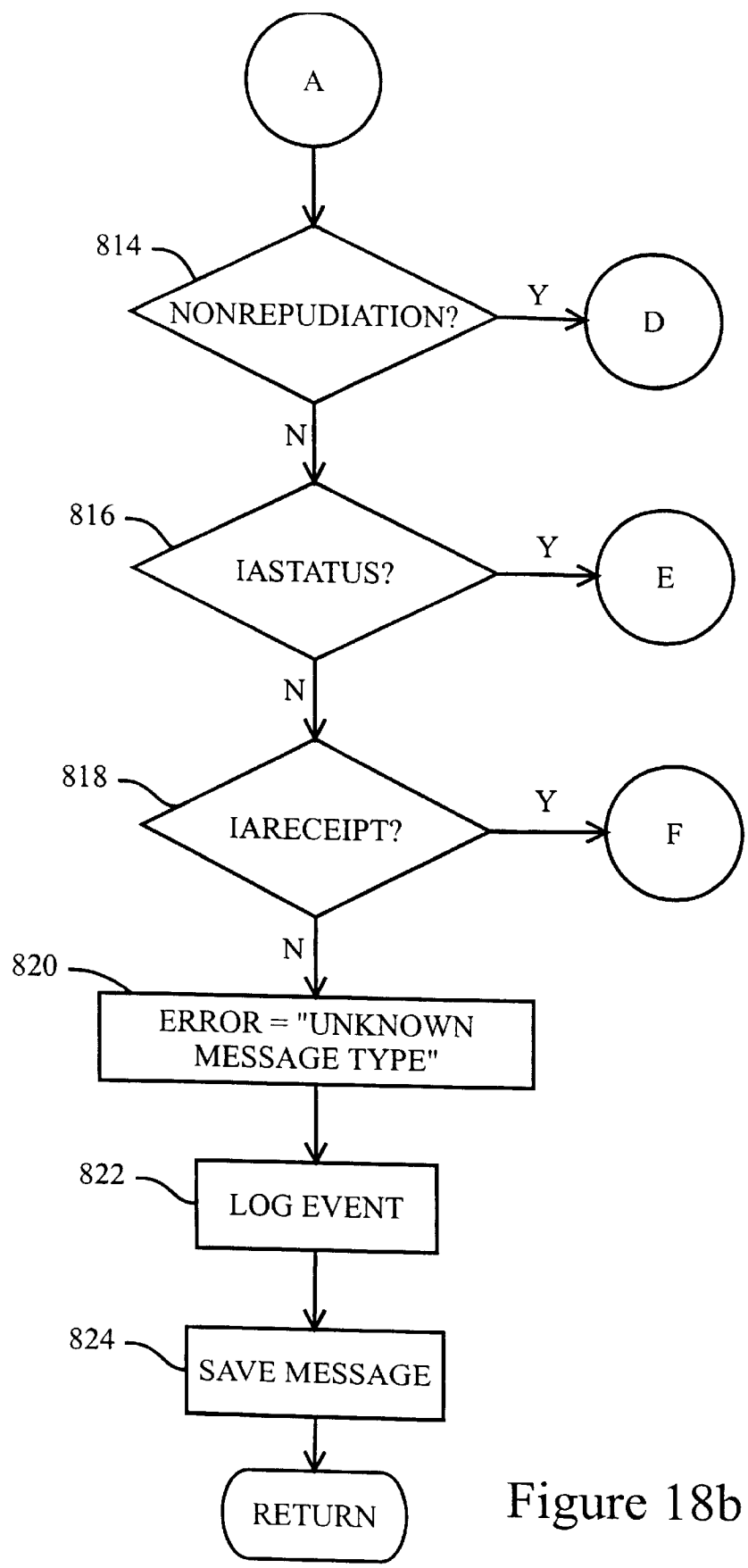

FIGS. 18a–23c are process flowcharts showing an exemplary method for parsing incoming messages by an Interactive Agent. The initial portion of all IA messages identifies the message type via a unique Object Identifier ("OID"). FIGS. 18a–18b are a process flowchart for an exemplary method of parsing the initial portion of all IA messages to identify its particular message type so that the remaining portion of the message may be appropriately parsed. After starting, step 800 of FIG. 18a reads an OID tag. Step 802 then reads an OID length L, which is the length of an OID value which follows in the message. Step 804 then reads L bytes, which is the OID value.

Step 806 looks up the OID which was read in step 804 to determine a message type of the OID. Step 808 determines whether the message type of the OID is basic. If step 808 determines that the message type of the OID is basic, control passes to step 840 of FIG. 19 which is discussed below. If step 808 determines that the message type of the OIL) is not basic, step 810 then determines whether the message type of the OID is message integrity. If step 810 determines that the message type of the OID is message integrity, then control passes to step 860 of FIG. 20a, which is discussed below. If step 810 of FIG. 18a determines that the message type of the OID is not message integrity, then step 814 of FIG. 18b determines whether the message type of the OID is non-repudiation.

Figure 21A:
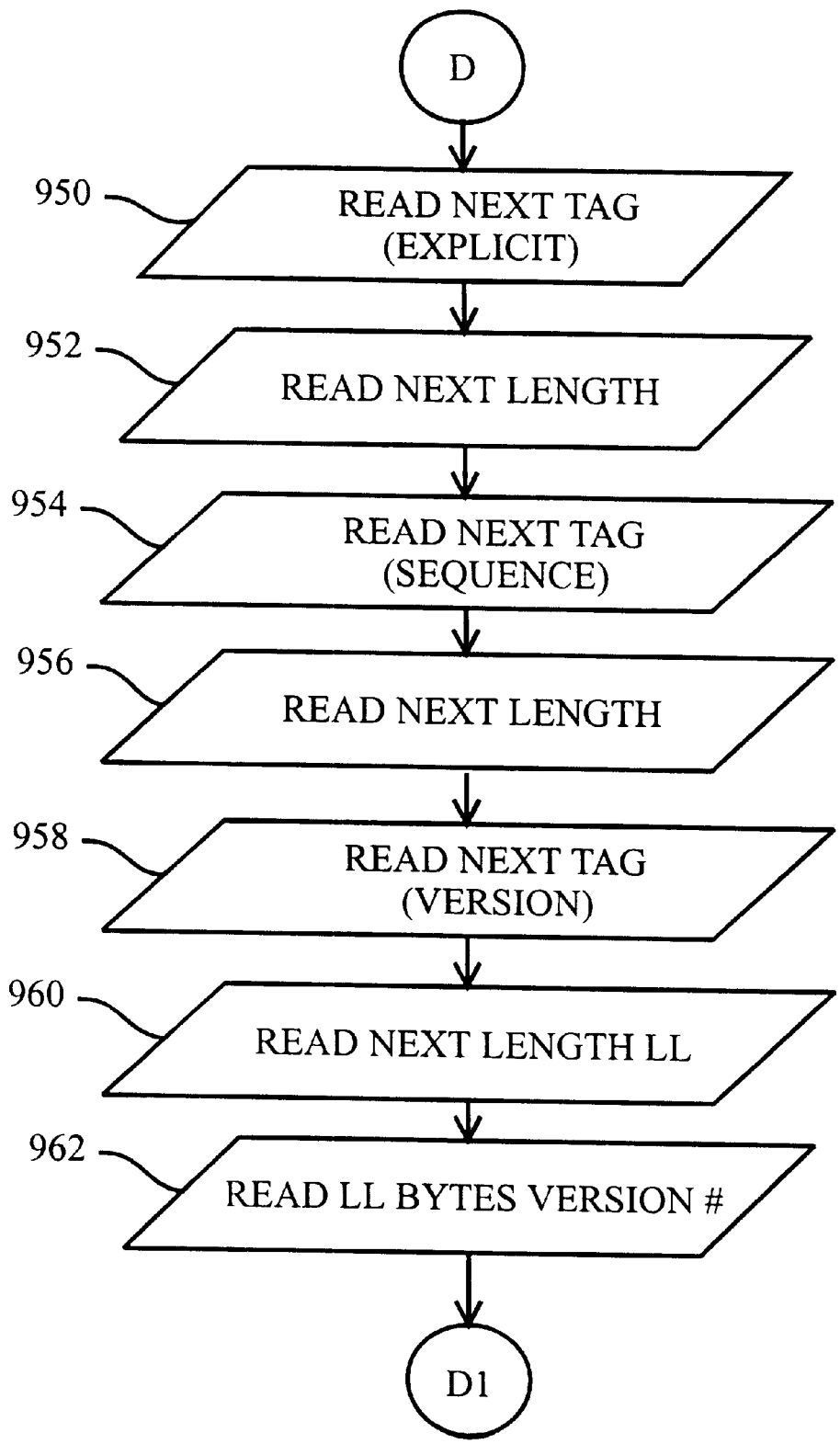
FIGS. 21a–21k are a process flow chart for an exemplary method for parsing an EDI message with non-repudiation according to the invention.
Figure 21B:
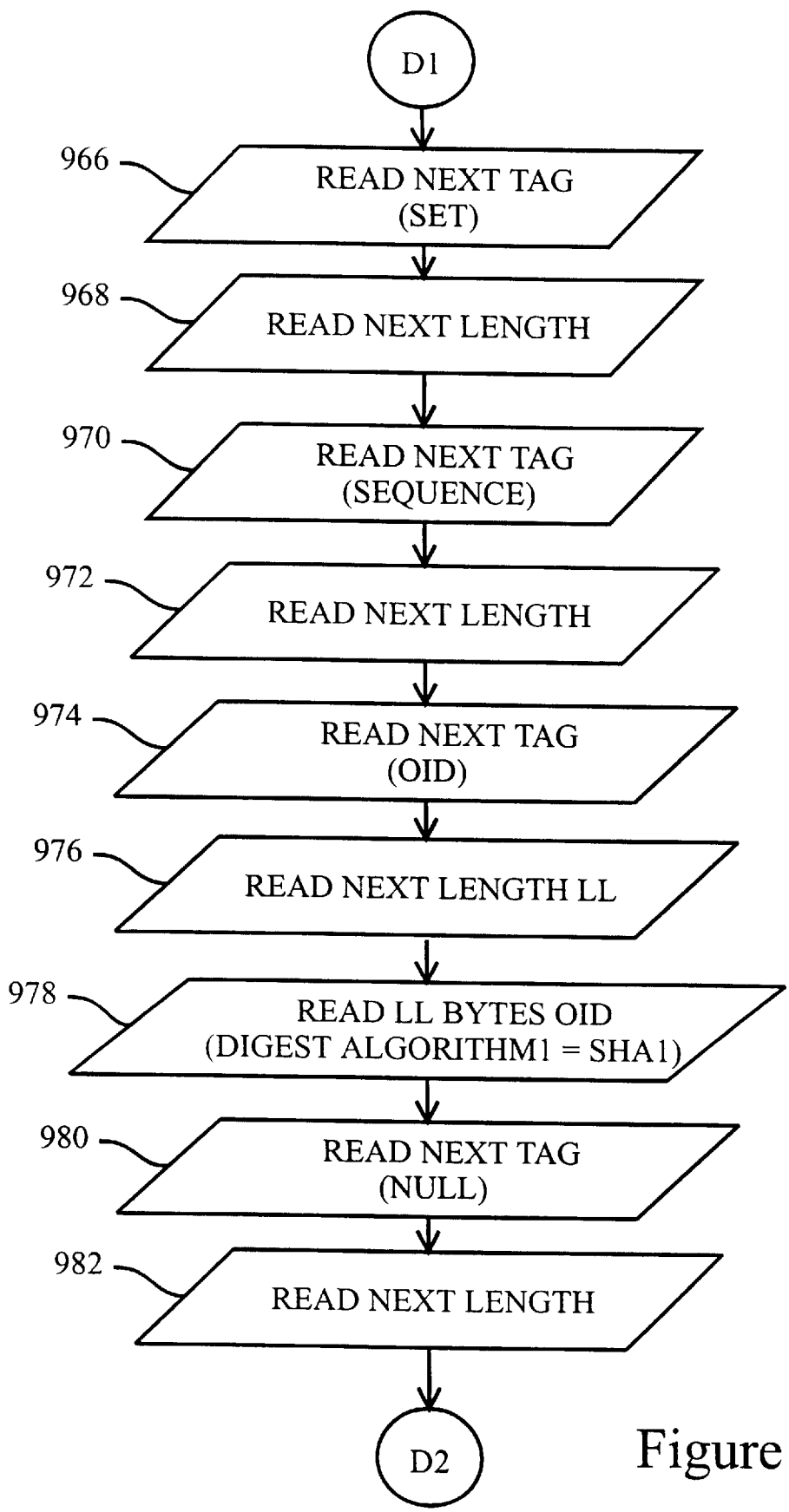

If step 814 determines that the message type of the OID is non-repudiation, then control passes to step 950 of FIG. 21a, which is discussed below. If step 814 of FIG. 18b determines that the message type of the OID is not non-repudiation, then step 816 determines whether message type of the OID is IAStatus. If step 816 determines that the message type of the OID is IAStatus, then control passes to step 1150 of FIG. 22, which is discussed below. If step 816 of FIG. 18b determines that the message type of the OID is not IAStatus, then step 818 determines whether the message type of the OID is IAReceipt. If step 818 determines that the message type of the OID is IAReceipt, control passes to step 1180 of FIG. 23a, which is discussed below. If step 818 of FIG. 18b determines that the message type of the OID is not IAReceipt, then step 820 assigns a value of "unknown message type" to a variable error. Step 822 then logs an event, step 824 saves the message, and control is returned to the calling system.

Figure 19:
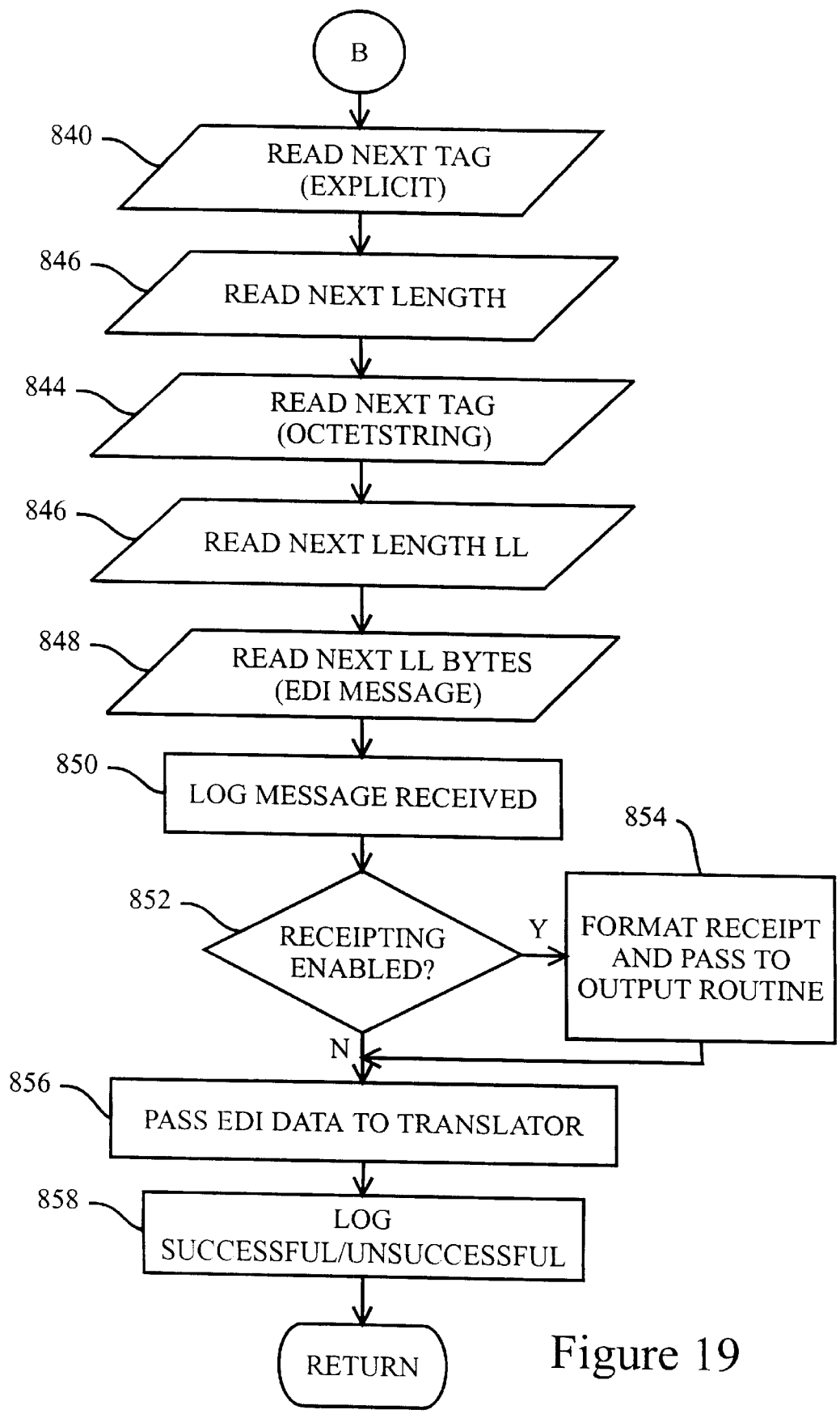
FIG. 19 is a process flow chart for an exemplary method for parsing a basic EDI message according to the invention.

FIG. 19 is a process flowchart for an exemplary method for parsing a basic EDI message after the message type has been determined to be basic in step 808 as discussed previously with regard to FIG. 18a.

Step 840 of FIG. 19 reads a next tag. Step 842 then reads a next length.

Step 844 then uses the length which was read in step 842 to read the next tag which is an octet string. Step 846 then reads a next length LL. Step 848 then reads the next LL bytes, which is the transmitted EDI message. Step 850 then logs a message receipt. Step 852 then determines whether receipting is enabled. If it is determined in step 852 that receipting is enabled, then step 854 formats a receipt and passes it to an output routine, and control passes to step 856 as discussed below.

If it is determined in step 852 that receipting is not enabled, step 856 passes the EDI data to a translator. Step 858 then logs whether the transmission was successful or unsuccessful. Control is then returned to the calling system.

FIGS. 20a–20e are a process flowchart for an exemplary method for parsing an EDI message with message integrity after the message type has been determined to be message integrity in step 810 of FIG. 18a. Step 860 of FIG. 20a reads a next tag. Step 862 then reads a next length. Step 864 then reads a next tag, which is a sequence. Step 866 then reads a next length. Step 868 then reads a next tag which is a version. Step 870 then reads a next length LL. Step 872 then reads the next LL bytes, which are a version number.

Figure 20A:
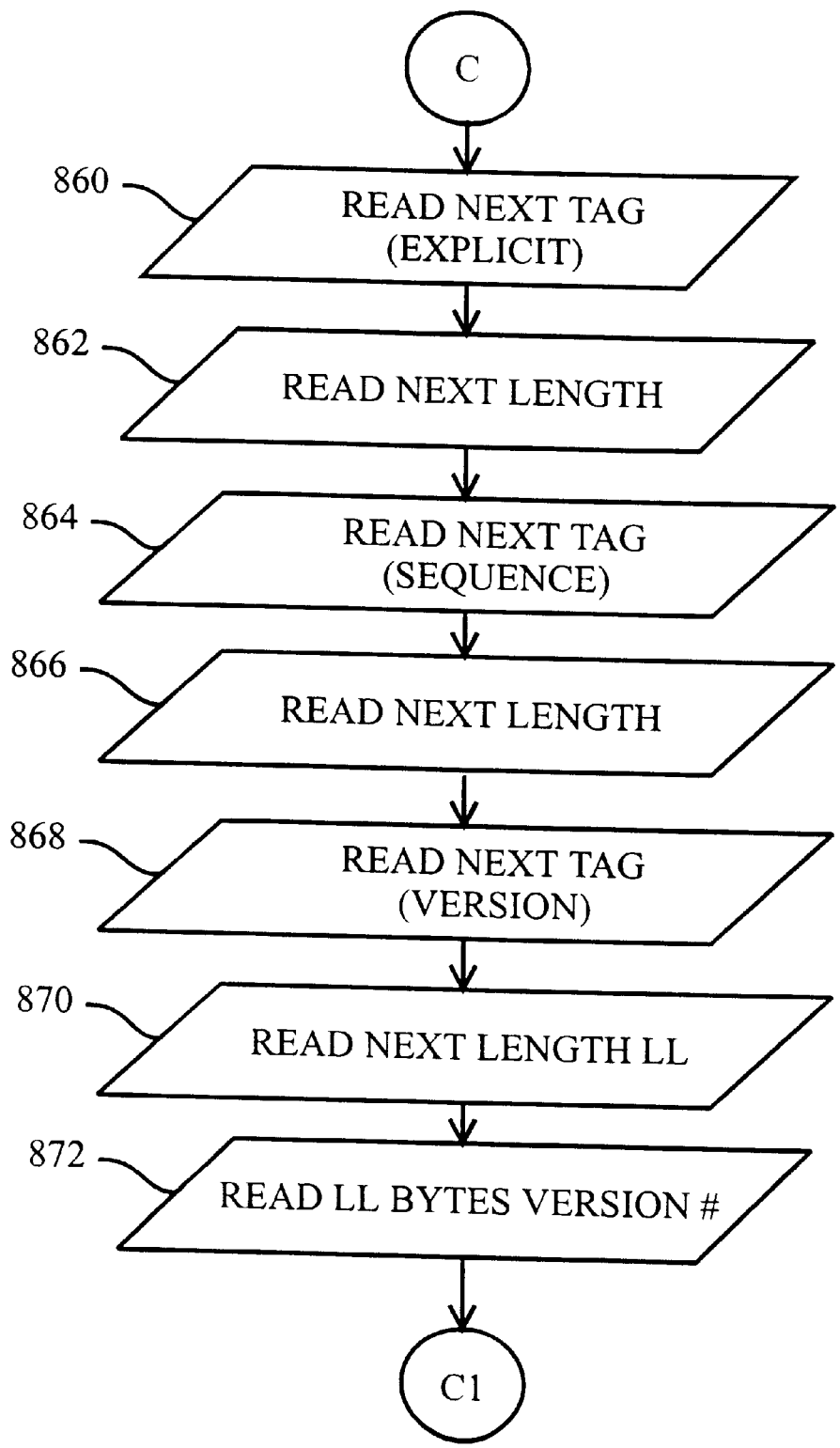
FIGS. 20a–20e are a process flow chart for an exemplary method for parsing an EDI message with message integrity.
Figure 20B:
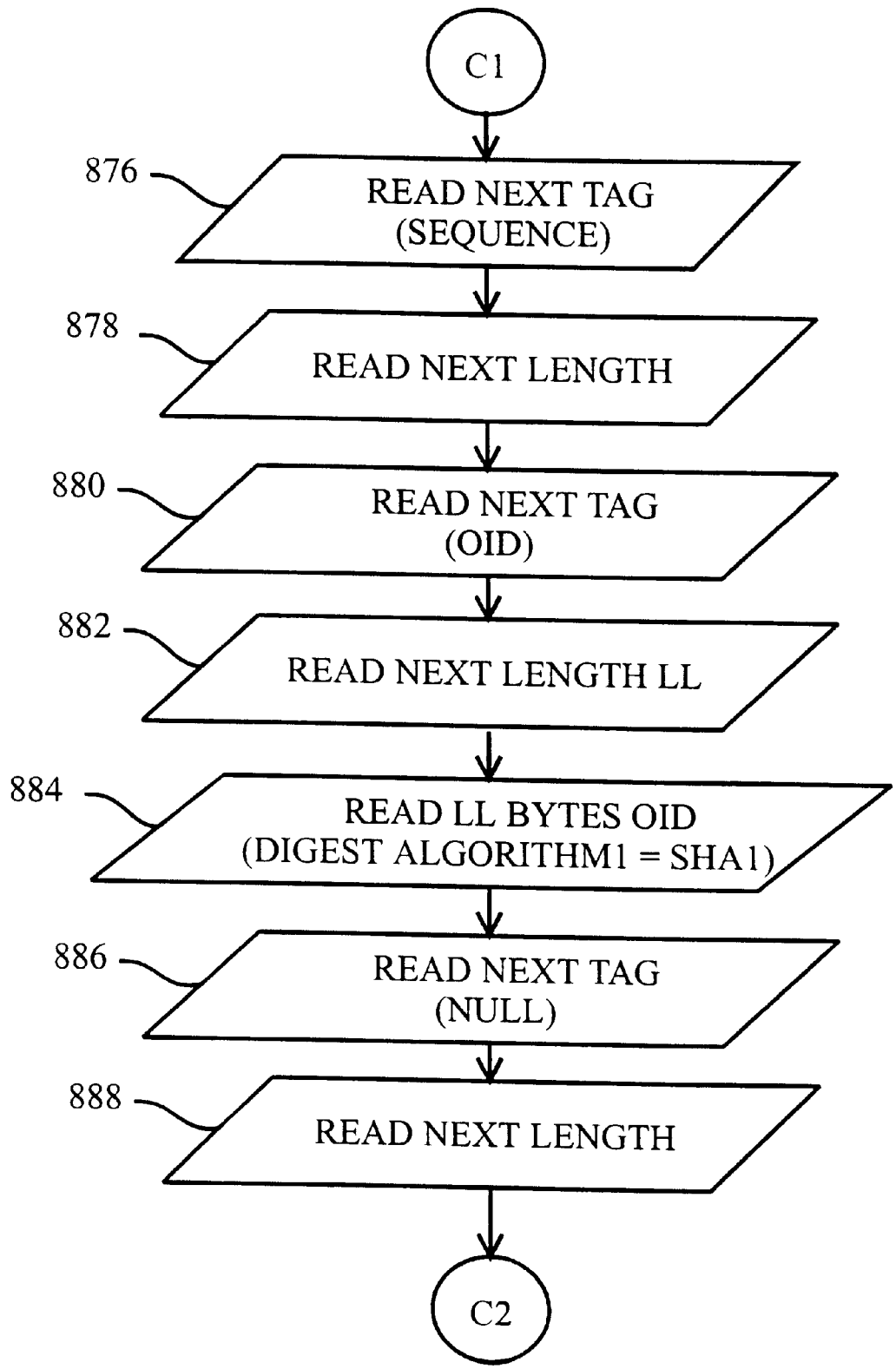

Step 876 of FIG. 20b then reads a next tag, which is a sequence. Step 878 then reads a next length. Step 880 uses the length read in step 878 to read a next tag which is an Object Identifier. Step 882 then reads a next length LL. Step 884 then reads the next LL bytes, which are an Object Identifier for a digest algorithm. For the current embodiment, the digest algorithm is SHA1.

Step 886 then reads a next tag which is NULL. Step 888 then reads a next length.

Figure 20C:
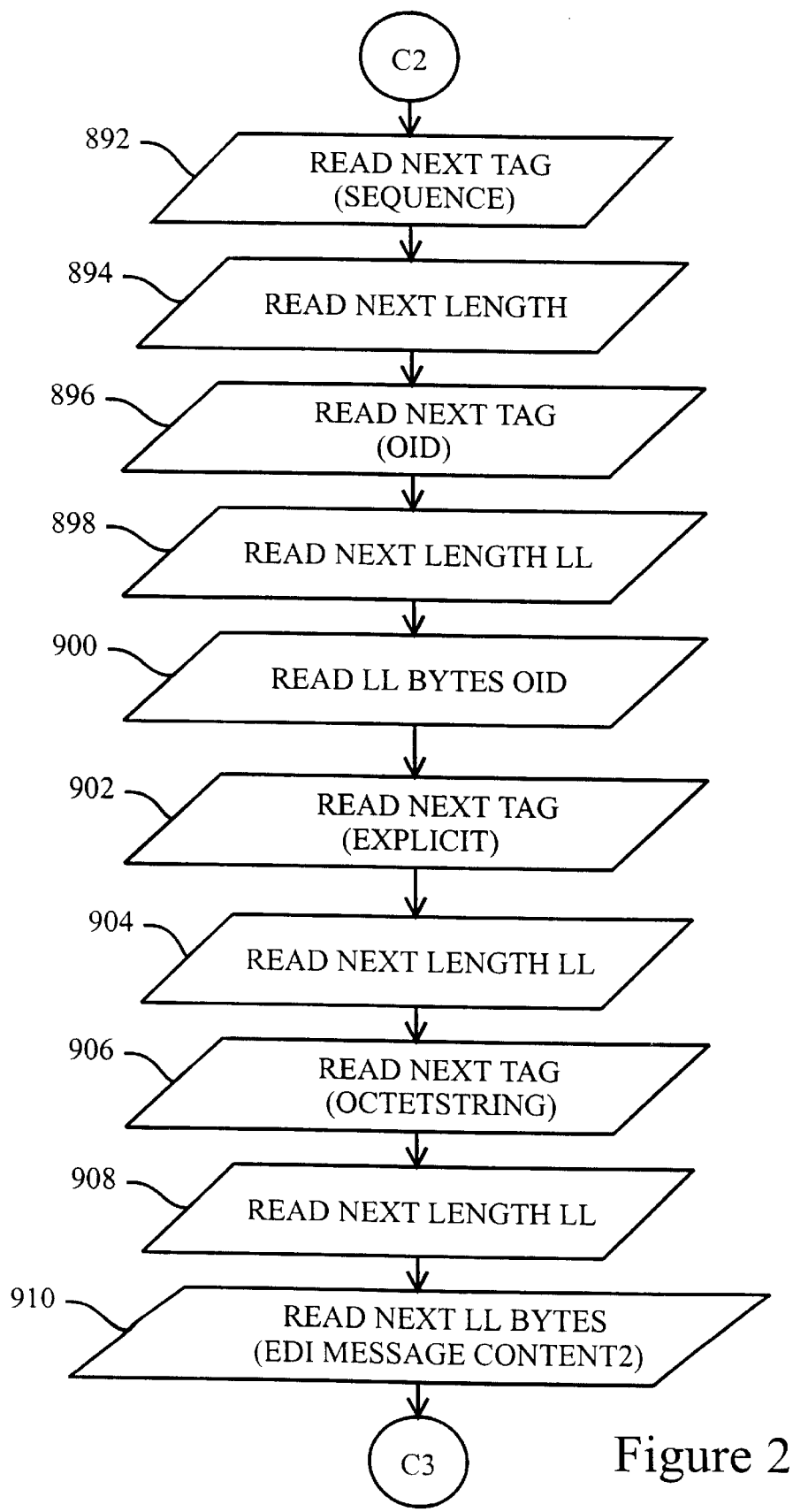

Step 892 of FIG. 20c then reads a next tag which is a sequence. Step 894 then reads a next length. Step 896 then reads a next tag, which is an OID. Step 898 then reads a next length LL. Step 900 then reads the next LL bytes, which are an OID.

Step 902 then reads a next tag, which is explicit. Step 904 then reads a next length LL. Step 906 then reads a next tag, which is an octet string. Step 908 then reads a next length LL. Step 910 then reads the next LL bytes, which is an EDI message.

Figure 20D:
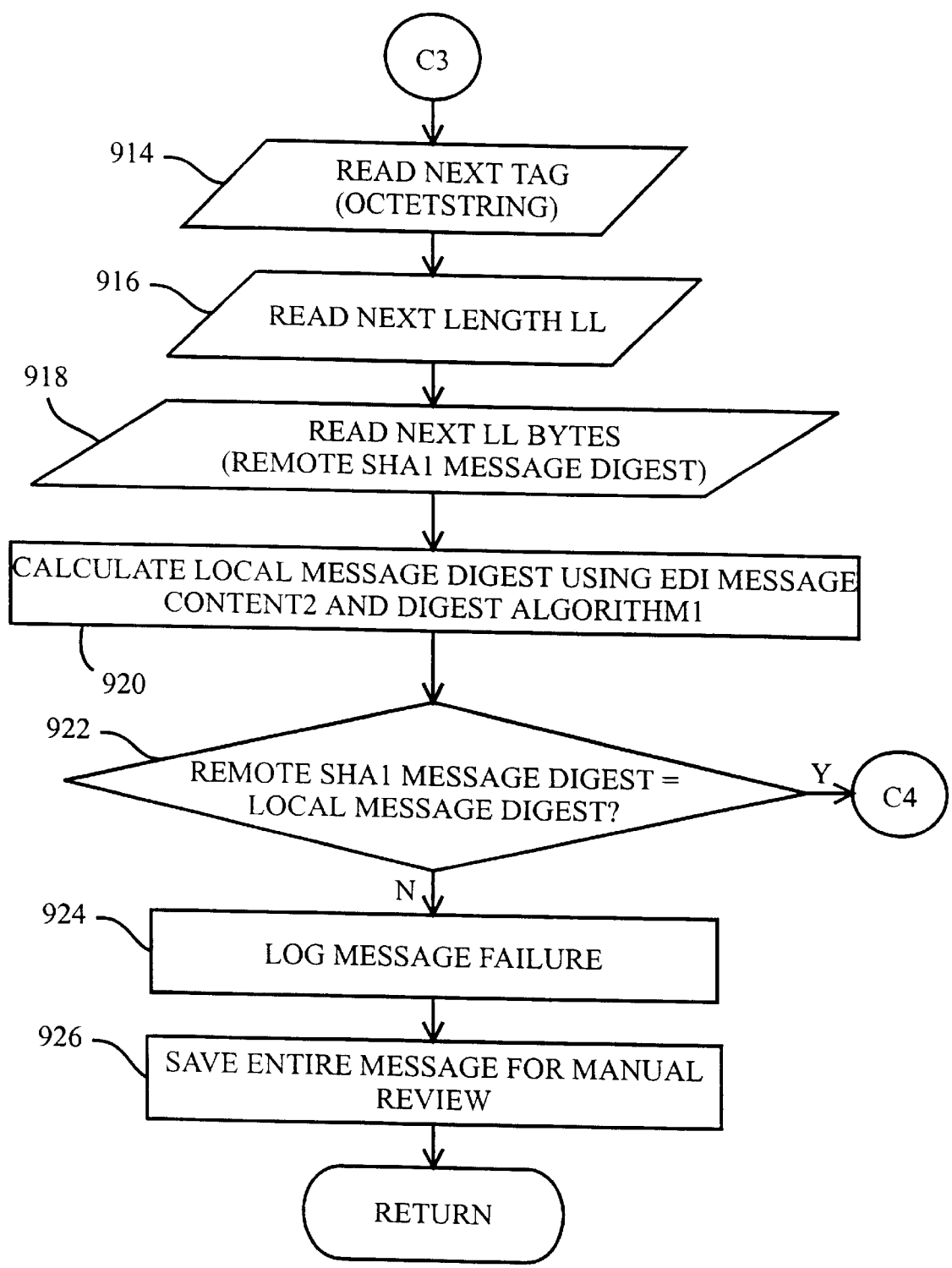

Step 914 of FIG. 20d then reads a next tag, which is an octet string. Step 916 then reads a next length LL. Step 918 then reads the next LL bytes, which are a remote SHA1 message digest. Step 920 then calculates a local message digest using the EDI message which has been read in step 910 which was discussed previously with regard to FIG. 20c, and the digest algorithm which was read in step 884, which was discussed previously with regard to FIG. 20b.

Step 922 then determines if the remote message digest which was read in step 918 as discussed above is equal to the local message digest calculated in step 920 discussed above.

Figure 20E:
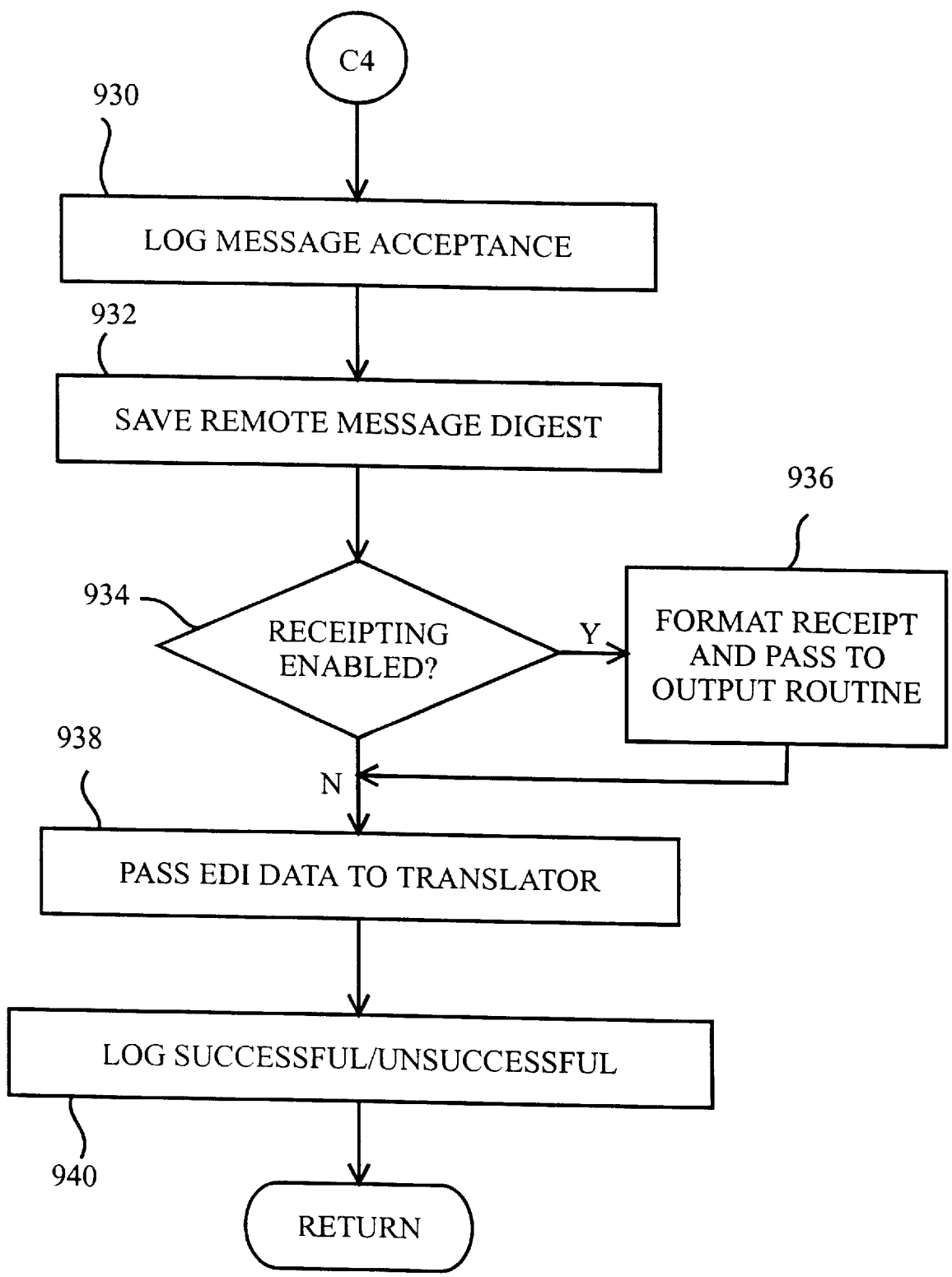

If step 922 determines that the remote message digest is equal to the local message digest, then control passes to step 930 of FIG. 20e, which is discussed below. If step 922 determines that the remote message digest is not equal to the local message digest, then step 924 logs a message failure, step 926 saves the entire message for manual review, and control is returned to the calling system.

As discussed above with regard to FIG. 20d, if step 922 determines that the remote message digest is equal to the local message digest, then step 930 logs a message acceptance. Step 932 then saves the remote message digest. Step 934 then determines whether receipting is enabled.

If step 934 determines that receipting is enabled, then step 936 formats a receipt and passes the receipt to an output routine, followed by control being passed to step 938, which is discussed below. If step 934 determines that receipting is not enabled, then step 938 passes the EDI data to a translator. Step 940 then logs whether the transmission was successful or unsuccessful. Control is then returned to the calling system.

FIGS. 21a–21k are a process flowchart for an exemplary method for parsing an EDI message with non-repetition after the message type has been determined to be non-repudiation in step 814 as discussed previously with regard to FIG. 18b. Step 950 of FIG. 21a reads a next tag, which is explicit. Step 952 then reads a next length, which is then used in step 954 to read a next tag, which is a sequence. Step 956 then reads a next length. Step 958 then reads a next tag which is a version.

Step 960 then reads a next length LL. Step 962 then reads the next LL bytes, which is a version number. Step 966 of FIG. 21b then reads a next tag, which is a set. Step 968 then reads a next length. Step 970 then reads a next tag, which is a sequence. Step 972 then reads a next length. Step 974 then reads a next tag, which is an OID.

Step 976 then reads a next length LL. Step 978 then reads the next LL bytes, which is an OID. For the current embodiment, this is a digest algorithm, which is SHA1. Step 980 then reads a next tag, which is NULL. Step 982 then reads a next length.

Figure 21C:
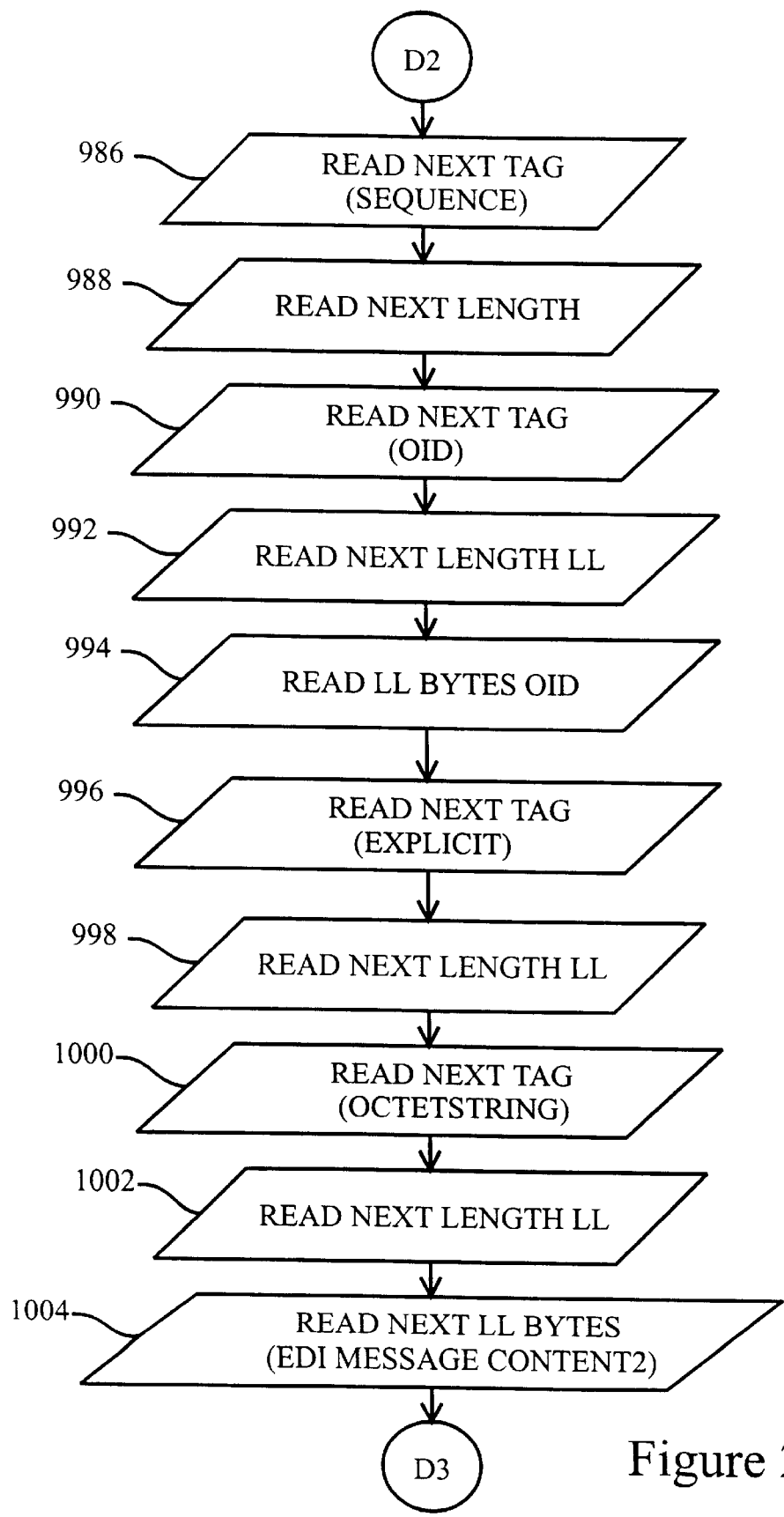
Figure 21D:
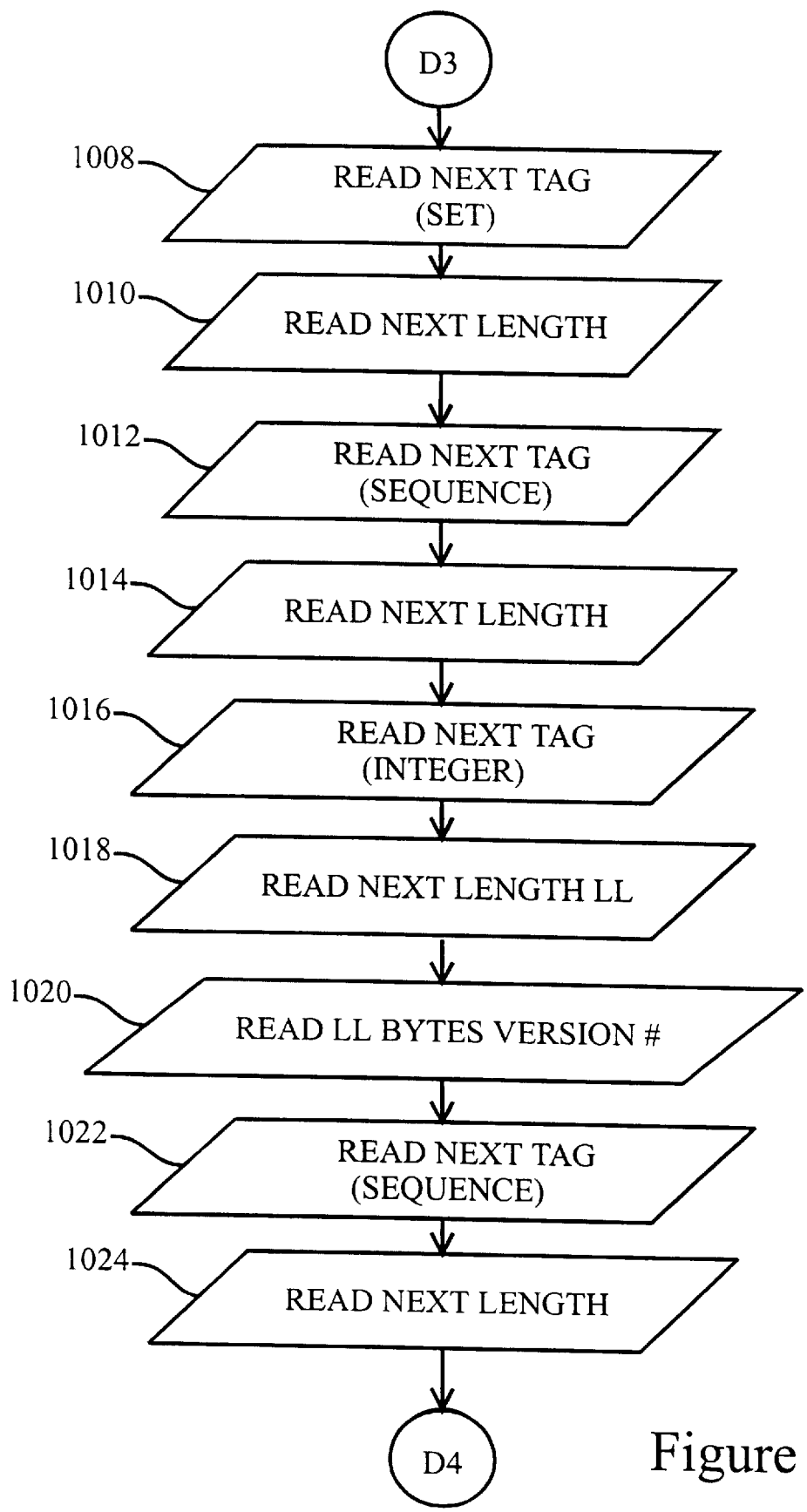

Step 986 of FIG. 21c reads a next tag, which is a sequence. Step 988 then reads a next length. Step 990 then reads a next tag, which is an OID. Step 992 then reads a next length LL. Step 994 then reads the next LL bytes, which are an OID. Step 996 then reads a next tag, which is explicit. Step 998 then reads a next length LL. Step 1000 reads a next tag, which is an octet string.

Step 1002 then reads a next length LL. Step 1004 then reads the next LL bytes, which are the EDI message. Step 1008 of FIG. 21d reads a next tag, which is a set. Step 1010 then reads a next length. Step 1012 then reads a next tag, which is a sequence. Step 1014 reads a next length. Step 1016 reads a next tag which is an integer.

Step 1018 reads a next length LL. Step 1020 reads the next LL bytes, which are a version number. Step 1022 reads a next tag, which is a sequence. Step 1024 reads a next length.

Figure 21E:
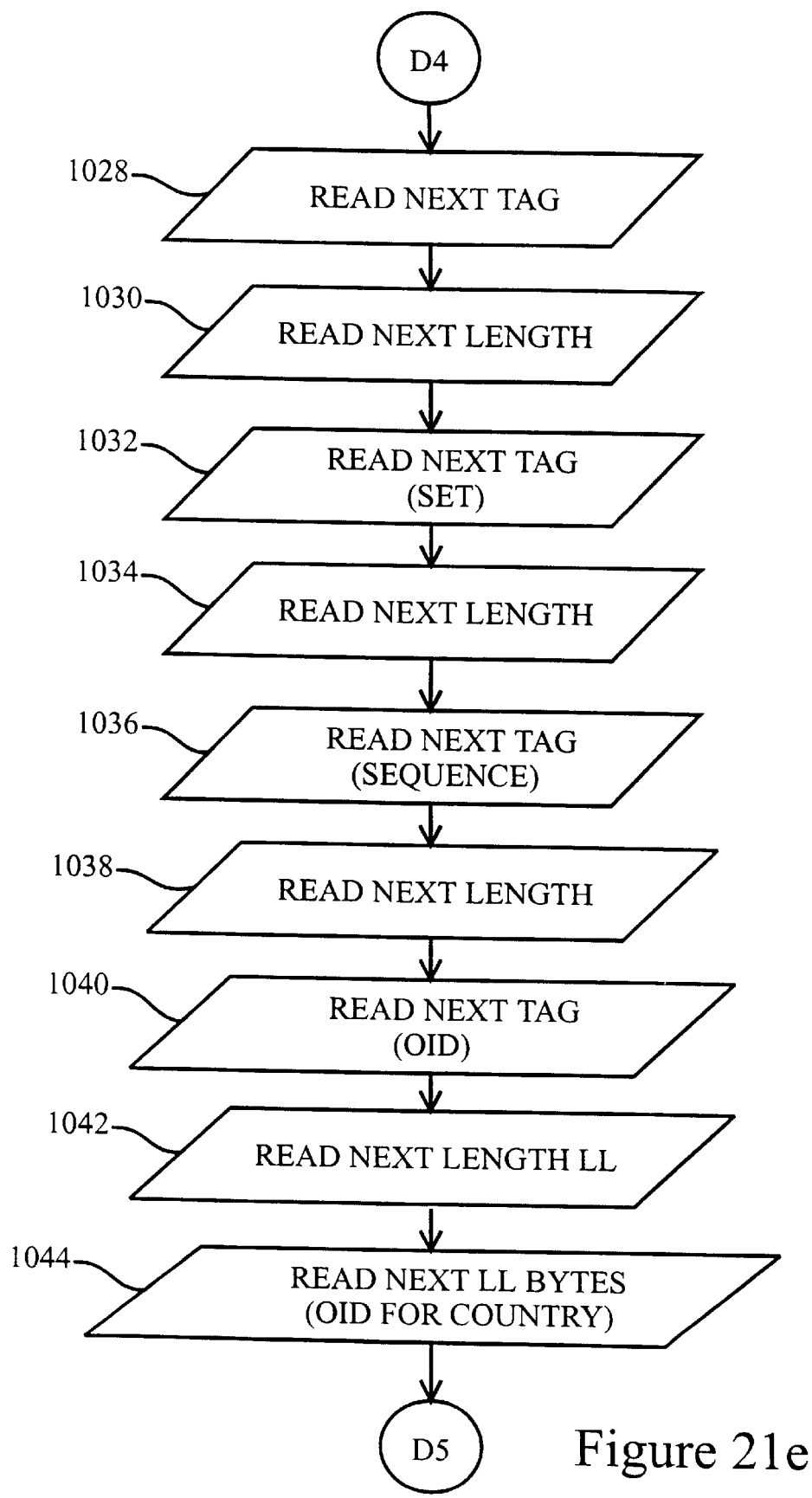

Step 1028 of FIG. 21e then reads a next tag. Step 1030 reads a next length. Step 1032 reads a next tag, which is a set. Step 1034 reads a next length. Step 1036 reads a next tag, which is a sequence. Step 1038 reads a next length. Step 1040 reads a next tag, which is an OID. Step 1042 reads a next length LL. Step 1044 then reads the next LL bytes, which are an OID for a country.

Figure 21F:
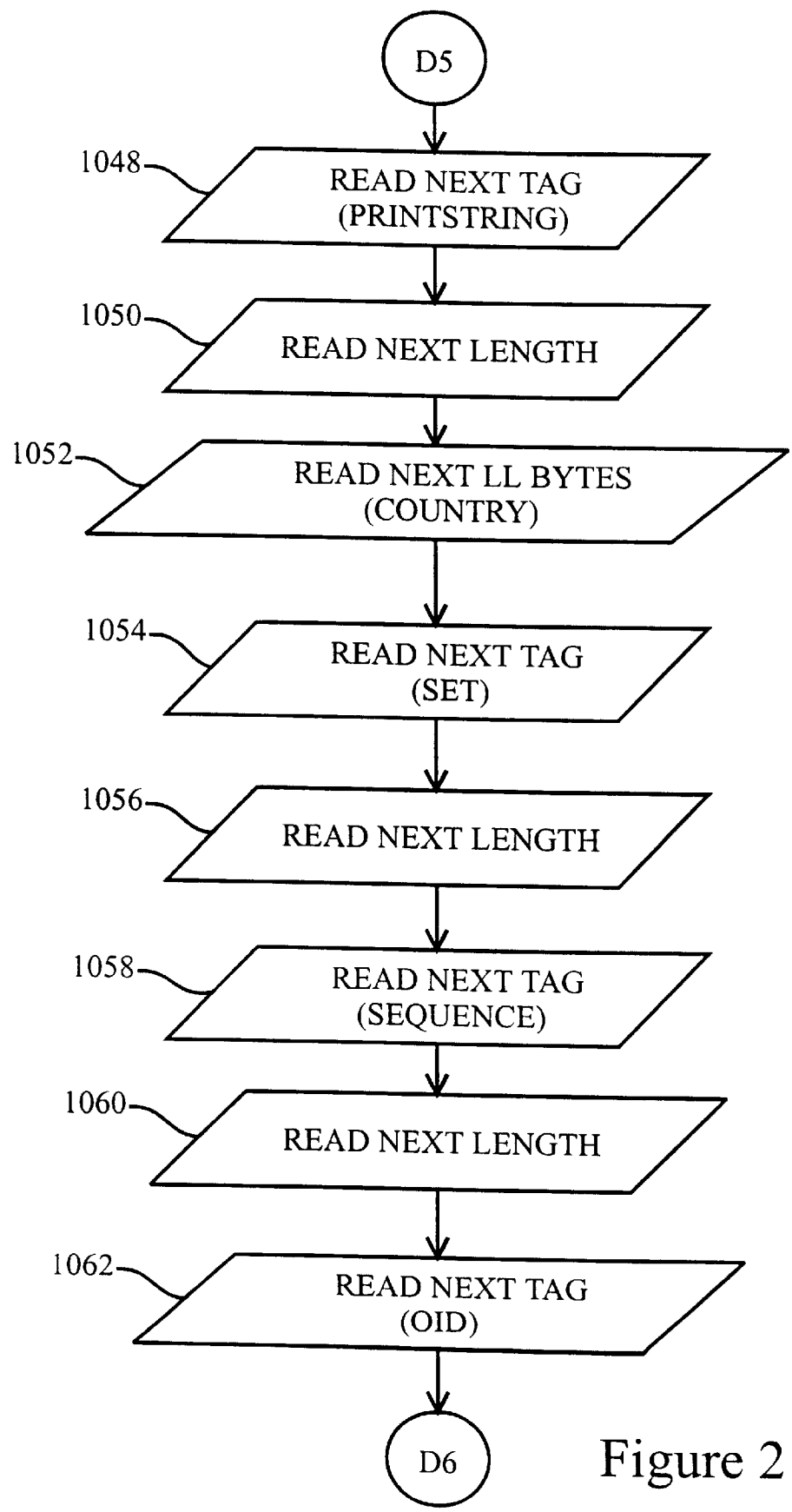

Step 1048 of FIG. 21f then reads a next tag, which is a print string. Step 1050 then reads a next length. Step 1052 reads the next LL bytes, which are a country. Step 1054 then reads a next tag, which is a set. Step 1056 then reads a next length. Step 1058 then reads a next tag, which is a sequence. Step 1060 reads a next length. Step 1062 then reads a next tag, which is an OID.

Figure 21G:
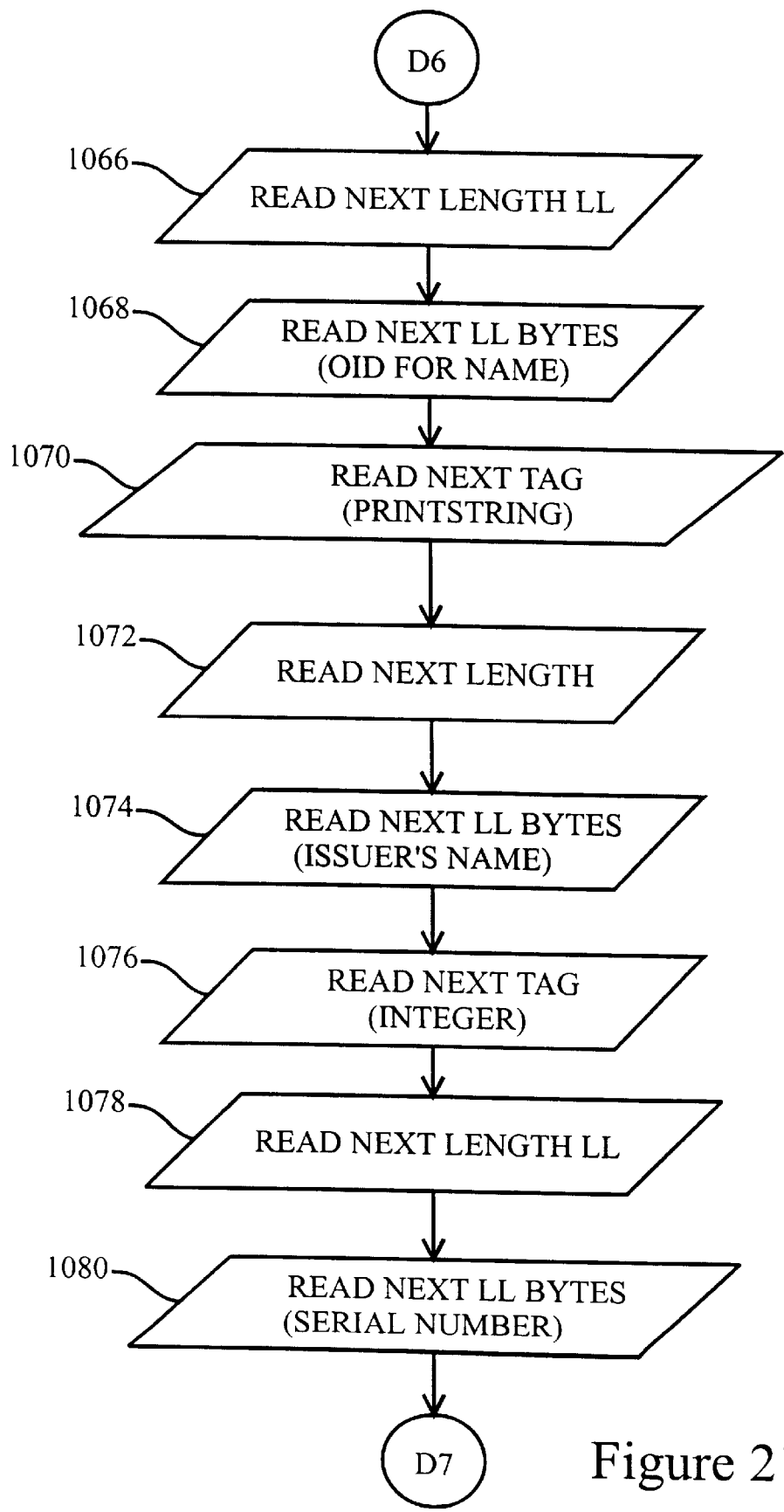
Figure 21H:
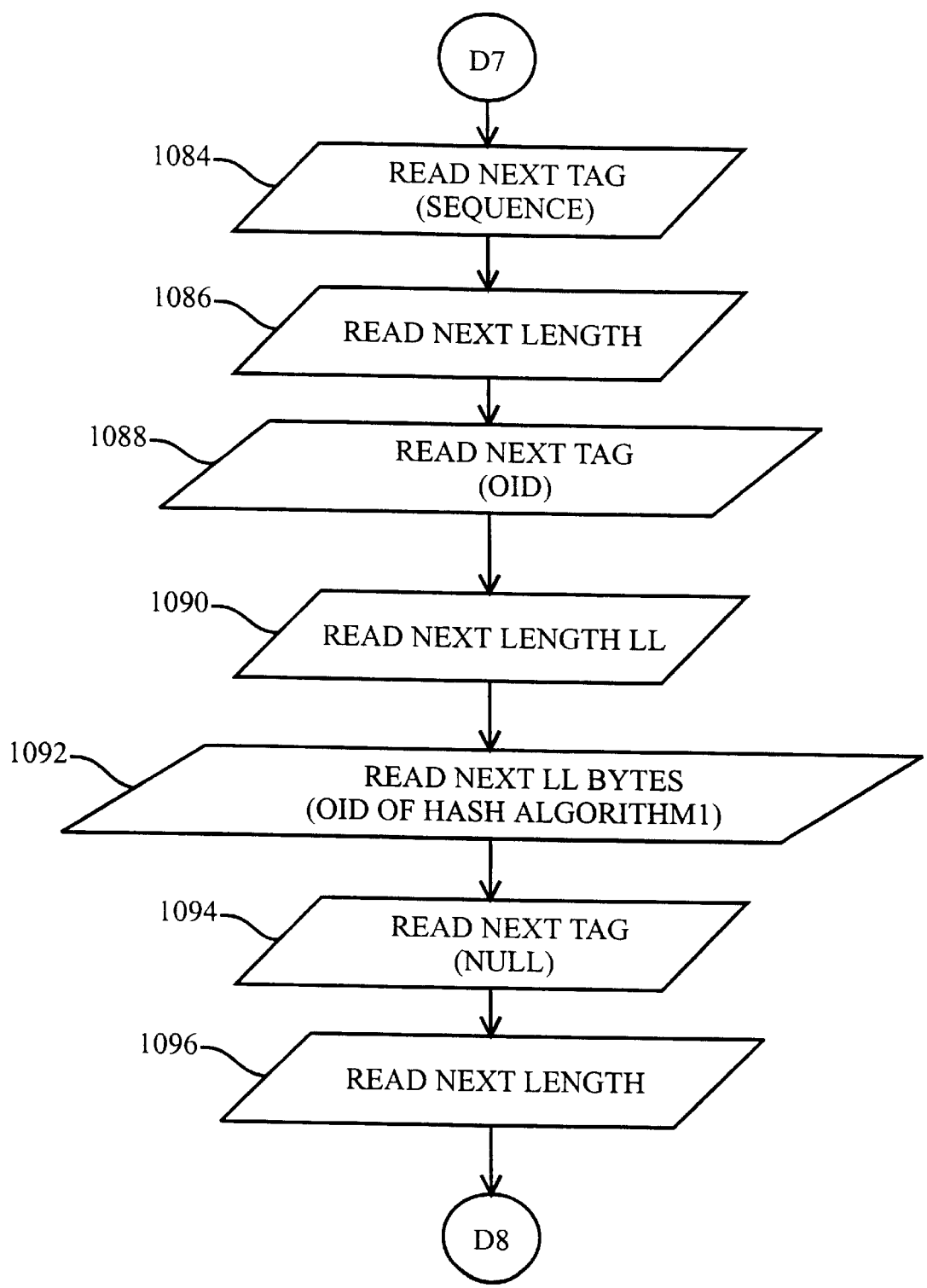
Figure 21I:
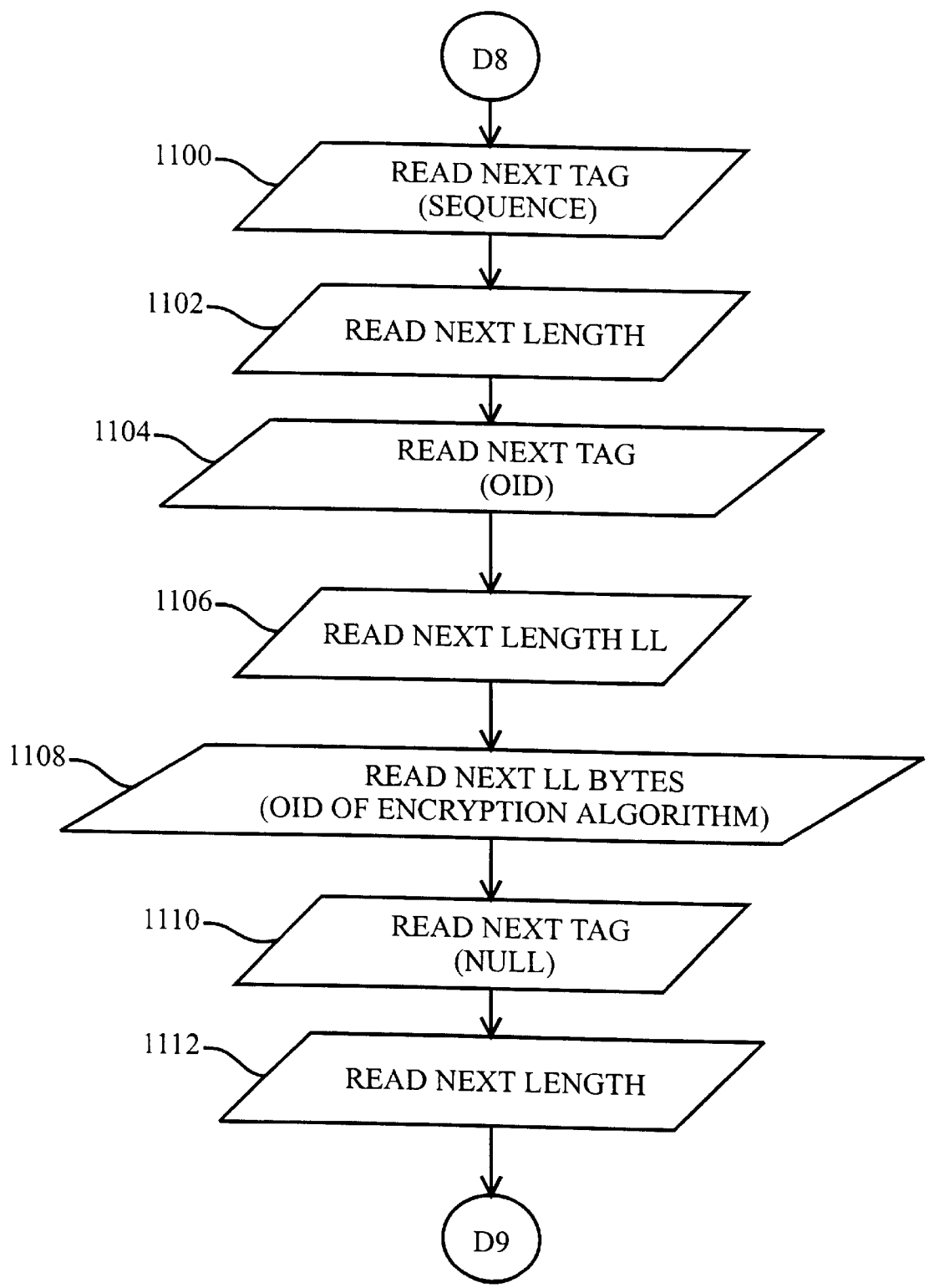

Step 1066 of FIG. 21g then reads a next length LL. Step 1068 then reads the next LL bytes, which are an OID for a name. Step 1070 then reads a next tag, which is a print string. Step 1072 reads a next length. Step 1074 reads the next LL bytes, which are an issuer's name.

Step 1076 then reads a next tag, which is an integer. Step 1078 reads a next length LL. Step 1080 then reads the next LL bytes, which are a serial number. Step 1084 of FIG. 21h reads a next tag, which is a sequence. Step 1086 then reads a next length. Step 1088 reads a next tag, which is an OID. Step 1090 then reads a next length LL. Step 1092 then reads the next LL bytes, which are an OID of a hash algorithm. In the current embodiment, the hash algorithm is SHA1.

Step 1094 then reads a next tag, which is NULL. Step 1096 then reads a next length. Step 1100 of FIG. 21i then reads a next tag, which is a sequence. Step 1102 then reads a next length. Step 1104 then reads a next tag, which is an OID. Step 1106 then reads a next length LL. Step 1108 then reads the next LL bytes, which are an OID of an encryption algorithm. For the current embodiment, the encryption algorithm is RSA. Step 1110 then reads a next tag, which is NULL. Step 1112 then reads a next length.

Figure 21J:
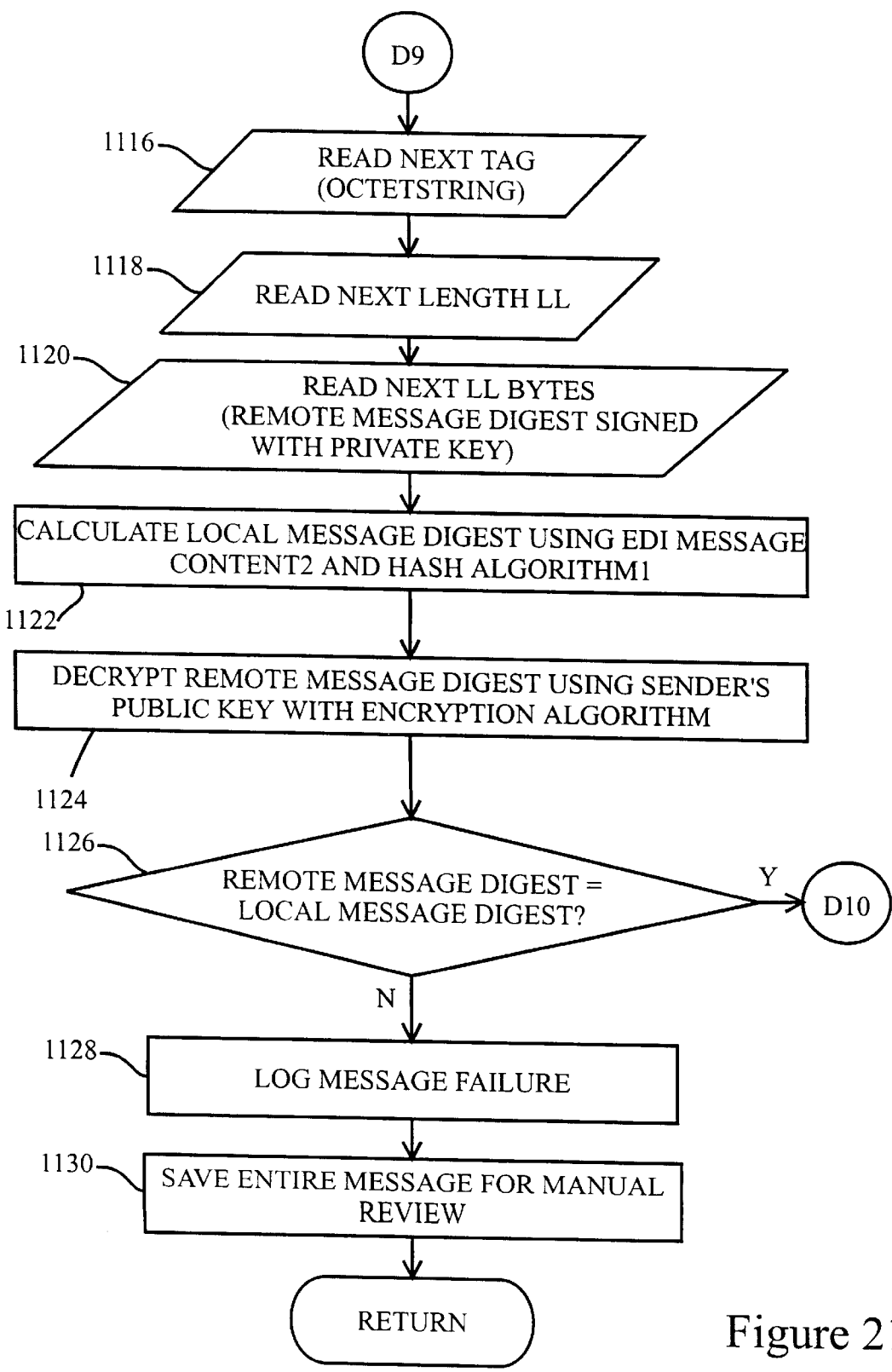

Step 1116 of FIG. 21j then reads a next tag, which is an octet string. Step 1118 then reads a next length LL. Step 1120 then reads the next LL bytes, which are a remote message digest signed with a private key. Step 1122 then calculates a local message digest using the EDI message which was read in step 1004 as discussed previously with regard to FIG. 21c, and the hash algorithm which was identified in step 1092, discussed previously with regard to FIG. 21h.

Step 1124 then decrypts the remote message digest which was read in step 1120 as discussed previously, using the sender's public key in accordance with the encryption algorithm which was identified by step 1108, which was discussed previously with regard to FIG. 21i.

Step 1126 then determines whether the decrypted remote message digest computed in step 1124, discussed above, is equal to the local message digest which was calculated in step 1122 as discussed above. If step 1126 determines that the remote message digest is not equal to the local message digest, then step 1128 logs a message failure, step 1130 saves the entire message for manual review, and control is returned to the calling system.

Figure 21K:
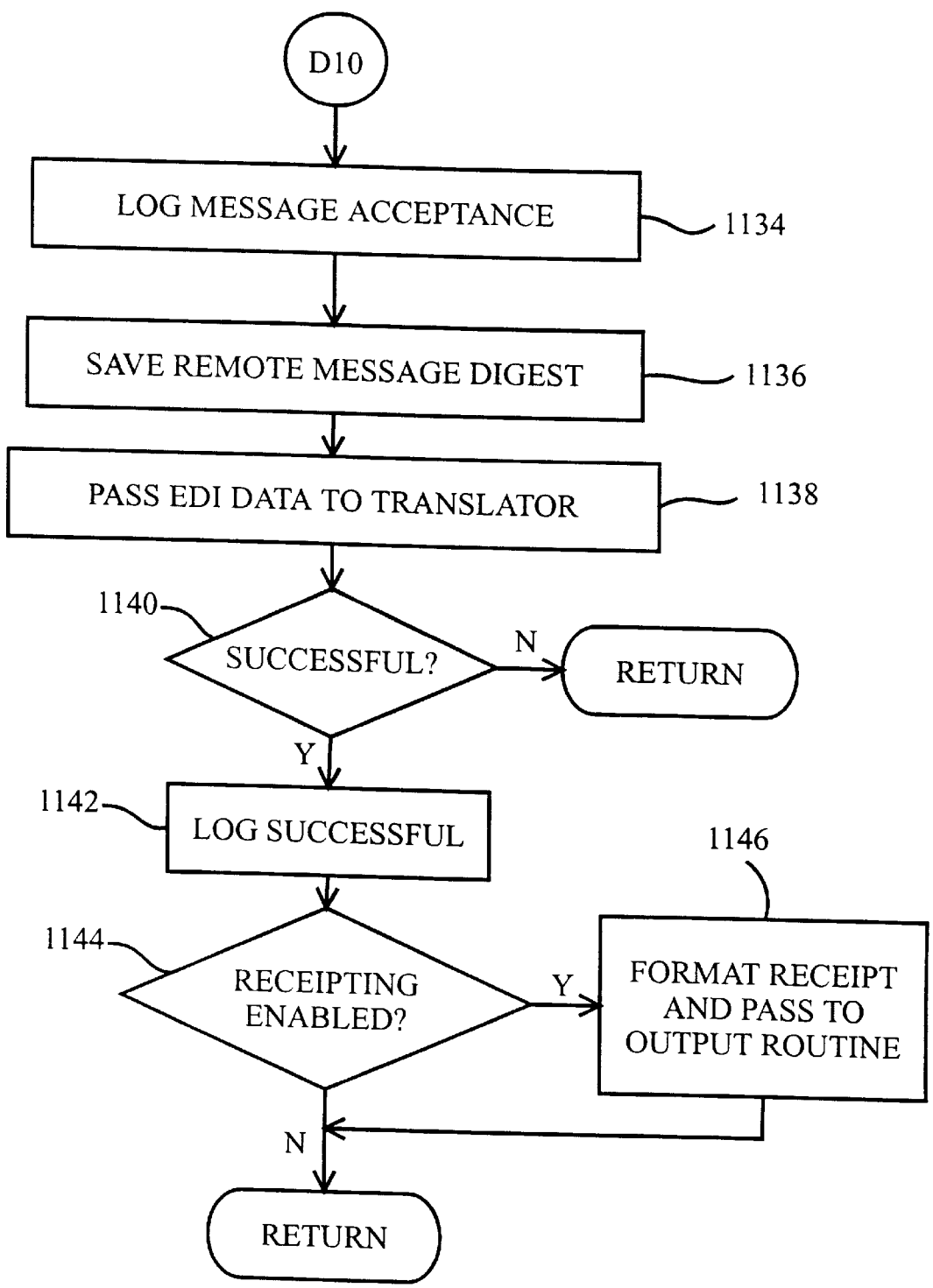

If step 1126 determines that the remote message digest is equal to the local message digest, then step 1134 of FIG. 21k logs acceptance of the message. Step 1136 then saves the remote message digest. Step 1138 then passes the EDI data to a translator.

Step 1140 then determines whether the transmission was successful. If step 1140 determines that the transmission was not successful, then control is returned to the calling system. If step 1140 determines that the transmission was successful, then step 1142 logs a successful transmission. Step 1144 determines whether receipting is enabled. If step 1144 determines that receipting is not enabled, then control is returned to the calling system. If step 1144 determines that receipting is enabled, then step 1146 formats a receipt and passes it to the output routine, after which control is returned to the calling system.

Figure 22:
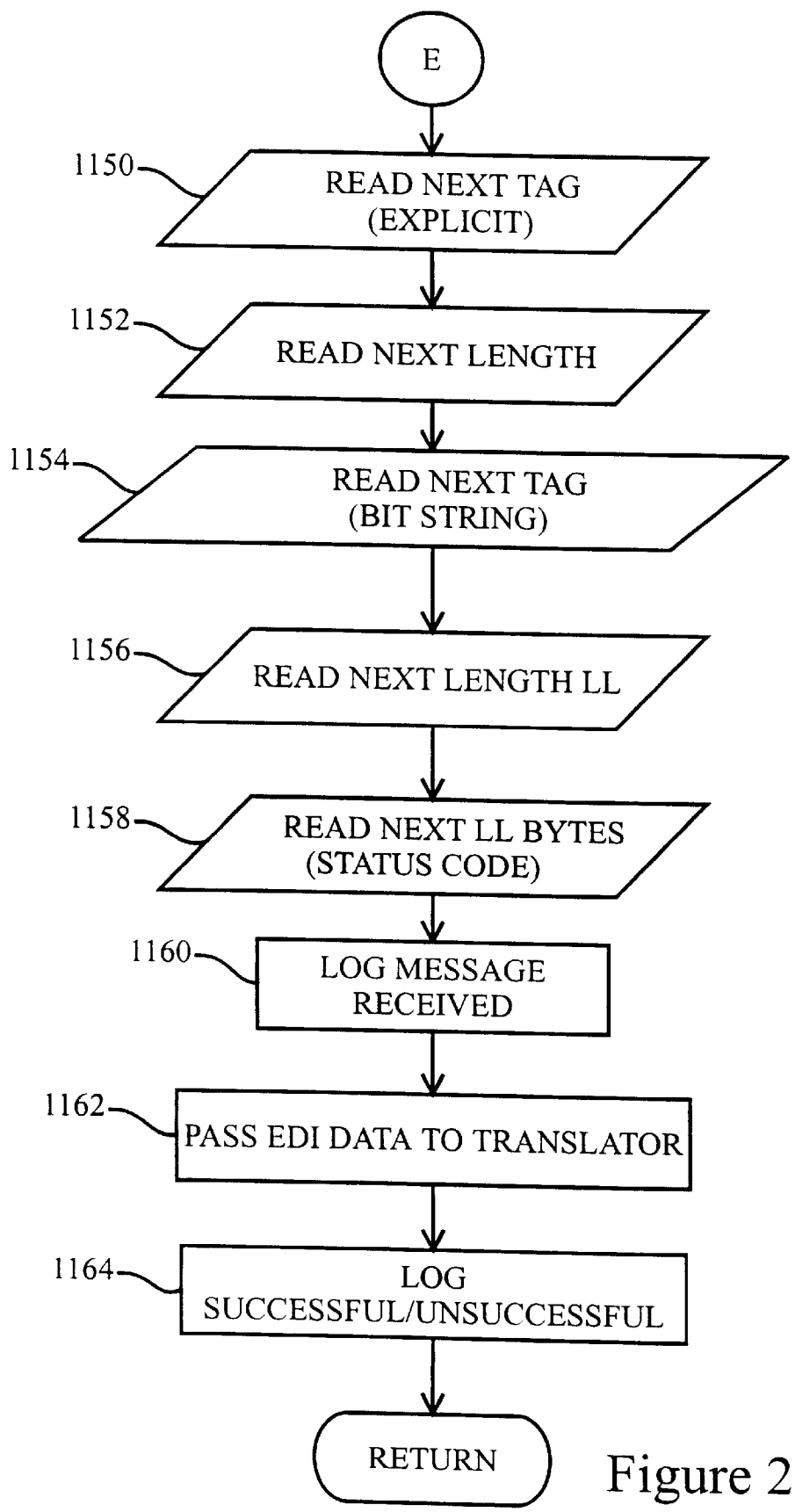
FIG. 22 is a process flow chart for parsing an IA Status message according to the invention.

FIG. 22 is a process flowchart for an exemplary method for parsing an IA status message after the message type has been determined to be IA status in step 816 as discussed previously with regard to FIG. 18b. Step 1150 of FIG. 22 reads a next tag, which is explicit. Step 1152 then reads a next length. Step 1154 then reads a next tag, which is a bit string. Step 1156 then reads a next length LL. Step 1158 then reads the next LL bytes, which are a status code.

Step 1160 logs a message received. Step 1162 passes the EDI data to a translator. Step 1164 then logs a successful or an unsuccessful transmission. Control is then returned to the calling system.

Figure 23A:
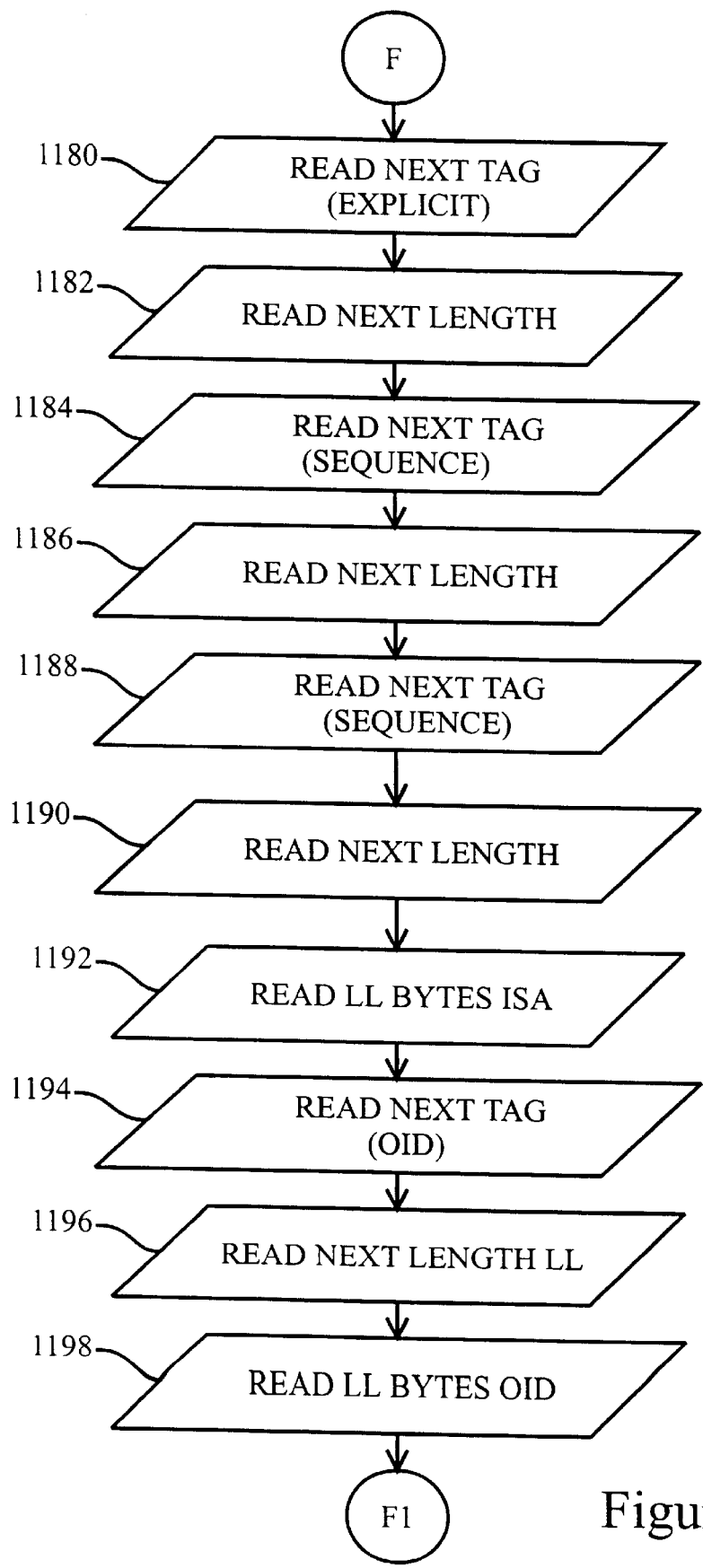
FIGS. 23a–23c are a process flow chart for parsing an IA Receipt according to the invention.
Figure 23B:
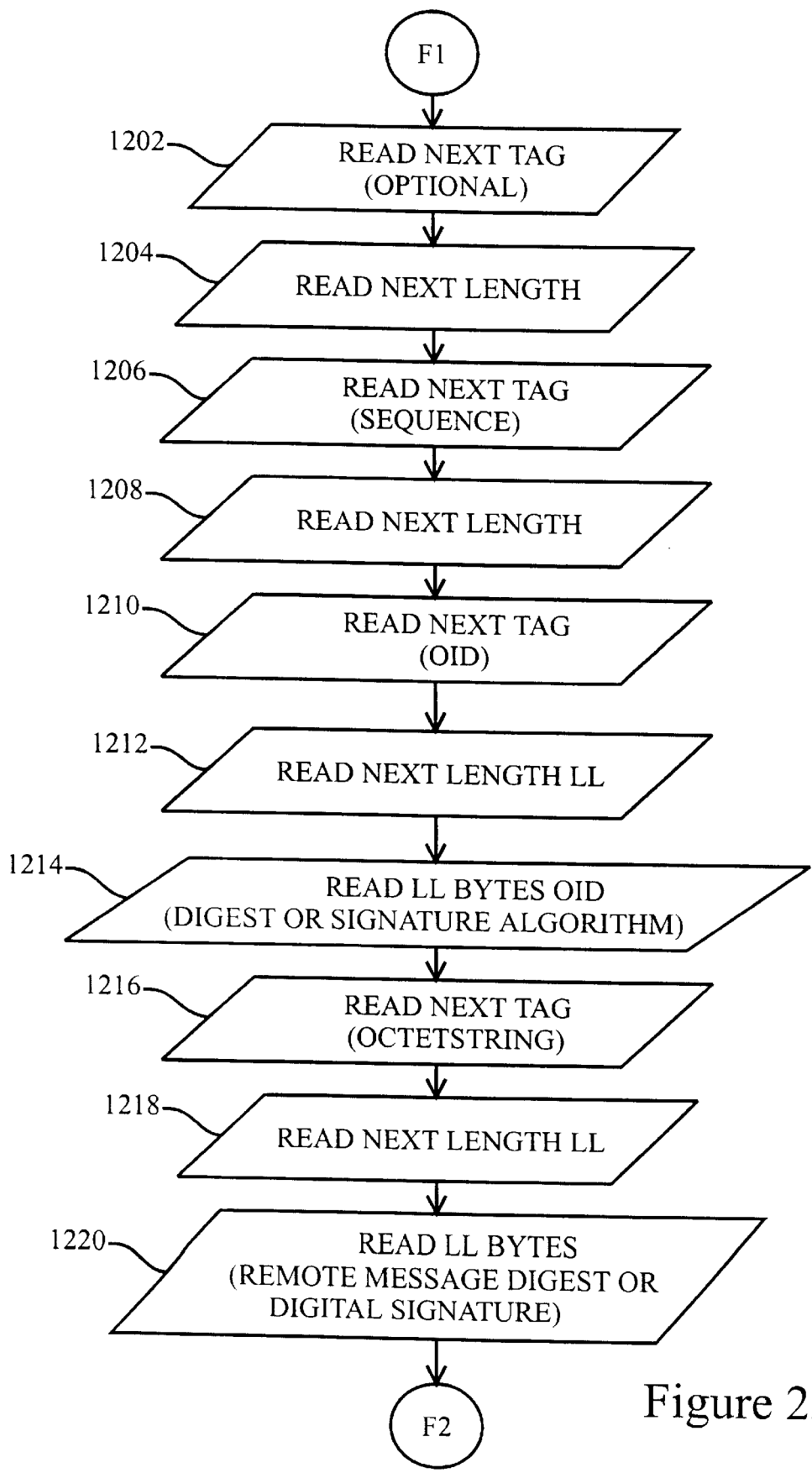
Figure 23C:
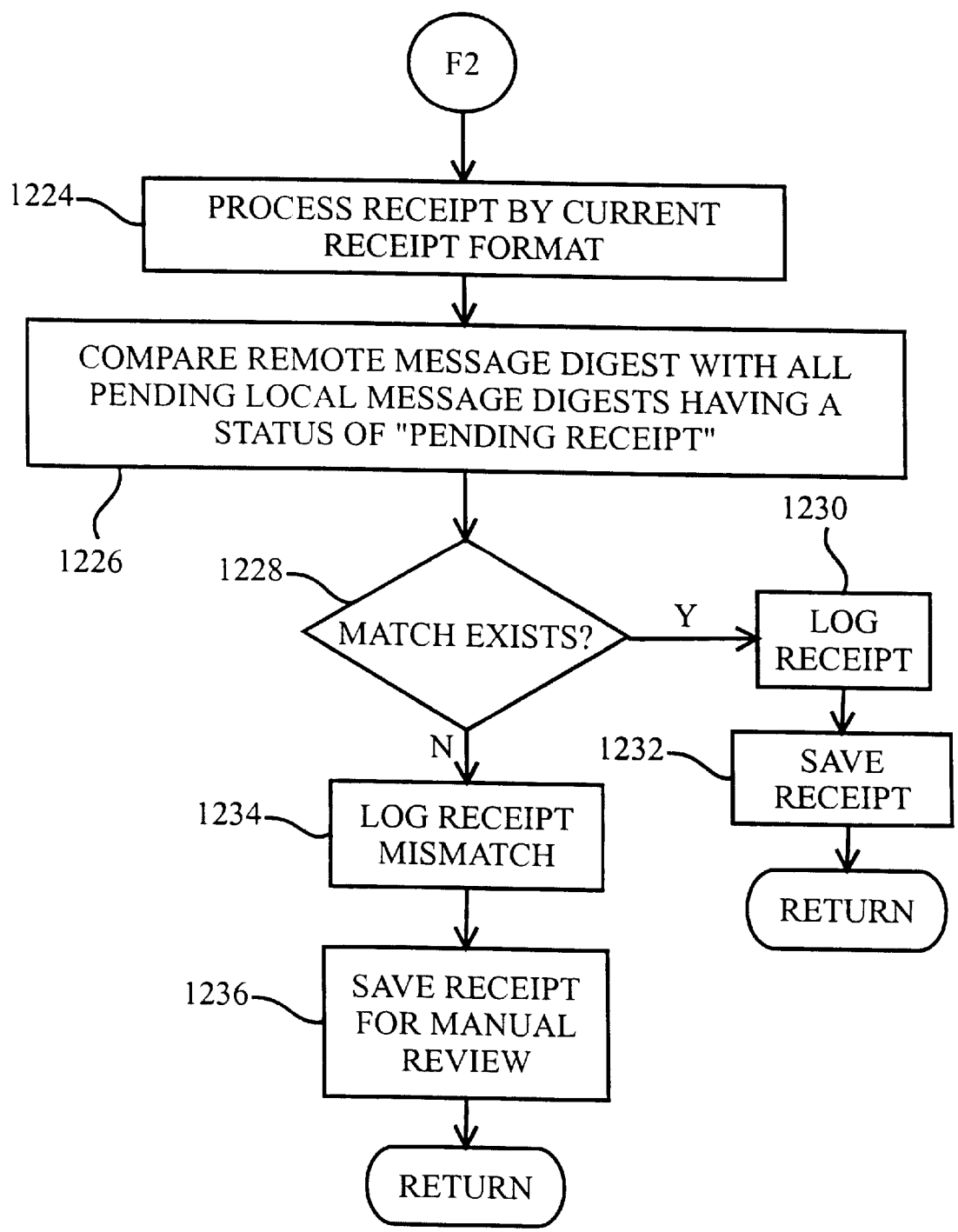

FIGS. 23a–23c are a process flowchart for an exemplary method for parsing an IA receipt after the message type has been determined to be IA receipt in step 818 as discussed previously with regard to FIG. 18b. Step 1180 reads a next tag, which is explicit. Step 1182 then reads a next length. Step 1184 reads a next tag, which is a sequence. Step 1186 then reads a next length. Step 1188 then reads a next tag, which is a sequence. Step 1190 reads a next length. Step 1192 then reads LL bytes, which are an ISA. In the current embodiment, a 105-octet ISA segment is read.

Step 1194 then reads a next tag, which is an OID. Step 1196 then reads a next length LL. Step 1198 then reads the next LL bytes, which are an OID. In the current embodiment, the OID is a 15-octet UTC time.

It is pointed out that the steps and fields illustrated in FIG. 23b are optional and may not always be present in all receipts. Step 1202 reads a next tag, which is optional. Step 1204 then reads a next length. Step 1206 reads a next tag, which is a sequence. Step 1208 then reads a next length. Step 1210 reads a next tag, which is an OID. Step 1212 then reads a next length LL.

Step 1214 then reads LL bytes, which are an OID for a message digest or a signature algorithm. Step 1216 then reads a next tag, which is an octet string. Step 1218 then reads a next length LL. Step 1220 then reads LL bytes, which are a remote message digest or a digital signature, depending on the OID which was read in step 1214 as discussed above. Step 1224 then processes the receipt by the current receipt format. Step 1226 compares the remote message digest with all pending local message digests having a status of "pending receipt." Step 1228 then determines if a match exists. If step 1228 determines that a match exists, then step 1230 logs a receipt, step 1232 saves the receipt, and control is returned to the calling system. If step 1228 determines that a match does not exist, then step 1234 logs a receipt mismatch, step 1236 saves the receipt for manual review, and control is returned to the calling system.

Figure 24A:
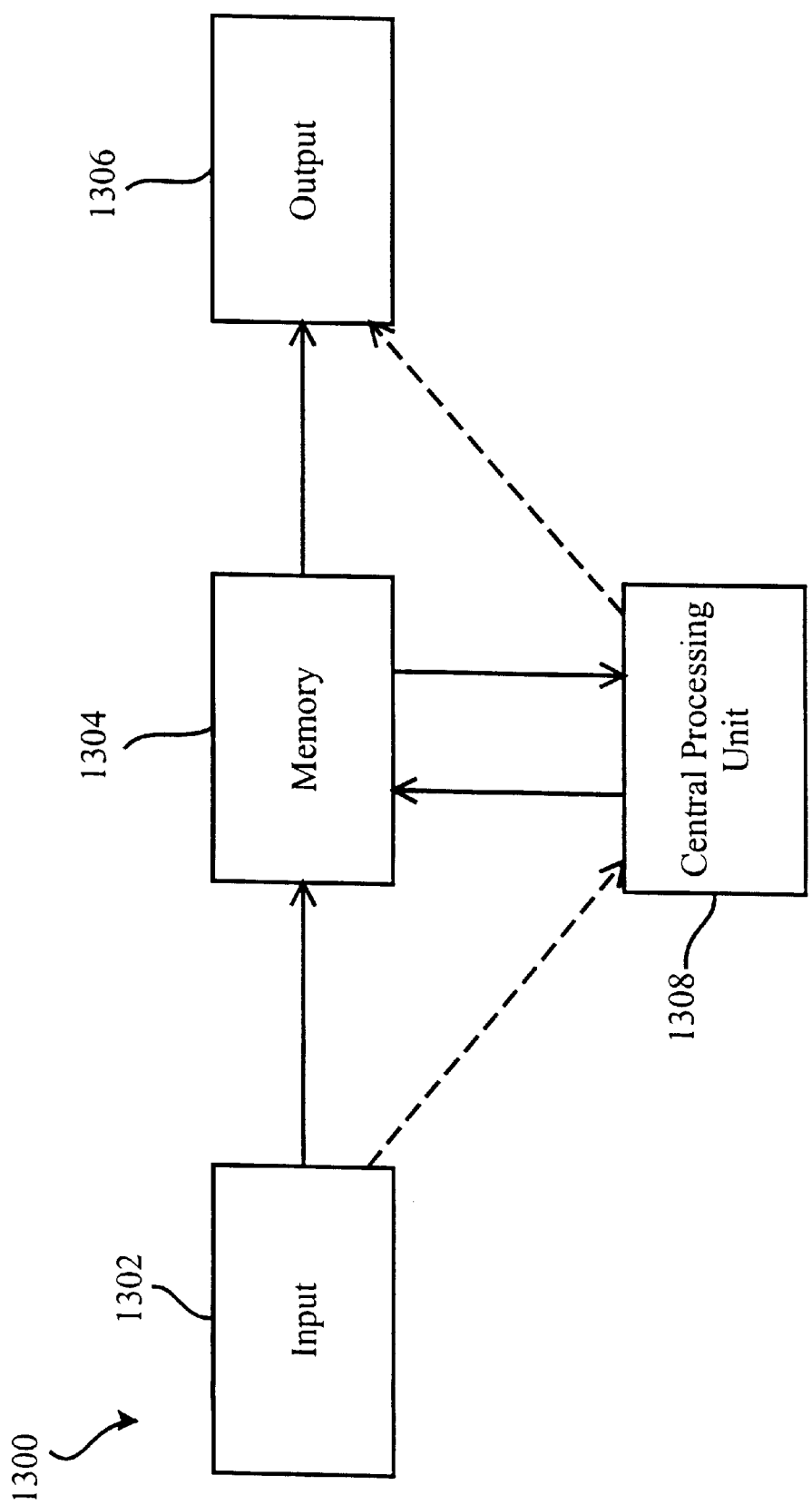
FIG. 24a illustrates an exemplary portion of a generalized computer system upon which portions of the invention may be implemented.

FIG. 24a illustrates an exemplary portion of a generalized computer system 1300 upon which portions of the invention may be implemented. For example, the network configurations illustrated in FIGS. 3–5 may each be implemented by a plurality of computers having a generalized configuration as exemplified by FIG. 24a. The message formatting and transmission illustrated in FIGS. 6–23c may be implemented by a plurality of computers having configurations similar to those of FIGS. 24a and 24b described below.

An input 1302 of FIG. 23a communicates with a memory 1304 and a Central Processing Unit 1308. The Central Processing Unit 1308 communicates with the memory 1304 and an output 1306. The output 1306 is also in communication with the memory 1304. The Central Processing Unit 1308 may include an arithmetic/logic unit and a control unit in the form of hardware and/or software (not shown). One or more of inputs 1302 may each be in communication with one or more memories 1304 and/or Central Processing Units 1308. One or more Central Processing Units 1308 may be in communication with one or more outputs 1306 and/or memories 1304 and/or inputs 1302. One or more memories 1304 may be in communication with one or more inputs 1302 and/or Central Processing Units 1308 and/or outputs 1306. Clearly, a plurality of variations of computer hardware configurations may be realized in a network of computer systems upon which portions of the invention may be implemented.

Figure 24B:
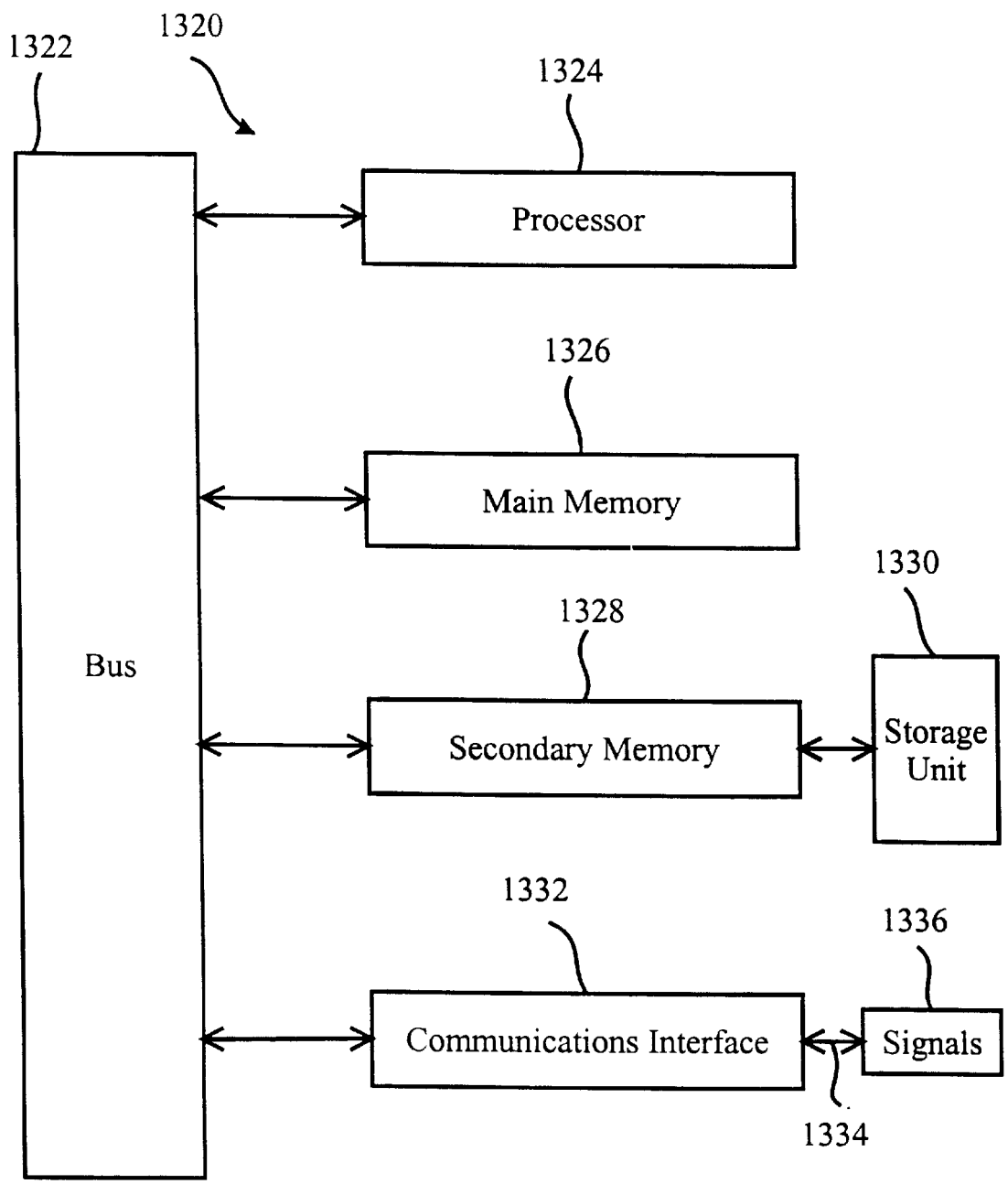
FIG. 24b illustrates an exemplary portion of a generalized hardware configuration, in the format of a workstation, upon which portions of the invention may be implemented.

FIG. 24b illustrates an exemplary hardware configuration of a generalized computer system 1320 upon which portions of the invention may be implemented. One or more processors 1324 are connected to a communication bus 1322. The communication bus 1322 also communicates with a main memory 1326, preferably a random access memory ("RAM"). A secondary memory 1328 communicating with the communication bus 1322 may also be included in the computer system 1320. The secondary memory 1320 may include, for example, a hard disk drive, a removable storage drive such as a floppy disk drive, a magnetic tape drive, an optical disk drive, a program cartridge and cartridge interface, a removable memory chip (e.g., EPROM, PROM, ROM), or any other similar storage medium. The secondary memory 1328 may be in communication with a storage unit 1330 such as a floppy disk, magnetic tape, optical disk, or other storage medium read by and written to by a secondary memory device. The storage unit 1330 includes a computer usable storage medium for storing computer software and data.

The computer system 1320 may also include a communications interface 1332 in communication with the communication bus 1322 for transferring software and data between the computer system 1320 and external devices. Examples of communications interfaces 1332 include a modem, a network interface (e.g., a network card), a communications port, a PCMCIA slot and card, and other similar interfaces. Software and data transferred via the communications interface 1332 are in the form of signals 1336 which are provided to the communications interface 1332 via a channel 1334. The signals 1336 may be electronic, electromagnetic, optical or other signals capable of being received by the communications interface 1332. The channel 1334 may be implemented using wire, cable, fiber optics, a phone line, a cellular phone link, an RF link or other communications channels.

Computer programs are stored in main memory 1326 and/or secondary memory 1328. Computer programs may be received via the communications interface 1332. Computer programs, when executed by the processor 1324, enable the computer system 1320 to perform the features of the present invention.

This invention may be conveniently implemented using a network of conventional general purpose digital computers and/or microprocessors programmed according to the teachings of the present specification, as will be apparent to those skilled in the computer art from reading the above descriptions regarding FIGS. 3–23c. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. A computer implemented method for managing transmission of electronic data between at least two network entities comprising the steps of:
    creating, by a first network entity having a first memory, an electronic message having a header portion and a message data portion having Electronic Data Interchange ("EDI") data wherein the header portion allows decoding of the electronic message and comprises one or more operation codes, source codes and destination codes;
    establishing a connection between said first network entity and a second network entity having a second memory using Transmission Control Protocol/Internet Protocol ("TCP/IP") and Secure Sockets Layer Version 3 ("SSL3"); and
    transmitting said electronic message from said first network entity to said second network entity.

2. The method according to claim 1, wherein
    said first network entity is a network entity of a Competitive Local Exchange Company ("CLEC") and said second network entity is a network entity of an Incumbent Local Exchange Company ("ILEC").

3. A computer implemented method for managing transmission of electronic data between at least two network entities comprising the steps of:
    creating, by a first network entity having a first memory, an electronic message having a header portion and a message data portion having Electronic Data Interchange ("EDI") data,
    establishing a connection between said first network entity and a second network entity having a second memory using Transmission Control Protocol/Internet Protocol ("TCP/IP") and Secure Sockets Layer Version 3 ("SSL3"); and
    transmitting said electronic message from said first network entity to said second network entity,
wherein
    said step of creating further comprises the steps of
        inputting an EDI data message to said first memory,
        determining a message format identifier, and
        determining a length of said EDI data message,
    said step of establishing further comprises the steps of
        determining, by said first network entity, an Internet Protocol ("IP") destination address value,
        connecting, by said first network entity, to said second network entity using a SSL3 protocol, and
        accepting, by said second network entity, said connection using said SSL3 protocol, and
    said step of transmitting further comprises the steps of
        transmitting, by said first network entity, said message format identifier, said length of said EDI data message, and said EDI data message to said second network entity,
        closing, by said second network entity, said connection using said SSL3 protocol.

4. The method according to claim 1, wherein
said header portion includes
    a first data item having a value corresponding to a message format identifier, and
    a second data item having a value corresponding to a length of a first data message.

5. The method according to claim 4, wherein
said first data item includes one byte of American Standard Code for Information Interchange ("ASCII") text corresponding to said message format identifier, and
said second data item includes one byte of ASCII text corresponding to said length of said first data message.

6. The method according to claim 4, wherein
said message format identifier corresponds to one of basic EDI message, EDI message with message integrity, EDI message with non-repudiation, Interactive Agent ("IA") status, and IA message receipt.

7. A system implemented on one or more computers for managing transmission of electronic data between at least two network entities, comprising:
    at least one memory,
    means for creating, by a first network entity having a first one of said at least one memory, an electronic message having a header portion and a message data portion having Electronic Data Interchange ("EDI") data in said first one of said at least one memory, wherein the header portion allows decoding of the electronic message and comprises one or more operation codes, source codes and destination codes;
    means for establishing a connection between said first network entity and a second network entity having a second one of said at least one memory using Transmission Control Protocol/Internet Protocol ("TCP/IP") and Secure Sockets Layer Version 3 ("SSL3"); and
    means for transmitting said electronic message from said first network entity to said second network entity.

8. The system according to claim 7, wherein
said first network entity is a network entity of a Competitive Local Exchange Company ("CLEC") and said second network entity is a network entity of an Incumbent Local Exchange Company ("ILEC").

9. A system implemented on one or more computers for managing transmission of electronic data between at least two network entities, comprising:
    at least one memory,
    means for creating, by a first network entity having a first one of said at least one memory, an electronic message having a header portion and a message data portion having Electronic Data Interchange ("EDI") data in said first one of said at least one memory;
    means for establishing a connection between said first network entity and a second network entity having a second one of said at least one memory using Transmission Control Protocol/Internet Protocol ("TCP/IP") and Secure Sockets Layer Version 3 ("SSL3"); and
    means for transmitting said electronic message from said first network entity to said second network entity,
wherein
    said means for creating further comprises
        means for inputting an EDI data message to said first one of said at least one memory,
        means for determining a message format identifier, and
        means for determining a length of said EDI data message, said means for establishing further comprises
  means for determining, by said first network entity, an Internet Protocol ("IP") destination address value,
  means for connecting, by said first network entity, to said second network entity using a SSL3 protocol, and
  means for accepting, by said second network entity, said connection using said SSL3 protocol, and
said means for transmitting further comprises
  means for transmitting, by said first network entity, said message format identifier, said length of said EDI data message, and said EDI data message to said second network entity,
  means for closing, by said second network entity, said connection using said SSL3 protocol.

10. The system according to claim 7, wherein
said header portion includes
  a first data item having a value corresponding to a message format identifier, and
  a second data item having a value corresponding to a length of a first data message.

11. The system according to claim 10, wherein
said first data item includes one byte of American Standard Code for Information Interchange ("ASCII") text corresponding to said message format identifier, and
said second data item includes one byte of ASCII text corresponding to said length of said first data message.

12. The system according to claim 10, wherein
said message format identifier corresponds to one of basic EDI message, EDI message with message integrity, EDI message with non-repudiation, Interactive Agent ("IA") status, and IA message receipt.

13. A computer program product, including at least one computer readable medium, for managing transmission of electronic data between at least two network entities, said computer program product comprising:
  means for creating, by a first network entity having a first one of said at least one computer readable medium, an electronic message having a header portion and a message data portion having Electronic Data Interchange ("EDI") data in said first one of said at least one computer readable medium, wherein the header portion allows decoding of the electronic message and comprises one or more operation codes, source codes and destination codes;
  means for establishing a connection between said first network entity and a second network entity having a second one of said at least one computer readable medium using Transmission Control Protocol/Internet Protocol ("TCP/IP") and Secure Sockets Layer Version 3 ("SSL3"); and
  means for transmitting said electronic message from said first network entity to said second network entity.

14. The computer program product according to claim 13, wherein
said first network entity is a network entity of a Competitive Local Exchange Company ("CLEC") and said second network entity is a network entity of an Incumbent Local Exchange Company ("ILEC").

15. A computer program product, including at least one computer readable medium, for managing transmission of electronic data between at least two network entities, said computer program product comprising:
  means for creating, by a first network entity having a first one of said at least one computer readable medium, an electronic message having a header portion and a message data portion having Electronic Data Interchange ("EDI") data in said first one of said at least one computer readable medium, wherein the header portion allows decoding of the electronic message and comprises one or more operation codes and distribution codes;
  means for establishing a connection between said first network entity and a second network entity having a second one of said at least one computer readable medium using Transmission Control Protocol/Internet Protocol ("TCP/IP") and Secure Sockets Layer Version 3 ("SSL3"); and
  means for transmitting said electronic message from said first network entity to said second network entity,
wherein
  said means for creating further comprises
    means for inputting an EDI data message to said first one of said at least one computer readable medium,
    means for determining a message format identifier, and
    means for determining a length of said EDI data message,
  said means for establishing further comprises
    means for determining, by said first network entity, an Internet Protocol ("IP") destination address value,
    means for connecting, by said first network entity, to said second network entity using a SSL3 protocol, and
    means for accepting, by said second network entity, said connection using said SSL3 protocol, and
  said means for transmitting further comprises
    means for transmitting, by said first network entity, said message format identifier, said length of said EDI data message, and said EDI data message to said second network entity,
    means for closing, by said second network entity, said connection using said SSL3 protocol.

16. The computer program product according to claim 13, wherein
said header portion includes
  a first data item having a value corresponding to a message format identifier, and
  a second data item having a value corresponding to a length of a first data message.

17. The computer program product according to claim 16, wherein
said first data item includes one byte of American Standard Code for Information Interchange ("ASCII") text corresponding to said message format identifier, and
said second data item includes one byte of ASCII text corresponding to said length of said first data message.

18. The computer program product according to claim 16, wherein
said message format identifier corresponds to one of basic EDI message, EDI message with message integrity, EDI message with non-repudiation, Interactive Agent ("IA") status, and IA message receipt.

19. The method of claim 1, wherein the one or more operation codes, source codes and destination codes comprise operation type information, operation action information, error code information, source value information and destination value information.

* * * * *